United States Patent
Williams et al.

(10) Patent No.: US 12,531,434 B2
(45) Date of Patent: Jan. 20, 2026

(54) POWER SOCKET FOR REDUCING WASTAGE OF ELECTRICAL ENERGY AND RELATED ASPECTS

(71) Applicant: MEASURABLE LTD, Caversham Reading (GB)

(72) Inventors: Daniel Robert Williams, Caversham Reading (GB); Joshua Fraser Eadie, Caversham Reading (GB)

(73) Assignee: MEASURABLE LTD, Berkshire (GB)

( * ) Notice: Subject to any disclaimer, the term of this patent is extended or adjusted under 35 U.S.C. 154(b) by 330 days.

(21) Appl. No.: 18/044,418

(22) PCT Filed: Sep. 7, 2021

(86) PCT No.: PCT/GB2021/052308
§ 371 (c)(1),
(2) Date: Mar. 8, 2023

(87) PCT Pub. No.: WO2022/053794
PCT Pub. Date: Mar. 17, 2022

(65) Prior Publication Data
US 2024/0063658 A1 Feb. 22, 2024

(30) Foreign Application Priority Data

Sep. 8, 2020 (GB) .................................... 2014084

(51) Int. Cl.
*H02J 13/00* (2006.01)
*G06N 20/00* (2019.01)
*H02J 3/14* (2006.01)

(52) U.S. Cl.
CPC .......... *H02J 13/0005* (2020.01); *G06N 20/00* (2019.01); *H02J 3/14* (2013.01);
(Continued)

(58) Field of Classification Search
CPC ............. H02J 13/0005; H02J 13/00002; H02J 13/00004; Y02B 70/00; Y04S 20/00
See application file for complete search history.

(56) References Cited

U.S. PATENT DOCUMENTS 9,760,140 B1 * 9/2017 Krummey ................ G06F 1/266
10,096,951 B1 * 10/2018 Hodge ................ H02J 13/0005
(Continued)

FOREIGN PATENT DOCUMENTS

EP     3 618 223 A1     3/2020
GB     2560032 A     8/2018
(Continued)

OTHER PUBLICATIONS

International Search Report dated Mar. 28, 2022 (9 pages) from PCT Priority Application PCT/GB2021/052308.
(Continued)

*Primary Examiner* — Scott T Baderman
(74) *Attorney, Agent, or Firm* — Crowell & Moring LLP; John C. Freeman

(57) ABSTRACT

An electrical power socket including: an electrical power outlet; a power input configured to supply power to the power outlet; one relay configured to control delivery of electrical power via the power outlet; a power monitor configured to monitor the operational state of the power outlet and characteristics of power drawn from the power outlet. The electrical power socket further includes a microcontroller being configurable to: capture monitored data; send the captured data via a data network interface to a remote energy monitoring system; receive data from the remote energy monitoring system; and control the one relay to manage delivery of power via a power outlet responsive to a determination that the power outlet is delivering power associated with a wasted energy usage classification.

18 Claims, 14 Drawing Sheets

(52) U.S. Cl.
CPC ............... *H02J 13/00001* (2020.01); *H02J 13/00002* (2020.01); *H02J 13/00004* (2020.01); *H02J 13/00036* (2020.01); *H02J 2310/54* (2020.01); *H02J 2310/58* (2020.01)

(56) References Cited

U.S. PATENT DOCUMENTS

| | | | |
|---|---|---|---|
| 10,409,238 B2* | 9/2019 | Zhang | H02J 3/004 |
| 10,578,657 B2 | 3/2020 | Decamp et al. | |
| 11,067,482 B2 | 7/2021 | Davies et al. | |
| 2002/0097546 A1 | 7/2002 | Weinberger | |
| 2007/0086126 A1 | 4/2007 | Baxter | |
| 2010/0164299 A1* | 7/2010 | Lee | H02J 3/14 |
| | | | 307/115 |
| 2010/0256828 A1* | 10/2010 | Wang | H04L 12/2825 |
| | | | 700/286 |
| 2011/0119515 A1* | 5/2011 | Sadwick | G01D 4/002 |
| | | | 713/340 |
| 2013/0245843 A1* | 9/2013 | Bhageria | H04L 67/1001 |
| | | | 700/287 |
| 2015/0045980 A1* | 2/2015 | Hsu | H05K 3/10 |
| | | | 700/298 |
| 2015/0066227 A1* | 3/2015 | Chapel | G05F 1/66 |
| | | | 700/295 |
| 2017/0093148 A1* | 3/2017 | Wang | F21V 23/023 |
| 2017/0133843 A1* | 5/2017 | McNeill-McCallum | |
| | | | H02J 3/0075 |
| 2017/0155523 A1* | 6/2017 | Fu | H01R 25/003 |
| 2017/0256941 A1* | 9/2017 | Bowers | G05B 13/041 |
| 2017/0257683 A1* | 9/2017 | Yamada | G08C 17/00 |
| 2017/0288456 A1 | 10/2017 | Chan et al. | |
| 2018/0245813 A1* | 8/2018 | Jia | F24F 11/57 |
| 2019/0027963 A1* | 1/2019 | Parks | H04B 7/15507 |
| 2019/0181638 A1* | 6/2019 | Chapel | H02J 13/0005 |
| 2020/0153272 A1* | 5/2020 | Somma | H02J 4/00 |
| 2020/0328694 A1* | 10/2020 | Telefus | H02J 13/00007 |
| 2020/0349484 A1* | 11/2020 | Serven | G06Q 10/06312 |
| 2021/0004771 A1* | 1/2021 | Levin | G06Q 50/12 |
| 2022/0167164 A1* | 5/2022 | Xu | H04W 60/04 |

FOREIGN PATENT DOCUMENTS

| | | | |
|---|---|---|---|
| JP | 2013-058916 A | | 3/2013 |
| KR | 10-2016-0100565 A | | 8/2016 |
| WO | WO 2008/073453 A1 | | 6/2008 |
| WO | WO-2017149367 A1 | * | 9/2017 |
| WO | WO 2018/176078 A1 | | 10/2018 |

OTHER PUBLICATIONS

International Preliminary Report on Patentability and appended Written Opinion of the International Searching Authority issued Mar. 7, 2023 (15 pages) out of PCT Priority Application PCT/GB2021/052308.

Search Report dated Nov. 25, 2020 (one page) out of Great Britain Priority Application No. 2014084.4.

U.S. Appl. No. 19/338,124, filed Sep. 24, 2025, Daniel Robert Williams et al.

U.S. Appl. No. 19/338,547, filed Sep. 24, 2025, Daniel Robert Williams et al.

U.S. Appl. No. 19/341,304, filed Sep. 26, 2025, Daniel Robert Williams et al.

U.S. Appl. No. 19/343,184, filed Sep. 29, 2025, Daniel Robert Williams et al.

* cited by examiner

POWER SOCKET FOR REDUCING WASTAGE OF ELECTRICAL ENERGY AND RELATED ASPECTS

This application is a National Stage application of International Application No. PCT/GB2021/052308, filed Sep. 7, 2021, the entire contents of which are incorporated herein by reference.

This application claims under 35 U.S.C. § 119(a) the benefit of the filing date of Great Britain Patent Application No. 2014084.4, filed on Sep. 8, 2020, the entire contents of which are incorporated herein by reference.

BACKGROUND OF THE INVENTION

Field of the Invention

The present disclosure relates to an electrical power socket for reducing wastage of electrical energy and to a number of related aspects for power management to avoid wasting energy. Examples of related aspects include: methods for using (and training) a device-type identifying machine learning, ML, model to identify a type of device drawing power from a power outlet, methods for using (and training) an energy usage classification ML model to determine an energy usage classification for power drawn from a power outlet of a power socket by a device, a method for indicating an energy usage classification for power drawn from a power outlet of a power socket, a method for controlling power to a plurality of power sockets, and related apparatus, computer program product and energy monitoring system aspects.

In particular, but not exclusively, the aspects of the invention seek to identify, control and reduce waste energy. The apparatus and system aspects contain both hardware and software components and in some embodiments are provided with data interfaces capable of receiving user input from a user interface of a suitably configured device.

Description of Related Art

A problem with the solutions of the prior art is that whilst smart energy meters can provide an indication of the amount of energy being consumed, no indication is usually available for individual sockets about whether they are providing energy to devices that is essentially being wasted. For example, devices in standby or idle modes, may power down to conserve energy but may not power off completely. Certain display devices may seem "switched off" but still draw power. A traditional smart meter cannot enable a user to control which sockets provide power to devices so that if energy is being wasted by a device, the power can be turned off. Smart sockets currently are not able to determine if the energy they are providing is wasted or not. There is thus a need for an improved energy management system which makes it easier to track when a power socket outlet is still providing power to a device despite not being actively used by a user, and especially to an energy management system that enables power management for groups of power outlets such as can be found in buildings etc.

Korean Patent Application number KR20160100565, "A Smart Power Plug System Using Wireless Communication Network" discloses a smart power plug system using a wireless communication network, and in particular, an outlet device provided on a wall of a building to supply power to various electronic devices to a user wireless terminal such as a smartphone held by a user through a wireless communication network. The use of standby energy is reduced by connecting the outlet device which supplies power to electronic devices to a server through a wireless communication network and to a smart phone held by the user. By connecting to the server with the same user's wireless terminal, power supply to unused outlet devices can be immediately cut off or various controls can be performed, such as scheduling a time to cut off, minimizing the waste of standby power and efficiently managing costs.

Japanese Patent Application number JP2013058916A, Standby power reduction system for electrical equipment, also discloses a standby power reduction system that reduces standby power of electric devices such as televisions and air conditioners.

Whilst a device drawing power in a standby power mode may be wasting energy, in some cases, however, it may not be. For example, a device may be updating its software and/or operating system whilst in a standby mode. Some devices may be configured to only go into standby mode after a certain period of time being idle, yet are wasting energy well before that period of time has passed. For example, a light bulb or lamp may not go into a standby mode.

Accordingly, there is a need for a power socket which can be configured to identify when a device is wasting energy based on a determining its operational state and on one or more characteristics of the electrical power drawn by a particular type of device which is drawing power from the power socket, instead of just detecting if a device is in a standby power mode.

SUMMARY OF THE INVENTION

It is an object of the present disclosure to mitigate, alleviate or eliminate one or more of the above-identified deficiencies and disadvantages in the prior art and solve at least the above mentioned problem.

Various aspects and preferred embodiments of the disclosed technology are set out herein.

According to a first aspect there is provided an electrical power socket for reducing wastage of electrical energy, the power socket comprising: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet; and a microcontroller, the microcontroller being configurable to: capture monitored data; send the captured data via a data network interface to a remote energy monitoring system; receive data from the remote energy monitoring system; and control the at least one relay to manage delivery of power via a power outlet responsive to a determination the power outlet is delivering power associated with a wasted energy usage classification.

In some embodiments of the power socket, the wasted energy usage classification is indicated in the data received from the remote energy monitoring system.

In some embodiments of the power socket, the wasted energy usage classification is determined by the power socket using a machine learning model.

In some embodiments of the power socket, the wasted energy usage classification is determined by the power socket using a machine learning model which is independent of the remote monitoring system.

In some embodiments of the power socket, the power socket further comprises a internal mechanism to detect the physical presence of a socket's plug inserted into each outlet. In some embodiments, the microcontroller is further configured to detect the physical engagement of a plug into each outlet using the internal detection mechanism.

In some embodiments of the power socket, the microcontroller is further configured to do one or more or all of:

- determine the nature of the device plugged into the power outlet using a ML model running on the microcontroller;
- turn off or on the at least one relay to allow power to flow to the one or more power outlets based on demand based signals received by the microcontroller from a network demand side response server;
- turn off or on the at least one relay to allow power to flow by way of pre-set conditions based on power monitoring data; and
- turn on or off relays to allow power to flow to each power outlet based on received signals indicating a present or current greenhouse gas, GHG, condition, for example, a current GHG metric or other value or status indicator.

In some embodiments, the ML model running on the computer does not require the ML model to use a network connection to operate.

In some embodiments, the algorithm used by the ML model running on the computer does not require the ML model to use a network connection to operate, the ML model including an algorithm having algorithm parameters which are updatable via a network connection.

In some embodiments, the ML model is configured to determine at least one type of device drawing power from an outlet of the electrical power socket.

In some embodiments, the ML model is configured to determine a type of at least one device drawing power from an outlet of the electrical power socket.

In some embodiments of the power socket, power socket is configured to implement edge computing using a firmware algorithm to manage itself if in an off-line state when a condition or ruleset has been breached.

In some embodiments of the electrical power socket of the first aspect, the electrical power socket is configured to reduce wastage of electrical energy by a connected electrical power consuming device wherein the electrical power socket comprises one or more electrical power outlets, a power input configured to supply power to each of the one or more power outlets, at least one relay configured to control delivery of electrical power via the one or more power outlets, a power monitor configured to monitor the operational state of each power outlet and one or more characteristics of power drawn from each power outlet by a connected electrical device, and a microcontroller, wherein, the microcontroller is configured to capture power monitored data representing the operational state of each power outlet and one or more characteristics of power drawn from each power outlet by the connected electrical device, send the captured power monitored data via a data network interface to a remote energy monitoring system, receive data from the remote energy monitoring system, and control the at least one relay to manage delivery of power via a power outlet responsive to a determination, based at least in part on the received data, that the power outlet is delivering power associated with a wasted energy usage classification to at least one device, wherein the power socket is configured to implement edge computing using a firmware algorithm to manage itself if in an off-line state when a condition or ruleset has been breached.

According to some embodiments of the power socket, the determination the power outlet is delivering power associated with a wasted energy usage classification is made using one or more of: data received from the remote energy monitoring system indicating energy is being wasted; and a ruleset for the power outlet and/or the power socket to provide power.

In some embodiments, the wasted energy classification is made using a global ML system which is distributed so that part of the ML system is performed in the power socket, for example, by the microcontroller.

In some embodiments, the local part of the ML model which runs in the socket, for example, in the microcontroller, is a ML model configured to determine what device is plugged in to an outlet of the socket.

In some embodiments, the wasted energy classification model may include a ML system with at least one algorithm running in the power socket, for example, running on the microcontroller, and the power socket either pulls in any necessary data to train and/or operate the ML model from remote sources or, in some embodiments, part or all of the training data and/or any data to operate the ML may be pushed from one or more remote sources.

In some embodiments, the determination the power outlet is delivering power associated with a wasted energy usage classification is made using one or more of: data received from the remote energy monitoring system indicating energy is being wasted; a ruleset for the outlet and/or the socket to provide power; and the output of a machine learning model operated locally on the power socket. In some embodiments, the machine learning model is trained to perform a method for identifying a type of device drawing power from a power outlet of a power socket according to the third aspect disclosed below. In some embodiments, instead or in addition, the machine learning model is configured to implement a method of determining an energy usage classification according to the fifth aspect disclosed below. In some examples, the data received indicates a confidence score for an energy classification of wasted or not wasted which is processed with the ruleset to determine if the power outlet is delivering power associated with the wasted energy usage classification.

In some embodiments of the power socket, the power socket is configured to implement edge computing using a firmware algorithm to manage itself if in an off-line state when a condition or ruleset has been breached.

In some embodiments, the received data comprises at least a wasted energy usage classification and the relay manages the delivery of power to stop delivering power based on the determination that the power being delivered is associated with the wasted energy usage classification.

In some embodiments, the received data comprises at least a wasted energy usage classification and the relay manages the delivery of power to stop delivering power based on the determination that the power being delivered is associated with the wasted energy usage classification without requiring a control signal from the remote energy classification server.

In some embodiments of the power socket, the firmware algorithm automatically causes the power socket to turn off power provided to a device connected to a power socket when the condition or ruleset has been breached.

In some embodiments of the power socket, the firmware algorithm causes the power socket to wait a given time frame and then to turn the power back on, wherein if the breach is still evident, the power socket is caused to turn the power provision off.

In some embodiments of the power socket, if the breach is still evident, the off-period time frame is increased by a set amount according to the number of breaches that have occurred.

In some embodiments of the power socket, the off-period time frames are adjustable.

In some embodiments of the power socket, the power outlet determines it is delivering power associated with a wasted energy usage classification using at least the ruleset.

In some embodiments of the power socket, when the power socket is in an off-line state or otherwise not connected to the remote energy monitoring system, the captured monitored data is used by a machine-learning model running on the microcontroller to determine if the captured monitored data includes data indicated wasted energy.

In some embodiments, wherein the power socket further includes for each power outlet a plug engagement detection mechanism configured to detect at least one pin of the plug in that power outlet independently of whether an electrical device is drawing power via the plug from that power outlet.

Advantageously, the power socket reduces the wastage of power by a device, for example, such as a laptop, or charger (or similar switching power supply), to be managed by activating the relay to turn off the delivery of power if it determined that the power delivered is just being wasted, for example, if the power is being delivered to a user who is no longer in the vicinity of the outlet, or if the device is in fact asleep and it is outside office hours, or if the user is in a meeting away from the device in question.

In this way, it is possible to set up rules such as requiring the presence of a user within a certain distance of the device for the energy usage by the device to not be considered wasted energy, or for the user of that device to not be determined to be logged into and/or otherwise using another device, or in a meeting room.

According to some embodiments, at least one relay comprises a remotely actuatable relay which is also is configured to be actuated off-line responsive to one or more of: a loss or change of data network connectivity with the remote energy monitoring system; and a loss of data communication with the remote energy monitoring system.

In some embodiments, advantageously, the relay is a remotely actuatable relay which includes a latching relay configured to de-energize de energise after being switched so that the socket uses no power to operate the relay other than when switching power from an outlet on or off.

According to some embodiments, the power monitor determines, one or more or all of the following characteristics of the power drawn from the socket outlet by the device, together with time-stamp information: an AC line frequency; an AC line voltage; a current drawn on outlet; an active power drawn on the outlet; a reactive power drawn on the outlet; an apparent power drawn on the outlet; and power factor. The time-stamp is a date-time stamp which is accurate to the nearest millisecond in some embodiments.

In some embodiments, the power monitor determines one or more or all of the above characteristics of the power drawn from the socket by the device, together with time-stamp information at intervals of between 3 Hz and 5 Hz, but preferably 3 Hz.

In embodiments, higher frequencies, for example, 20 Hz or more may be used to measure the characteristics of the power drawn.

In some embodiments, measurements at even higher frequencies, for example, in the hundreds or thousands of Hz, for example, megaHz or higher, are taken and these maybe sampled to determine characteristics of the power drawn by a device, including current in some embodiments and/or also other characteristics of the power drawn.

According to some embodiments, the power monitor is configured to store the determined one or more characteristics of power drawn by a device and time stamp information in a data store accessible by the microcontroller.

In some embodiments, the data store accessible by the microcontroller is located on the power socket.

In some embodiments, the time-stamp is synchronised across a network of power sockets, which are configured to send data to the remote energy monitoring system. Advantageously, by providing a time-stamp which is accurate across the network to the nearest millisecond, data can be sent to the remote energy monitoring system from, for example, a network of power sockets at different locations in a building, and/or in different buildings, and/or in different geographic regions such as different cities.

In some embodiments, the data store comprises flash memory built into the network enabled microcontroller. In some embodiments, the data store is implemented as a flash storage chip, or as an EEPROM chip or similar electrically erasable read only memory (ROM) non-volatile memory store. Some examples of the memory chip use hardware encryption or tamper proof security mechanism.

In some embodiments, the micro-controller can be remotely controlled by the remote energy monitoring system.

Advantageously, in some embodiments, the energy monitoring system is configured to remotely monitor the on/off state of each power outlet, the amount of power being drawn from a power outlet, and to determine an energy usage classification for the power being drawn.

Advantageously, in some embodiments, the remote energy monitoring system is able to implement a remote energy management scheme for one or more power sockets by sending a control signal to switch off one or more power outlets of the one or more power sockets which it has determined to be providing wasted energy.

In some embodiments, the power socket also includes at least one indicator for indicating an energy usage classification of the energy being drawn from an outlet (for example, that the energy being provided has been classified as wasted energy) and/or a status of a device (for example, that the device is now in an idle or stand-by mode) and/or a status of the outlet, for example, that it has been turned off to save energy. In some examples, the indicator comprises one or more LEDs. In some examples, the indicator comprises a display. The indicators may also be configured to display the carbon intensity of the national or local electricity grid. The information may be provided by sequencing light signals, by activating LEDs to indicate one or more symbols or alpha-numeric characters. In some embodiments, information may be provided by an audible output in addition or instead of a visual indicator.

In some embodiments, the indicator comprises a power outlet indicator comprising at least a red green blue, RGB, light emitting diode, LED, which is controlled by the microcontroller to indicate an energy classification status for that outlet responsive to receiving the energy classification status from the remote energy monitoring system.

In some embodiments, in addition or instead of the energy classification status, a carbon emission indication and/or a warning or alert is also generated by the power socket.

According to some embodiments, the relay includes a latching relay configured to de-energize after being switched so the relay does not use power to maintain its state after it has been switched on or off. Advantageously, this means the power socket will only use power to operate the relay when switching it on and off.

In some embodiments, the relay comprises a remotely actuatable relay for interrupting the delivery of power by the outlet to a device drawing power from that outlet responsive to a control signal received from the network enabled microcontroller.

In some embodiments, the control signal is received from a network enabled microcontroller in response to a triggering event including one or more of: a control signal from the remote energy monitoring system; a set of locally defined rules for providing power from a socket; a determination of a loss or change of connectivity; and/or a loss of communication with the remote energy monitoring system. A locally defined ruleset comprises in some embodiments a ruleset for a particular power socket and/or power outlet. In some embodiments, the locally defined rules may include rules set by a user of a power socket/outlet. In some embodiments, the locally defined rules are combined with rules set remotely by an administrator for that power socket and/or power outlet.

In some embodiments, the local rules are user configured for the power socket or power outlet.

In some embodiments, the remotely actuatable relay is also configured to be actuated off-line.

In some embodiments, the data network interface includes a wireless communications network data interface.

According to some embodiments, the microcontroller captures data from the data store at dynamic intervals to send to the remote energy monitoring system, wherein the dynamic intervals automatically increase in length if the microcontroller detects no power is being drawn from the data captured by the power monitor and/or if a relay has turned off the delivery of power from an outlet.

Advantageously, this reduces energy consumption by the power socket.

According to some embodiments, the power socket includes a reset component which is configured to perform a reset routine, wherein the reset routine is triggered by detecting an external magnetic field. For example, in some embodiments, the power socket includes a Hall sensor for detecting external magnetic fields. Advantageously, the use of a magnetic field to trigger a reset of the microcontroller enables the microcontroller of the power socket to be reset without necessarily interrupting or otherwise interfering with the ability of an outlet to deliver power. Advantageously, this avoids any need for a user to touch the socket, which may be safer than if there is a physical button to press.

In some embodiments, the reset routine comprises resetting the power socket to a factory state or a previous operable state.

In some embodiments, the reset routine includes: searching for a pre-programmed wireless network, for example, a Wi-Fi network, signal from an external device; receiving data from the external device; and, upon disconnection from the pre-programmed Wi-Fi signal, resetting with the received data.

In some embodiments, the external device is connected to and powered from an outlet of the power socket.

In some embodiments, the received data comprises changes to one or more operational parameters and/or computer coded instructions used by the microcontroller. In some examples the instructions comprise compression algorithms, and/or for example, instructions or rules for discarding or deleting data and/or for example to set reporting intervals based on the amount of data the microcontroller is able to capture and send in a report to the remote energy monitoring system. In some embodiments, the received data comprises new client wireless network connectivity settings data.

In some embodiments, the one or more power outlets of the power socket are configured to be in either a predetermined on or off operational state as a fail-safe condition which is triggered when the microcontroller fails to detect one or more of the following: a heartbeat signal from the power monitor; any network connectivity; a data connection to the remote energy monitoring system; and a rule condition for triggering the operational state of the power outlet, for example, if a maximum drawn current limit has been reached and/or if the power socket is overheating.

In some embodiments, the power socket is configured to respond to a received power request signal to meter power drawn from at least one output.

In some embodiments, the detected power request signal to provide metered power is associated with a user account.

In some embodiments, the metered power is provided for a predetermined amount of time.

In some embodiments, the amount of power metered is charged to the user account.

In some embodiments, the amount of metered power is prepaid using the user account.

In some embodiments, the power request signal is an NFC signal generated by a device gesture near the power socket or tapping the power socket, wherein the user account information is transferred with the NFC signal.

In some embodiments, the power monitor is calibrated to be accurate to a measurement error of 0.1% or less.

According to a second aspect there is provided a method for training a machine learning, ML, model to identify a type of energy consuming device drawing power from a power outlet of a power socket, the method including: generating training data input vectors comprising labelled data received from a plurality of power outlets, wherein each training data input vector includes at least features identifying a power outlet, a device type identifier for a device drawing power from the power outlet, and one or more characteristics of power drawn from that power outlet by the device in a time segment; iteratively determining, for each input vector of the training data received by the ML model, a device type identifier for a device drawing power from the power outlet associated with that input vector by processing, using the ML model, at least the features of the input vector representing the one or more characteristics of power drawn from the power outlet by that device; determining a classification error based on a comparison of the plurality of device types identified by output of the ML model with the plurality of devices types identified in the training data; and adjusting the weights of the ML model to reduce the determined device type classification error and repeating the iterative training steps and the determining steps until an energy classification optimization condition is met.

An example of an energy classification optimization condition is a condition comprising a goal success rate, for example, a success rate of 95% of device type classifications generated by the ML model matching those of the training data.

In some examples, each labelled data set of each input vector is associated with a time stamp. In some examples, the time segment is identified using time stamp information. In some examples, the power outlet identifier comprises a location identifier for the power outlet.

Advantageously, this allows a power outlet to be uniquely identified and tracked to its location so that a manual check can be made on the status of the device drawing power from that power outlet, and/or for additional inferences and/or power consumption rules to be made based on the location of the outlet.

According to some embodiments, the one or more power drawn characteristics include one or more or all of: AC line voltage, AC line frequency, current, reactive power, active power, apparent power, power factor. The characteristics are preferably sampled three times a second (at a frequency of 3 Hz) or faster. This allows more accurate determinations to be made of the device-type identifier According to some embodiments, the labelled data includes time-stamped data received from at least one additional source of information for determining the device type identifier.

In some examples, the additional source of information includes a remote source from power socket which provides sensor data, such as, for example, weather data, temperature data, diary/scheduling information, systems log-in information, or any other type of sensed or recorded data for determining the energy usage classification According to some embodiments, the power socket is a power socket according to the first aspect.

According to a third aspect there is provided a method for identifying a type of device drawing power from a power outlet of a power socket using a trained device type identifying ML model, for example, a ML model trained according to the second aspect above, the method including: receiving data including a power outlet identifier, one or more characteristics of power drawn from that power outlet by a device, and a time-stamp; determining an input vector for the ML model based on the received data; determining, using the ML model, a classification of the type of device drawing power from the power outlet; and outputting an identifier for the determined classification of the device type.

In some embodiments of the third aspect, the method is performed by a microcontroller provided on the power socket of the first embodiment.

Some examples of different classifications of devices include: computer equipment (e.g. printer, laptop, display, web-cam, headphones, dock); a light or lamp; a vending machine; a heater or heating system or component of a heating system; a photo-copier; a fridge; a monitor; a communications device; (e.g. phone or conferencing system); a television display; a set top box; a games console; fitness equipment; office equipment; audio equipment; e.g. speakers, amplifiers, a cooking appliance, such as a kettle or hotplate or over, a domestic appliance, a hot-water heating system; a fan or air-conditioner; a charger or switching power supply. In some examples, an outlet may be connected to an extension lead from which a plurality of devices are concurrently drawing power in the time segment and the method then further includes processing the received power characteristics to disaggregate the power characteristics into power characteristics associated with each individual device.

According to a fourth aspect there is provided a method for training an energy usage classification ML model to determine an energy usage classification for power drawn from a power outlet of a power socket by a device, the method including: generating training data input vectors including labelled data received in time segments from each one of a plurality of power outlets, wherein each training input vector comprises, features identifying a time segment, a power outlet identifier, a device type identifier of a device drawing power from the power outlet in the time segment, one or more known power characteristics for the power drawn by the device in the time segment, and an known energy usage classification in the time segment; iteratively determining, for each input vector of the training data received by the ML model, an energy usage classification for power drawn by the device from the power outlet in the time segment associated with that input vector by processing, using the ML model, at least the features of the input vector representing one or more characteristics of power drawn from that power outlet by the device; determining an energy usage classification error based on a comparison of the energy usage classifications identified by output of the ML model with the energy usage classifications identified in the training data; and adjusting the weights of the ML model to reduce the determined energy classification error and repeating the iterative training steps and the determining steps until an energy classification optimization condition is met.

According to some embodiments, each input vector includes at least one additional feature representing an additional item of information associated with the time segment from a data source other than a power outlet.

In some embodiments, each input vector includes parameters representing a hierarchy of different types of related information associated with the time segment from different known data sources.

In some embodiments, an energy usage classification includes a wasted energy classification. In some embodiments, an energy usage classification comprises a wasted energy classification and a confidence score for that classification.

In some embodiments, the method further includes, based on the confidence score being sufficiently high, sending a warning alert to a user device to display via the device that energy is being wasted prior to sending a signal to power off the power outlet.

In some embodiments, instead, or in addition, the method includes generating an alert sound or vibration or visible warning.

In some embodiments, the power socket generates an audible alert or warning or displays using an indicator a visible alert of the power off event prior to the event.

In some embodiments, the wasted energy classification is associated with one or more of: a location of a user of a known device not being within a predefined proximity to the power outlet from which that known device is drawing power; no user input to the known device having being detected in a certain period of time; and/or a detected or otherwise determined operational state of the device, for example, a power signature of the device which is associated with an idle or standby mode.

In some embodiments, the energy usage classification machine learning model receives the power characteristics and/or other information in the form of a power profile for a type of device.

In some embodiments, the power profile includes an indication of an operational state of the device, such as an idle state of the device.

In some examples, the location of the user is determined using related information from one or more of the energy-related information data sources. Examples of data sources include sources for: a schedule for the user; a user log-in location; a user position tracker location; e.g. a GPS tracker location; an indoor tracked location (for example, a Wi-Fi access point tracked location), a building access system for the building where the power socket is located, or an access alert the user is in another building from its access system, normal working hours information for the user.

In some examples, the ML model weights associated with input vector features representing the hierarchy of characteristics (for example, power drawn characteristics and/or characteristics for the other information sources) are biased according to the level of effect a feature is determined to have on the energy usage classification output of the ML model. The biasing may be based on reliability and/or a confidence level in the effect.

In some examples the data sources include one or more or all of the following: a predefined device whitelist information source, where a white listed device implies it is not to ever be classified as wasting energy; a historical energy usage data source; a device software information source; a building systems information source; a power grid network information source; a local energy generation source; and a demand side response information source, which indicates if a building/location or other group of power sockets belongs to a scheme where a power grid power provider can request the group of power sockets is turned off.

In some embodiments, the building systems information associated with the time segment includes data from a building management system which includes for the time segment one or more or all of: occupancy sensor data, security data, access, login location, and meeting scheduling data.

In some embodiments, the historical energy information includes a building energy use profiles for each power socket in the building level for a historically similar time segment. For example, to allow comparison with the same time segment on a previous day, on the same day of a previous week or month or year, on the same day of the month, or the same days of a week in a previous year etc. In some embodiments, the time segment is matched to a user behavior, for example, an "in a meeting" time segment.

In some embodiments, the method further includes determining a duration of the time segment when a known device is attached to a socket.

In some embodiments, a time segment is provided using a sliding window, for example, covering a time segment of several minutes (e.g. 5 to 15 minutes). In some embodiments, a time window used by the energy usage classification ML model is the same time window used by the device type identification ML model. In some embodiments, the time window is determined from training data using a sliding window for a current minute and a previous number of minutes, for example, for the previous 14 minutes, which is updated every minute.

In some embodiments, the training of the device type identification ML mode and/or the energy usage classification ML model includes generating a power signature for a time segment by capturing readings in unison for a plurality of drawn power characteristics. In some embodiments, the power signature includes captured readings for one or more or all of an AC line voltage of the outlet, an AC line current of the outlet, a frequency of the AC, a reactive power drawn, an active power drawn, and an apparent power drawn and a power factor (comprising active power/apparent power) which are associated with an identifier for the device type of the device drawing the power. In some examples, the power characteristics are read in unison and are sampled at a frequency of 3 Hz.

According to some embodiments, an energy usage classification includes either a wasted energy classification or a not wasted energy classification. In some examples, an energy usage classification may further include an indication of the amount of carbon emissions associated with the use of the wasted or not wasted energy.

According to some embodiments, the power drawn characteristics include locally determined values for AC line voltage, drawn current, AC line frequency, active power, reactive power, apparent power and power factor data sampled at a frequency of 3 Hz.

According to some embodiments, the training data includes user input data captured in response to presenting a prompt on the device and/or another device for a user of the device to input data labelling one or more of: a use of the device when drawing power from that outlet; and/or an energy usage classification.

In some embodiments, when generating the training data, the method further includes generating a prompt for a user of a device which has engaged with the outlet to label data from that outlet and/or the device identity and/or the usage classification. In some embodiments, the prompt is generated when the device is plugged into the outlet as a displayed or announced prompt on one or more of a display of the device, the outlet, or another device, such as a mobile phone for example, of the user.

In some of the above embodiments of the method of determining an energy usage classification using an energy usage classification ML model, the device type identifier, one or more power characteristics of power drawn by the device at time t, are provided by a ML model comprising a device type identifier ML model as disclosed herein.

In some embodiments, the methods of determining the device type identifier and energy usage classification are implemented by a remote energy monitoring system which receives data reported by a microcontroller of a power socket as disclosed herein.

According to some embodiments, the device type identifier for the device, and at least a time-stamp for the start of energy being drawn from the outlet by the device are determined using the device type identifying ML model.

Advantageously, by using a device type identifying ML model, a type of device can be detected even if different devices are connected to the same outlet at different times.

According to a fifth aspect there is provided a method for determining an energy usage classification for power drawn from a power outlet of a power socket by a device, the method including: receiving, by an energy usage classification ML model trained using the method of the fourth aspect, an input vector including at least one or more power characteristics of power drawn by the device from the power outlet captured in a time segment and an identifier for a device type of the device; determining an energy usage classification using the trained energy usage classification ML model; and outputting an indication of the determined energy usage classification.

In some embodiments of the fifth aspect, the method is performed by a microcontroller provided on the power socket of the first embodiment.

According to some embodiments, outputting further includes outputting an indication of at least a type of energy usage and/or a device type identifier for the device.

According to some embodiments, the method further includes the energy usage classification ML model receiving additional information associated with the time segment of an input vector from a plurality of different known data sources.

According to some embodiments, an energy usage classification includes a wasted energy classification based on one or more of: a location of a user of the device being more than a predefined distance from the power outlet from which the device is drawing power; a determination that user input has not been detected by the device in a period of time; and an operational state of the device.

In some examples, the location of the user is determined using related information from one or more of the energy-related information data sources include: a schedule for the user; a building access system for the building where the socket is located and/or another building access system where the user is determined to be located; and normal working hours information for the user.

According to a sixth aspect there is provided a method for indicating an energy usage classification for a device drawing power from a power outlet of a power socket, the method including: using the method according to the fifth aspect to determine an energy usage classification for the power drawn from the power outlet by the device; and generating a control signal to cause an indication of the determined energy usage classification to be displayed by an energy usage indicator on the power socket.

According to some embodiments, the energy usage classification includes a wasted energy classification.

According to a seventh aspect there is provided a method for controlling power to a plurality of sockets, the method including: using an energy usage classification method to determine energy usage classifications for each one of the plurality of power outlets; determining the plurality of power outlets form a group of power outlets associated with a set of power consumption rules; determining a plurality of the power outlets of the group are providing energy determined by the ML model to have a wasted energy usage classification; and, in dependence on at least one rule of the set of power consumption rules for the group of sockets, selectively actuating a relay on each one of one or more or all of the outlets of the group to turn off the delivery of power by the selected outlets.

In some embodiments, individual power outlets on power sockets can be grouped together. In some embodiments, a power socket can have 2 outlets, but only one outlet might be in a wider group.

According to an eight aspect there is provided apparatus including a memory, a processor, and computer program code stored in the memory which when executed by a processor causes the apparatus to perform at least one of the previous method aspects.

According to a ninth aspect there is provided a computer program product including computer code which, when executed by a processor, implements at least one of the previous method aspects.

According to a tenth aspect there is provided a power management system including an energy monitoring system, wherein the power management system includes: a plurality of power sockets according to any of the power socket aspects; and at least one apparatus aspect implementing one or more or all of the above method aspects.

In some embodiments, the energy monitoring system is configured to implement a method including: using an energy usage classification method to determine energy usage classifications for each one of the plurality of power outlets; determining the plurality of power outlets form a group of power outlets associated with a set of power consumption rules; determining a plurality of the power outlets of the group are providing energy determined by the ML model to have a wasted energy usage classification; and, in dependence on at least one rule of the set of power consumption rules for the group of sockets, selectively actuating a relay on each one of one or more or all of the outlets of the group to turn off the delivery of power by the selected outlets.

According to some embodiments, the system further includes a data interface for receiving input from a user of the system, the input including instructions to configure one or more power consumption rules for the delivery of electrical power via one or more power outlets of selected power sockets.

According to some embodiments, user input configures at least one rule of the set of power consumption rules for a group of sockets which may be used to selectively actuate a relay on each one of the one or more or all of the power outlets of the group of power outlets.

According to an eleventh aspect, a method for controlling electrical power from a plurality of power sockets, each power socket comprising one or more power outlets, includes:
   determining, based on power profiles including at least power drawn characteristics and a device type identifier associated with a power outlet identifier for each one of a plurality of power outlets of a group of associated power sockets, which of the plurality of power outlets is providing wasted energy according to the energy usage classification ML model; and,
   in dependence on a set of power consumption rules for the group of sockets, selectively causing the power sockets to switch off the delivery of power to one or more or all of their associated power outlets.

In some examples of above aspects and embodiments, a power profile comprises at least a device type identifier and a set of power drawn characteristics for that type of device. In some examples of the power profile, the power profile includes a power outlet identifier and/or a power socket identifier. A power profile may not be unique to particular device type and/or consumption pattern.

In some embodiments, a power consumption rule sets a goal of the group of sockets to reduce energy consumption, for example, by a percentage of the currently consumed power.

In some embodiments, the rules indicate a hierarchy for the plurality of power sockets and/or power outlets of the power sockets, wherein power sockets which are lower in the hierarchy are first switched off before power sockets higher in the hierarchy. Advantageously, in some example, an entity controlling a demand side response can configure and/or dynamically reconfigure power consumption rules.

In some embodiments, the set of power consumption rules set a percentage of power to be reduced and indicate a hierarchy of sockets to be switched off in the order of the hierarchy until the reduction is achieved. In some embodiments, the rules cover power consumption in the building, region, city or other metropolitan area, or country.

In some embodiments of any of the method or power socket aspects, a power socket is installed in a wall, floor or ceiling socket in a building connected to a mains frequency A/C power supply, alternatively, the power socket may be provided as a removable extension socket which plugs into such a wall, floor or ceiling socket. In some embodiments, the power socket is installed in a vehicle, train, plane, boat. In some embodiments, the power socket is installed in a portable power pack. In some embodiments, the power socket is installed in an item of furniture. In some embodiments, the power socket is installed outdoors, for example on the outside of a building, as a garden power socket, or for example, as an item of garden or street furniture. A power socket may include one or more fused spur form of power outlet where a device is wired to the outlet and/or a "socket" form of power outlet, where an energy consuming device forms a releasable connection with the power outlet.

Various other power sockets aspects set out herein may include and be combined with any one or more of the embodiments of the first power socket aspect including but not limited to:

Another aspect of the electrical power socket may be configured to reduce wastage of electrical energy by a connected electrical power consuming device, the electrical power socket comprising: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein, the captured monitored data is used by a machine-learning model running on the microcontroller to determine if the captured monitored data includes data indicated wasted energy and/or to determine a type or energy profile of the connected electrical power consuming device.

The captured monitored data may be used by a machine-learning model running on the microcontroller to determine if the captured monitored data includes data indicated wasted energy and/or to determine a type or energy profile of the connected electrical power consuming device when the micro-controller is in an off-line state disconnected from the remote energy monitoring system.

Another aspect of the electrical power socket may be configured to reduce wastage of electrical energy by a connected electrical power consuming device, the electrical power socket comprising: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein the power socket further includes for each power outlet a plug engagement detection mechanism configured to detect at least one pin of the plug in that power outlet independently of whether an electrical device is drawing power via the plug from that power outlet.

Another aspect of the electrical power socket may be configured to reduce wastage of electrical energy by a connected electrical power consuming device, the electrical power socket including: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein the power socket further comprises at least one software-controlled tactile switch configured to turn on and off the delivery of power via the power outlets.

The power socket may be configured to detect a tap gesture by a user which actuates the software controlled tactile switch, and responsive to the tap gesture, delivers power through at least one of the one or more power outlets.

The captured monitored data may be used by a machine-learning model running on the microcontroller to determine if the captured monitored data includes data indicated wasted energy and/or to determine a type or energy profile of the connected electrical power consuming device.

Another aspect of the electrical power socket may be configured to reduce wastage of electrical energy by a connected electrical power consuming device, the electrical power socket including: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein the power socket is further configured to implement a demand-side response to a network power grid power demand by: receiving one or more demand-based signals from a remote server; and responsive to receiving the one or more demand-based signals, turning at least one relay on or off to control delivery of electrical power via the one or more power outlets.

The captured monitored data may be used by a machine-learning model running on the microcontroller to determine if the captured monitored data includes data indicated wasted energy and/or to determine a type or energy profile of the connected electrical power consuming device.

Another aspect of the electrical power socket may be configured to reduce wastage of electrical energy by a connected electrical power consuming device, the electrical power socket including: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein the power socket is configured to detect a tap gesture by a user, and responsive to the detection of the tap gesture, delivers power through at least one of the one or more power outlets.

The captured monitored data may by used by a machine-learning model running on the microcontroller to determine if the captured monitored data includes data indicated wasted energy and/or to determine a type or energy profile of the connected electrical power consuming device.

Another aspect of the electrical power socket may be configured to reduce wastage of electrical energy by a connected electrical power consuming device, the electrical power socket including: one or more electrical power outlets; a power input configured to supply power to each of the one or more power outlets; at least one relay configured to control delivery of electrical power via the one or more power outlets; a power monitor configured to monitor the operational state of each power outlet and one or more characteristics of power drawn from each power outlet by a connected electrical device; and a microcontroller, wherein, the microcontroller is configured to: capture power monitored data representing the operational state of each power outlet and one or more characteristics of power drawn from each power outlet by the connected electrical device; send the captured power monitored data via a data network interface to a remote energy monitoring system; receive data from the remote energy monitoring system; and control the at least one relay to manage delivery of power via a power outlet responsive to a determination, based at least in part on the received data, that the power outlet is delivering power associated with a wasted energy usage classification to at least one device, wherein the power socket is further configured to: receive signals indicating greenhouse gas emissions associated with power provided to the power socket; and responsive to the received signals indicating that greenhouse gas emissions associated with power drawn by a connected electrical device are above a greenhouse gas emissions power supply cut-off threshold, turn off the at least one relay to control the flow of power drawn by the connected electrical device.

In some embodiments, responsive to the received signals indicating that greenhouse gas emissions associated with power drawn by a connected electrical device are below a greenhouse gas emissions power supply cut-off threshold, the microcontroller is configured to turn on or maintain the at least one relay to control the flow of power drawn by the connected electrical device.

In some embodiments, the captured monitored data is used by a machine-learning model running on the microcontroller to determine if the captured monitored data includes data indicated wasted energy and/or to determine a type or energy profile of the connected electrical power consuming device.

The embodiments mentioned above in relation to one aspect may be also embodiments of one or more of the other aspects, where appropriate. One or more of the above embodiments may be combined with other embodiments of the same or of another aspect in any suitable manner apparent to someone of ordinary skill in the art.

Effects and features of the above aspects are to a large extent analogous to those described above in connection with the first aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

Figure 13A:
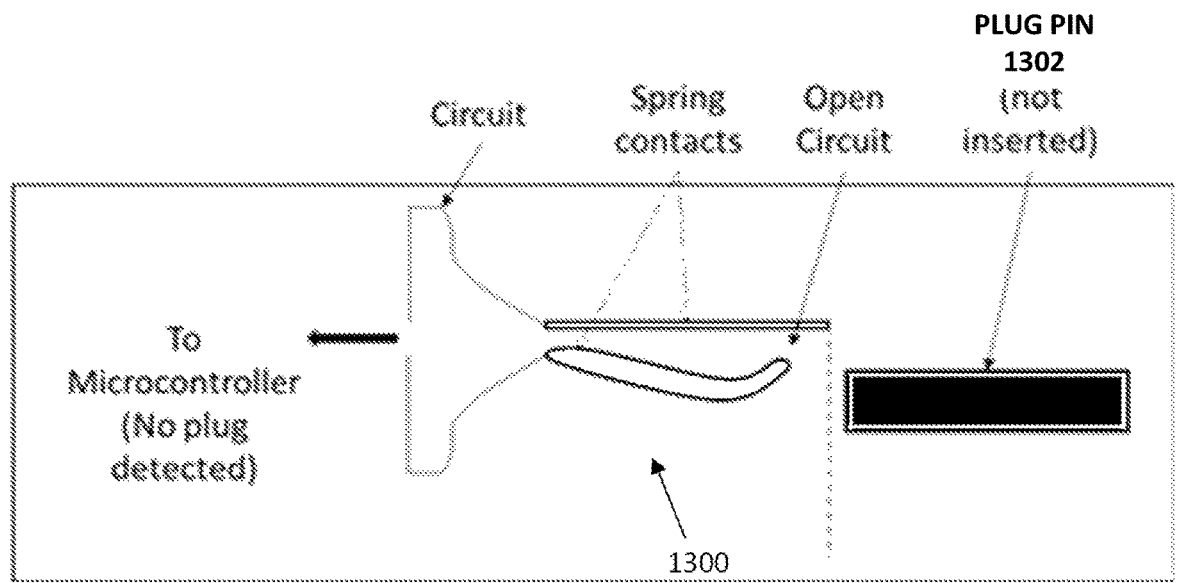
FIG. 13A shows schematically an example electrical design of a physical plug engagement detection mechanism of an electrical power outlet according to an embodiment of the present disclosure in the case where a plug is not physically present in the socket of the electrical power outlet according to some embodiments of the present disclosure.
Figure 13B:
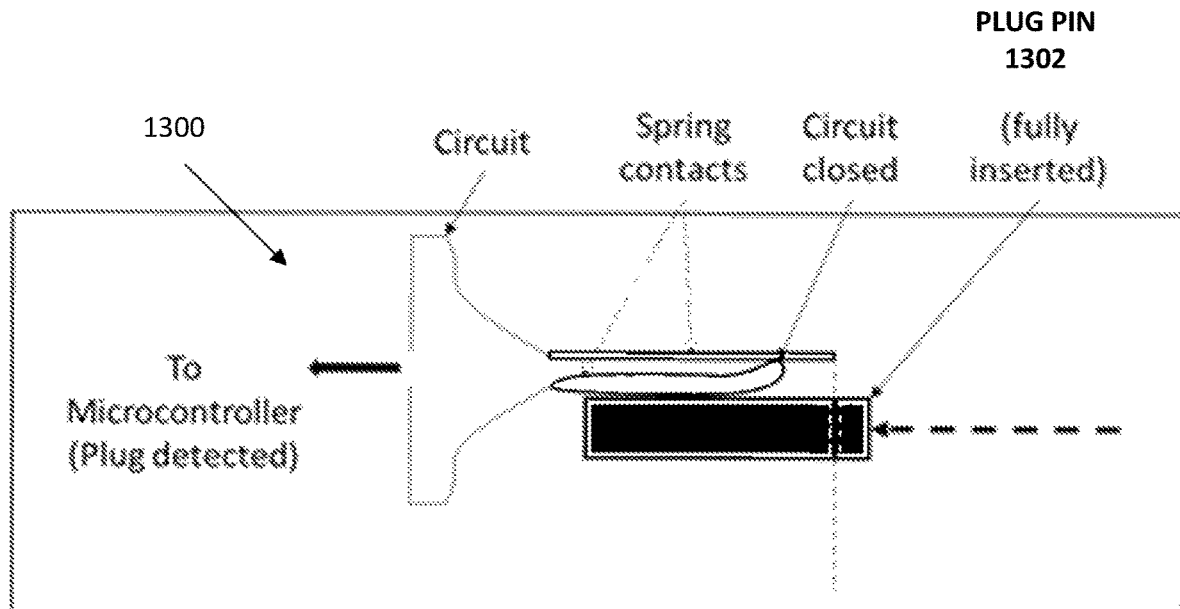
Figure 14:
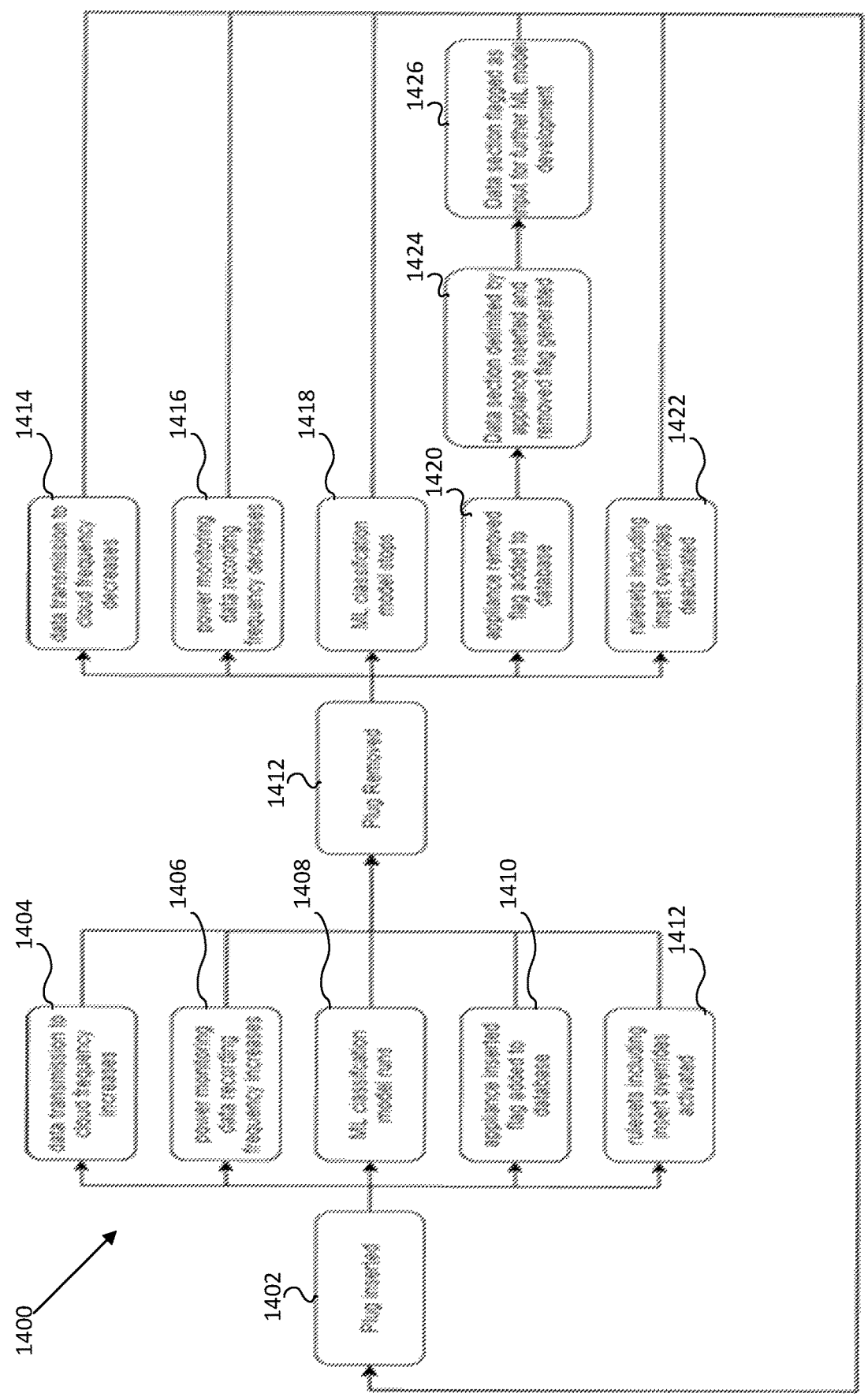

FIG. 13B shows schematically an example electrical design of the physical plug engagement detection mechanism of FIG. 13B in the case where a plug is physically present in the socket of the power outlet according to some embodiments of the present disclosure; and FIG. 14 shows schematically an example flow diagram for a method of detecting the physical presence of a plug in a socket of an electrical power outlet according to some embodiments of the present disclosure.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
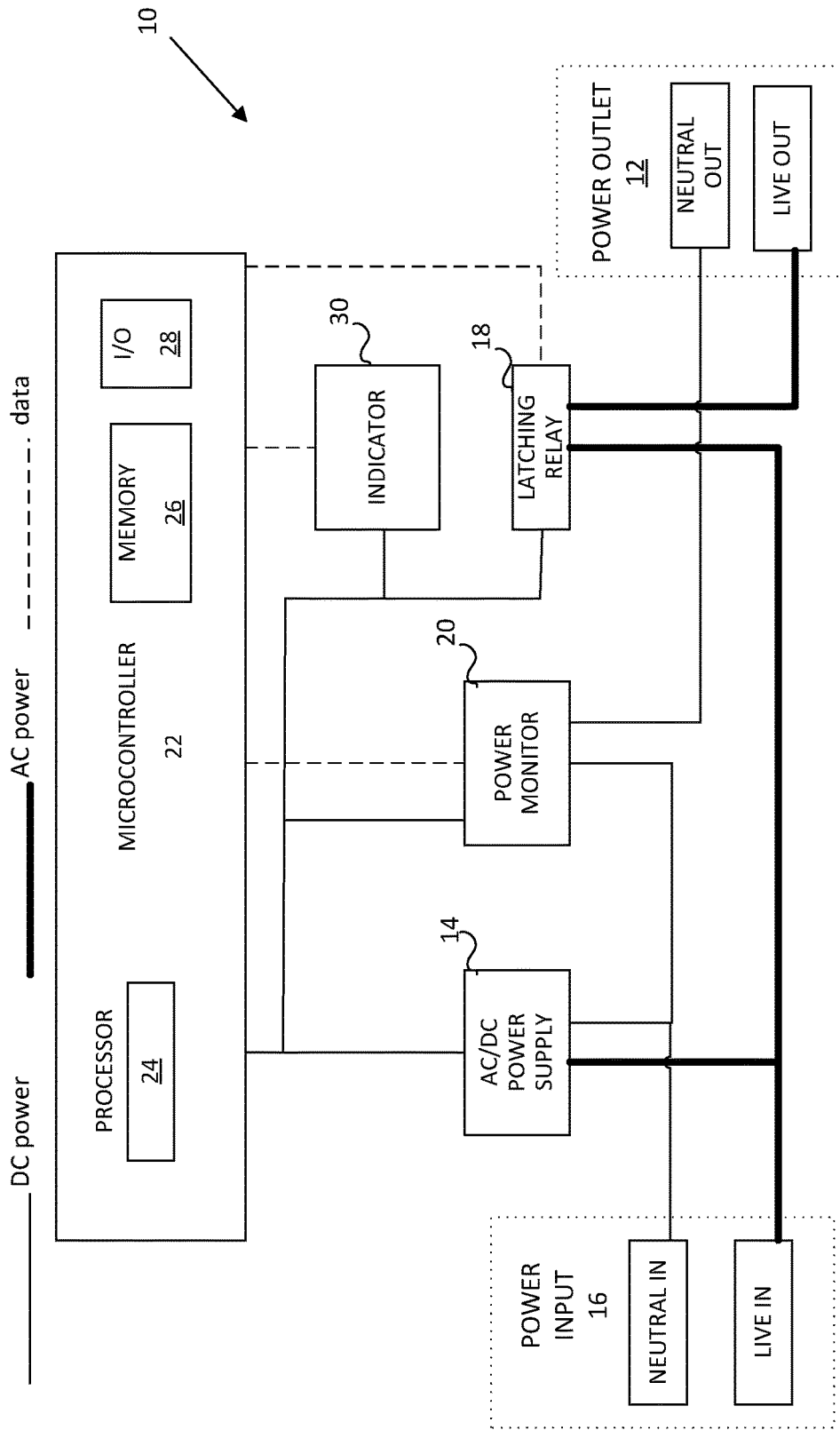
FIG. 1 shows a schematic connection diagram for a power socket according to an embodiment of the present disclosure.

FIG. 1 shows a schematic connection diagram for a power socket 10 according to an embodiment of the present disclosure, for example, according to the first aspect. The example embodiment illustrated in FIG. 1 shows an electrical power socket 10 for reducing wastage of electrical energy as part of an energy monitoring system disclosed herein. The references to a power socket or power outlet of a power socket disclosed in the following description should be considered to also include references to a fused spur where an appliance is hard wired to a fused connection. Such fused spurs are often used for domestic appliances such as refrigerators and/or cooking appliances.

FIG. 1 accordingly illustrates an embodiment of an electrical power socket 10 for reducing wastage of electrical energy, the power socket 10 including: one or more electrical power outlets 12; a power input 16 configured to supply power to each of the one or more power outlets 12; at least one relay 18 configured to control delivery of electrical power via the one or more power outlets 12; a power monitor 20 configured to monitor the operational state of each power outlet 12 and one or more characteristics of power drawn from each power outlet 12; and a microcontroller 22, the microcontroller 22 being configurable to: capture monitored data; send the captured data via a data network interface 28 to a remote energy monitoring system; receive data from the remote energy monitoring system; and control the at least one relay 18 to manage delivery of power via a power outlet 12 responsive to a determination the power outlet 12 is delivering power associated with a wasted energy usage classification.

In some embodiments, the wasted energy usage classification is indicated in the data received from the remote energy monitoring system.

In some embodiments, the determination the power outlet is delivering power associated with a wasted energy usage classification is made using one or more of: data received from the remote energy monitoring system indicating energy is being wasted; and a ruleset for the outlet 12 and/or the socket 10 to provide power. In some examples, the data received indicates a confidence score for an energy classification of wasted or not wasted which is processed with the ruleset to determine if the power outlet is delivering power associated with the wasted energy usage classification.

Although only one power outlet is shown in FIG. 1, it will be apparent that the power socket 10 includes one or more electrical power outlets 12 in some embodiments.

In the illustrated example of FIG. 1, each power outlet is configured to provide live and neutral AC current from AC/DC power supply 14 to a connected device (not shown in FIG. 1). Some examples of a power outlet 12 have a form suitable to receive a two pin plug (for example, if no earth is connected) or three pin plug (for earthed connections) or even a single "pin" plug such as a USB port in some examples. In some examples, more "pins" may be supported if additional data connections are being made via the outlet, such as may be used to connect a vehicle to a trailer etc. FIG. 1 also illustrates a power input 16 configured to supply power to each of the one or more power outlets 12 of the power socket 10 via the AC/DC power supply component 14 (only one power outlet is shown in FIG. 1, but in some examples, a power socket 10 may support two, three or more outlets).

The power socket 10 includes at least one relay 18 configured to control delivery of electrical power via the one or more power outlets 12. Preferably the at least one relay 18 is at least one latching relay 18 as shown in FIG. 1 as this reduces the amount of power required to maintain the relays state after it has switched states. Switching the relay 18 changes the operational state of one or more power outlets 12 to either cause power to be available or to be unavailable from the one or more power outlets 12 (i.e. it turns the power on/off from a power outlet 12). In some embodiments, each outlet 12 has a latching relay 18 to control its operational state, however, in some embodiments, a single latching relay 18 controls the operational state of a plurality of power outlets 12.

The power socket 10 shown in FIG. 1 also includes a power monitor component 20 which is configured to monitor the operational state of each power outlet 12 of the power socket 10. The power monitor 20 also monitors one or more characteristics of the power drawn from each power outlet 12 when it is operational.

The microcontroller 22 of the power socket 10 of FIG. 1 includes a processor component 24, a memory 26 and at least one data input/output interface 28 which comprises at least one transmission/receiving interface, for example, an air interface for wireless communications over a Wi-Fi and/or another suitable wireless communications network. In some examples, the data input/output interface component(s) 28 of the power socket 10 include a suitable data interface to support input from a device using a short-range wireless communications protocol, for example, over near-field communications, NFC, or a Bluetooth™ channel in addition to supporting longer-range, e.g. Wi-Fi communications.

The micro-controller 22 is configured in use to capture data monitored by the power monitor 20, to send captured data via data network interface 28 to a remote energy monitoring system (note shown in FIG. 1) and to control the at least one relay 18 to manage delivery of power via a power outlet responsive to a determination the power outlet is delivering power associated with a wasted energy usage classification. The captured data may be captured as a data stream from the power monitor component 20 and/or may be captured from memory 26, such as a flash memory or any other suitable type of data store and reported at intervals to the remote energy monitoring system.

Some of the embodiments of the power socket illustrated in FIG. 1 are described herein above in the summary statements section.

Some embodiments of the power socket 10 comprise a smart power socket, for example, a standard electricity power socket or a 'fused spur' that can measure multiple variables of power, control power flow to a plugged-in or wired-in device, and communicate and interact with an external 'user device', for example, a mobile smart phone, tablet, personal computer, or a remote server system to indicate information related to energy consumption.

The power socket 10 is network-enabled via its micro-controller which allows data to be transmitted and received to and from the power socket.

The power socket 10 includes a printed circuit board (PCB) that may take various form factors to accommodate physical dimension differences between power socket standards across different countries, differences in number of sockets and connections on the power socket, for example, single, double, triple socket, differences in superficial designs e.g. flush, proud, floor box sockets, metal, plastic etc., fused spurs.

The power socket 10 also includes an enclosure (not shown in the example embodiment of FIG. 1) which serves the purpose of containing the PCB and ensuring safe and accurate connecting of devices and/or appliances to the PCB.

The PCB contains componentry required to perform the functionality of the power socket illustrated in FIG. 1. The functionality includes power measurement functionality, power control functionality and display functionality via an indicator 30 shown in FIG. 1. In some embodiments, indicator 30 comprises one or more lights such as LEDs whose colour, operational state, intensity of colour or a flashing sequence may indicate energy related information, for example, an RGB LED whose colour is controlled via microcontroller 22. In some embodiments, however, a display may provide one or more symbols and/or alphanumeric characters to convey energy related information on the socket.

Other functionality provided by the power socket of FIG. 1 includes reset functionality to reset the microcontroller and/or other components of the PCB, network connectivity and connection monitoring of the connection with a remote energy monitoring system, and a data cache to store the measured variables (for example, in memory 26). In some examples, memory 26 is on-board chip memory such as an EPPROM chip, but in some examples, memory 26 is a detachable form of flash memory, for example, which could be plugged into the power socket, or removably installed within the socket enclosure.

Additional functionality that some embodiments of the power socket support include user registration.

Not shown in FIG. 1 for clarity are any supporting components such as, for example, passives, drivers and isolation circuitry which would be apparent to anyone of ordinary skill in the art to include. Some of these supporting components will vary according to the specific model form requirements of the power socket and regulations for the country of installation, for example, to meet requirements for electrical design such as filtering, isolation and EMI protection.

In some embodiments, the power monitor 20 includes power monitoring integrated circuitry which uses shunt resistors to calculate current flowing to each outlet 12 of the power socket 10. In some embodiments, the power monitoring IC uses a voltage divider to measure the line voltage of the AC line. Using these inputs, the IC calculates the Voltage, Current, Active Power, Reactive Power, Apparent Power and Power Factor. In some embodiments, the measurements are sampled three times a second, i.e. at 3 Hz, or faster.

In some embodiments, latching relay 18 operates in the same fashion as a standard relay using a relatively low-power electromagnet to switch a higher-powered load. In some embodiments of the power socket 10, a relay coil is energized to switch the load on, then using a reverse polarity voltage signal, the load is switched off. An example voltage for the relay coil is a 3.3. Volt relay coil. However, if relay 18 includes a latching relay as shown in FIG. 1, once switched, the switching mechanism 'latches' in place, meaning that the coil can be de-energized after the switch. This means that the Power socket uses no power to operate the relay other than when switching on and off. The relay coil is driven using a suitable driver, for example, a standard 'H Bridge Motor' driver, to generate the reverse polarity signals.

In some embodiments, indicator 30 comprises a RGB LED. In some embodiments, the RGB LED is a single package LED that has input control pins for each colour channel. The colour and intensity of the light is controlled using Pulse-Width-Modulation signals for each channel from the microcontroller. The signals are sent via transistors to allow enough current to flow through the Led and to protect the general processor input/output (GPIO) of the microcontroller.

In some embodiments, the microcontroller circuitry 22 of the PCB of the power socket 10 manages all other components on the PCB. It gathers data from a UART connection of the Power Monitor IC 20, sends data to the network via the networking IC of I/O 28, controls the switching of the relays 18, controls the indicator 30, for example by changing the colour and intensity of the RGB LED, stores values from the UART of the power monitor 20 to memory 26 (for example, to a flash memory chip or drive).

In some embodiments the power socket 10 further includes a magnetic field detector 32 (not shown in FIG. 1), such as for example, a Hall sensor. In some embodiments of the power socket 10, the microcontroller 22 is configured to read data using the Hall sensor to measure magnetic fields.

In some embodiments, the I/O interface 28 of the power socket 10 includes networking IC that takes data sent from the microcontroller 22 and transmits it over a wireless network.

Some embodiments of the power socket include a secure RFID tag. In some examples, the secure RFID is a passive device not attached to the PCB in the socket. The RFID tag contains a unique ID for the power socket which can be read using an RFID reader held near the enclosure or case of the power socket 10.

In some embodiments, memory 26 comprises flash memory. The flash memory of the power socket 10 may be a separate device or built-in to the microcontroller 22. The flash memory stores the power drawn characteristic readings from each of the power outlets 12 the Power Monitor IC until they are transmitted to the network. The power drawn characteristics may be also associated with an identifier for the power outlet 12 they are associated with if more than one power outlet 12 is provided by the power socket 10. Each measurement of a power drawn characteristics is time-stamped and may be provided as a parameter value pair or as a set of parameter values for a given time-segment. The measurements of power drawn characteristics are preferably determined in unison so that a set of different power drawn characteristics can share the same time-stamp.

In some embodiments, a surge protector (not shown in FIG. 1) is built into the PCB protects both the power socket and any device plugged into an outlet 12 of the power socket 10 from voltage spikes.

In some embodiments of the power socket illustrated in FIG. 1, each component requires line-level Direct Current (DC) power (for example, 3.3 v) to operate, this is provided by an AC/DC power supply unit (PSU) 14 embedded on the PCB. The PCB contains a set of main electrical grid input terminals 16: live AC, neutral AC (for example, a 240 v or 110 v AC) and ground in some examples. The PCB also has one or more output terminals 12 which connect onwards to the appliance being powered. Depending on form factor, this can be either a standard plug socket or a set of terminals for direct wiring live AC, neutral AC and ground. The neutral AC and live AC input terminals are also connected to the AC/DC PSU to provide power. The neutral AC input is connected to the neutral AC output, this connection is broken by a shunt resistor. The shunt resistor is connected to the power monitoring IC. The live AC input is connected to the live AC output, this connection is broken by the latching relay 18. The latching relay 18 prevents electrical connection between the input and output live AC until it is closed by a signal from the network-enabled microcontroller IC 22.

The power monitor comprises an IC or other form of circuitry which is configured to measure voltages substantially faster than 3 hz and uses a calculation engine to calculate power monitoring values. These power monitoring values are read from the power monitoring IC using the microcontroller at frequencies of 3 hz in some embodiments. However, in some embodiments, the microcontroller acquires power readings from the power monitoring IC at a different frequency than 3 Hz. The different frequency be a similar frequency in the region of 3 Hz where the values are read in real-time or with a time-delay from a buffer where the power monitor has temporarily stored them. However, in some embodiments, the values are read, for example, at a different frequency, for example, a frequency selected from a range between 1 Hz to 5 Hz may be used, or from a range between 0.5 Hz to 3.5 Hz, or 2.5 Hz to 3.5 Hz or a frequency above 3 Hz in some embodiments, such as 20 Hz or higher, for example orders of magnitude. The frequency at which the voltages are measured and/or read may affect the range of features which may be determined by the energy monitoring. As the frequency at which the characteristics of power drawn are sampled and modelled at increases, the larger the amount of detail and variety of information about the power drawn and/or the device type can be obtained.

In some embodiments, the current and/or other power drawn characteristics are measured. In some embodiments, at least the voltage is measured at an accuracy level of 0.1%. It communicates measurements by way of a Universal Asynchronous Receiver/Transmitter (UART) serial connection, to the network-enabled microcontroller for further processing.

In some embodiments, one or more of the following power characteristic variables are measured: Frequency, Voltage, Amps, Active power, Reactive power, Apparent power, Power factor.

In some embodiments, a frequency of power measurement of 3 Hz or higher used as this was found to enable the Machine Learning functionality (described in more detail later herein below) to be suitably accurate.

In some examples, the power socket 10 is compliant with the European Measuring Instrument Directive (MID) that requires meters dedicated to invoicing purposes to comply with certain accuracy characteristics (MID—2004/22/EC). The power socket accuracy level is in some embodiments 0.1% amongst other power measurement specifics to make it suitable for comprising a meter for 'billing' and 'monetisation' purposes.

The latching relay 18 breaks the connection between the live AC input and output, allowing power to flow when the relay's contacts are closed. The relay's on or off position is controlled by a signal sent from a connection to the network-enabled microcontroller IC 22 by way of a driver IC. The control signal is sent from the power socket system software described in more detail later below.

In some embodiments, a user is able to interact with the power socket using a user interface on another device such as a mobile phone, tablet or computer, or remote server system to request a power socket control function. When the power socket system software receives the request via a data interface of I/O 28, it processes the control request, and if the request meets one or more acceptance or security conditions, it will activate the relay and turn on/off a power outlet 12 of the socket 10.

In some embodiments, the indicator 30 includes a RGB LED is powered from the DC voltage supplied by the AC/DC PSU. The color and brightness of the LED is controlled from the network-enabled microcontroller. The values for the light color control are sent from the power socket system software.

In some embodiments, the power socket 10 has network connectivity from either connecting the microcontroller 22 to a separate networking IC or the microcontroller uses an integrated networking, for example, as part of I/O 28. The networking may be enabled using suitable components for using one or more wireless communications networks such as mobile/cellular, LPWAN, Wi-Fi, Bluetooth or LoRaWAN. A wired communications network could be used in some embodiments, either a separate communications connection or by sending signals over the AC supply, e.g. using a powerline data connection.

Embodiments of the power socket 10 may use one or more of the following network types depending upon specific device implementation, which all provide the same communications function, but use different network protocols to transmit data: Wi-Fi or any similar radio wireless local area networking of devices based on the IEEE 802.11 standards, mobile/cellular Network, for example, 3G, 4G, 5G or a 6G or later standardised mobile communications network, LPWAN (low-power wide-area network) or any similar a type of wireless telecommunication wide area network designed to allow long range communications at a low bit rate among things (connected objects), Bluetooth or any similar short-range personal area network (PAN) radio protocol operating between the 2.402 ghz-2.480 ghz frequency range.

Some embodiments of the power socket support user registration and identification using a Secure RFID Tag hardware module to enable an external device, capable of RFID communication, to identify the particular System Device. The System Device's RFID tag is a 'passive type', meaning it is not powered or directly connected to any other Power socket 10 components. By using an external device to identify the Power socket, a number of software related functions can be implemented by the external device to control the power socket. For example: registering a user to a particular power socket before the Power socket provides power. This allows the energy provided to be associated with a user account of the user, for example, for a limited amount of time or for certain amount of energy, and for the user to be charged for that amount of energy used over that time period. Another function is registering an administration or support user to diagnose issues or change/update the firmware on the power socket 10 (for example, setting a re-calibration routine for power measurement).

Firmware

Some embodiments of the power socket 10 include components which are controlled via a software 32 that is programmed onto the microcontroller IC 22. This software 32 is also referred to as firmware and provides the power saving functions by turning on/off and/or reducing functionality of certain components of the power socket under specific conditions in order to reduce the power consumption of the overall hardware of the power socket itself.

Other examples of functionality which some embodiments of the software 32 provide include:

Hardware Data Encryption—to encrypt data on the power socket preventing unauthorised users from copying sensitive data from a device.

Network Connectivity Setup—The firmware is programmed to allow itself to be connected to a relevant network in the case it isn't already connected to a network.

Data Transmission to the power socket system software.

The firmware 32 of the microcontroller 22 is set to control the power socket 12 in order to reduce the power socket 12 and/or a connected device's overall energy (or power) consumption. The power socket 12 uses the software system 32 to send captured data from the power monitor 20 to the memory 26. The duration of the intervals is dynamic in some embodiments. In some embodiments the intervals can be selected by a user by using an application on another device associated with the power socket via a user interface.

Figure 2:
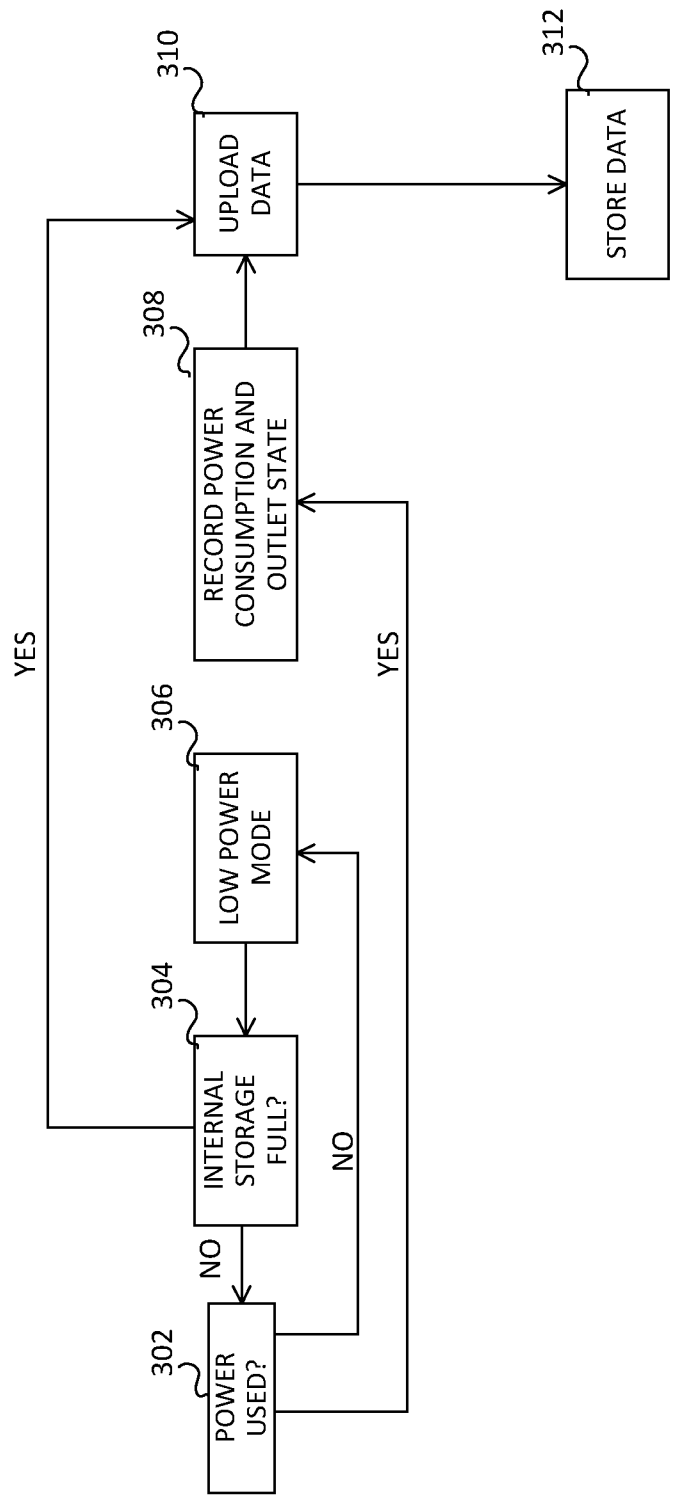
FIG. 2 shows a schematic flow chart of the power socket data recording process according to an embodiment of the present disclosure.

FIG. 2 illustrates schematically an example flowchart for an embodiment of how the software 32 controls the power socket 10 to save energy by controlling the storage of captured data in memory 26. Some embodiments of software 32 as shown in FIG. 2 are configured so that when the power socket 10 detects (step 302) that no power is being drawn or that the latching relay 18 is turned off, the software system 32 causes the power socket to enter (step 306) a low power mode and automatically increases the length of the intervals between capturing readings of the power drawn characteristics to save power. Once power provision is requested, the power monitoring hardware will resume at the previous interval (step 308) and will upload data (step 310) either as a stream or at various upload intervals to a remote monitoring system (for example, see remote energy monitoring system 40 of see FIG. 3). The software also checks when memory 28 is full in the low power mode (step 304) and this may be used to trigger data being uploaded to a remote energy monitoring system in step 310. The remote monitoring system receiving the captured data stores this (step 312) in a database or other suitable memory structure for all of the power sockets configured which are providing the energy monitoring system which data on their power drawn characteristics/power consumption and on/off power state outlets.

In this manner, a remote energy monitoring system is able to make a determination that the power outlet is delivering power associated with a wasted energy usage classification.

In some embodiments, the power socket determines an energy usage classification using one or more of: a signal from the remote energy monitoring system indicating energy is being wasted; a ruleset for the outlet and/or the socket to provide power.

Device Reset (Magnetic)

In some embodiments, the power socket 10 is configured to be restarted without interrupting the delivery of AC power via the socket's outlets 12 to any connected device(s). All data stored in flash memory is preserved in a reset. In some embodiments, the power socket 10 includes a Hall Sensor which sends data directly to the microcontroller IC 22. This sensor is used to detect an external magnet field, when the magnet is detected, the power socket is put into a reset routine.

In some embodiments, the power socket goes into a selected reset routine based on the deployment of the power socket, for example: a standard reset routine; when the magnet is detected, the power socket resets itself (the IC only, not the actual power delivery); and/or a secure reset routine. In some embodiments, when the magnet is detected, the power socket searches for a pre-programmed Wi-Fi signal (which in a secure reset situation, would be brought by a System technician and turned on prior to reset). If the signal is detected, the Power socket connects to the Wi-Fi for the technician to debug the Power socket or change parameters, when disconnected, the Power socket resets itself.

In some embodiments, a power socket 10 is a member of a group of one or more power sockets 10 which may initially or later need new Wi-Fi network information, for example, for a new building tenant. When a power socket in the group senses that no previous networks are visible and that a reset Wi-Fi SSID is visible, for example, from a technician's device servicing the power socket, that power socket and any other group power socket members will automatically connect to the reset Wi-Fi to have new client Wi-Fi details uploaded and then erase all previous Wi-Fi details.

Fail Safe Conditions

In some embodiments, failsafe conditions are implemented in one or both hardware and firmware depending on the deployment of the power socket 10. In the hardware implementation, power socket 10 includes a separate circuit to the microcontroller 22 to bias the voltage to the relays in the event that the microcontroller fails. The microcontroller 22 will output a 'heartbeat' signal to the circuit continuously, if the signal is lost (due to a failure in the microcontroller) the signal to the failsafe circuit will be lost and the circuit will bias the relay to maintain a constant OFF or ON state. This is designed into the hardware and is chosen before the power socket 10 is deployed. The firmware implementation of the failsafe covers any 'fail' conditions that do not include failure of the microcontroller 22 itself such as network loss or failure to connect to the cloud. These conditions are detected by the microcontroller 22 and a pre-programmed routine is entered in which the relays 18 remain controllable offline. An example situation would be one in which an office requires power for important work, but the office internet has gone down. The power sockets 18 would detect the network loss and the pre-programmed failsafe routine would be to turn all sockets on, allowing the office to continue working even without internet.

In some embodiments, the power socket 10 features a firmware algorithm which allows the power socket to manage itself where a certain condition or ruleset has been breached. The condition or ruleset can be hardcoded (such as a current limit, e.g. a 13 Amp limit on use) or through a soft-coded ruleset. In either case the power socket 10 is acts independently and not through a connection to the remote monitoring system software to implement a form of edge computing.

The firmware algorithm automatically causes the power socket 10 to turn power provision off to a device attached to a power outlet 12 of the power socket where a condition or ruleset has been breached. The power socket 10 then waits a given time frame and turns power back on. If the breach is still evident, it again turns power provision off. However, after the second breach, the off-period time frame is increased by a set amount of time according to the number of breaches that have occurred. This process keeps repeating itself until either the breach is resolved or the remote energy monitoring system software sends a specific 'override' command. The time frames are adjustable, however initially they are set as 10 seconds+15 seconds per number of breaches (e.g. on the third breach the time off would be 40 seconds).

Figure 3:
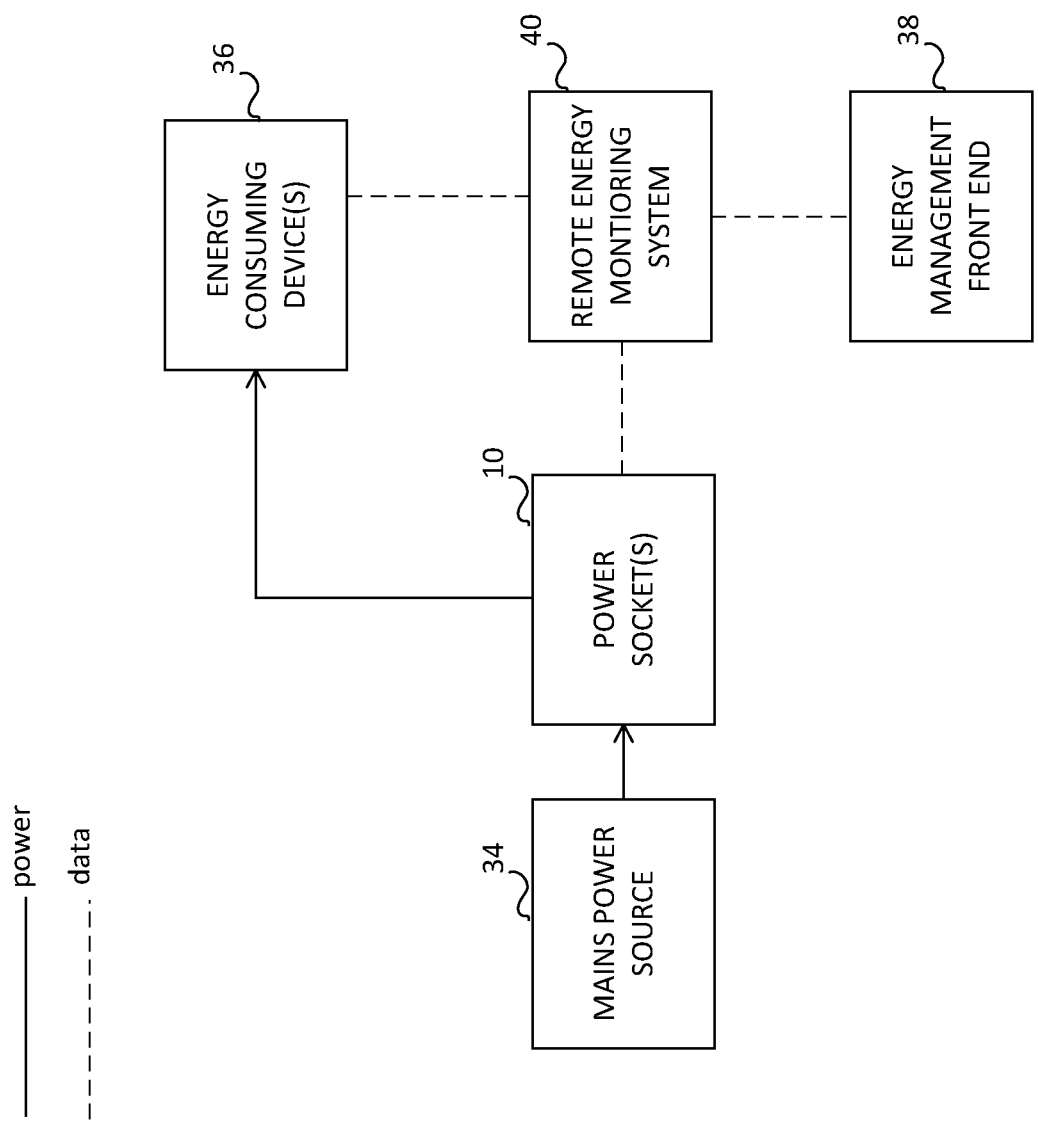
FIG. 3 shows a schematic diagram of a power management system including an energy monitoring system according to an embodiment of the present disclosure.

FIG. 3 of the drawings illustrates an energy management system including a plurality of power sockets 10, each of which receive mains power from a mains power source 34 and which provide mains power to an energy consuming device 36. Each power socket 10 is also connectable to a remote energy monitoring system 40 which is connected to a management front end 38, for example, to applications running on user devices or to a web-portal front end to which users can connect. The power socket may be intermittently connected to the remote energy monitoring system 40 in some embodiments. In some embodiments, however, the power socket is operational even when it is not connected to the remote energy monitoring system 40.

The remote energy monitoring system 40 includes system software which runs on a system server platform, which may be distributed as a cloud based platform in some examples. The remote energy monitoring system server is configured to be connectable to each power socket. The remote energy monitoring system server 40 may communicate directly with one or more energy consuming device(s) 36 in some embodiments. By way of example, the server 40 may be configured to remotely adjust the power management mode or profile of a fleet of laptops within an enterprise.

In one embodiment the remote energy monitoring system server includes more than one physical server (i.e. the remote energy monitoring system 40 uses Virtual Servers), and is logically distributed across the globe according to the location of the system hardware. In order to comply with geographical data security requirements, regulations or concerns, the cloud server is configured so each customer has a separate cloud storage server for data storage and each cloud server would be located in an appropriate customer compliant geography. The remote energy monitoring system 40 includes a data store for the uploaded data it receives from power sockets 10 and includes one or more data processors for processing uploaded data, user registration and other software-based functions provided by the system. In some embodiments, the remote energy monitoring system 40 using an 'Internet of Things' (IoT) infrastructure platform (for example, Google Cloud Platform, AWS IoT, etc.).

Data Recordal Frequency

In some embodiments, each power socket 10 records power consumption in the form of power drawn characteristics data at a rate of 3 Hz. In such embodiments, however, the power socket 10 does not transmit data at this 3 Hz rate to the remote energy monitoring system 40, instead the power monitor will store the data in memory 26.

In some embodiments, two types of data transmission will take place with the power socket, first a status ping and second a data packet transfer. These are specifically setup in accordance with the device's firmware to reduce average power consumption.

The following table lists examples of transmission rates according to some embodiments of the power socket for various communication types and scenarios. In some embodiments, any of the scenarios listed here can be interrupted by a relevant request from the System Server:

| Scenario | Status Ping Frequency | Full Data Transmission Frequency |
|---|---|---|
| Device Relay(s) Off | Every 10 seconds | Every 15 minutes |
| Device Relay(s) On, but appliance not drawing power. | Every 5 seconds | Every 15 minutes |
| Device Relay(s) On, and appliance drawing power. | Every 5 seconds | Every 2 minutes |
| Device Relay(s) On and being requested to stream live data (See figure below). | Every 5 seconds | Every 5 seconds |
| Device Relay(s) On, and appliance drawing power - specific Software driven request | Every Y seconds* | Every X minutes* |

*values specifically set in Software according to the type of appliance.

A data packet transfer relates to both incoming data transmissions, from a server of the remote energy monitoring system 40 to a power socket 10, and outgoing data transmissions from the power socket to a server of the remote energy monitoring system 40. Outgoing transmissions includes segments of many power consumption variables recorded by the power socket 10 which will be stored on-board and sent outbound. Inbound data from a server of the remote energy monitoring system 40 to a power socket 10 may include commands to control the power socket and/or an output of the power socket, and/or provide data updates for both the firmware and the indicator, for example, the energy usage status indicated by the indicator of the power socket. In some examples, this results in a displayed state of the indicator 30 changing. For example, an indicator 30 comprising a LED light may glow red if the remote energy monitoring system 40 classifies the power being drawn by an outlet is providing wasted energy in some embodiments. In some embodiments, an audible message or alert tone may be indicated instead and/or in addition to reflect the energy wastage.

In some embodiments, a status ping from a power socket 10 is sent to a server of the remote energy monitoring system 40 to inform the system server whether or not the power socket 10 is being used and/or if a device 36 drawing power from an outlet 12 of the power socket 12 is being used and/or if the power outlet 12 of a power socket 10 is switched on or off. This assists in power management of the hardware of the power socket 10 and/or of the energy consuming device 36 in some embodiments.

The remote energy monitoring system 40 includes or is connected to a computer database or similar data store for storing the information it receives from each power socket 10. The database is not shown in FIG. 3 but may be implemented using a single H/W platform or a distributed platform. The database stores the latest data uploads, and in some embodiments also the complete historical data, from each power socket 10. The remote energy monitoring system 40 also stores all subsequently processed data by any of the remote energy monitoring system servers for each of the power sockets 10 and any other data generated by the remote energy monitoring system 40 such as energy, cost, carbon emissions over time associated with the power drawn from an outlet of a power socket are also stored here. The database features a unique database schema designed specifically for the energy monitoring system 40. The time that data is stored for will be variable, defaulting to persistent storage. Data may be moved to 'archive storage' in certain scenarios. There is a specific Software process to deal with data removal.

User Registration and Details

Some embodiments of the remote energy monitoring system 40 provide a registration function which enables users to register via a suitable front end system such as front end 38 shown in FIG. 3 and holds details about registered users. In some embodiments, users are associated by the remote energy monitoring system 40 with identified power sockets 10, either permanently or temporarily.

In some embodiments, the remote energy monitoring system 40 differentiates user types. For example, into the following user types System Owner—Full access to the remote energy monitoring system 40.

System Administrators—Designated people that have full access to one or more servers of the remote energy monitoring system 40 but not to all data unless specifically set.

Administrative Users—Designated people with full access to a data set and a sub-set of remote energy monitoring system 40 functionality.

General Users—Those users that utilize power sockets 10 and components to power devices 36.

The remote energy monitoring system 40 requires any user to register their identity before use and generates a system ID automatically to provide each user with a unique key to set access permissions, and provides each user with appropriate authentication information, e.g. a secure username and password.

Payments

In some embodiments of the remote energy monitoring system 40, a monetary payment system is available in the remote energy monitoring system 40. The payment process is used to determine via the remote energy monitoring system 40 a cost of power drawn from an outlet 12 of a power socket 10 based upon a set rate and allow users of the remote energy monitoring system 40 to set rates to general users for energy consumption through a power socket 12. The remote energy monitoring system 40 utilizes a suitable 3rd party payment system to process payments.

Remote energy monitoring system administration is implemented using system administrators who are able to perform activities such as adding new devices, updating power socket firmware to ensure each power socket in the system is operational and working as expected, and also to resetting operational parameters as appropriate.

In some embodiments, an automated software-based function of the remote energy monitoring system 40 analyses each power socket using a set of pre-defined device specific 'health' parameters that will enable error checking, issue tracking and functionality. This is designed to reduce manual work load for a System Administrator by flagging potential issues.

In some embodiments of the power socket 10, the indicator 30 comprises an Impact Indicator sub-system in the form of an LED light that is visible to anyone that can physically see the power socket. The purpose of this light is to convey information to the user of the power socket 12 through flashing and different colours of light in some embodiments without wasting energy unduly.

In some embodiments, the indicator is used to convey information which relates to the amount of environmental or energy 'impact' of an energy consuming device 36 connected to the power socket 12 to a user, such as the impact of the power drawn on the mains electricity source the power socket is connected to or the effect on the connected electrical grid in terms of energy and energy related greenhouse gas emissions.

The energy-related greenhouse gas emissions may be provided by a remote source to the power socket. For example, in some embodiments, signals are sent to a power socket according to any of the disclosed embodiments which indicate a greenhouse emissions consumption intensity or greenhouse emissions power tariff for electrical power. This information may be provided to the power socket by an electrical energy or power provider to which an owner or a user of the tariff has subscribed or entered manually or obtained from another source. The power socket may then be configured to receive signals indicating greenhouse gas emissions associated with power provided to the power socket and, responsive to the received signals indicating that greenhouse gas emissions associated with power drawn by a connected electrical device are above a greenhouse gas emissions power supply cut-off threshold, turn off at least one relay in the power socket to control the flow of power drawn by a connected electrical device. The power socket may also then be configured to receive signals indicating greenhouse gas emissions associated with power provided to the power socket and responsive to the received signals indicating that greenhouse gas emissions associated with power drawn by a connected electrical device are below a greenhouse gas emissions power supply cut-off threshold, maintain the flow of power to the connected electrical device or turn on the at least one relay to control the flow of power drawn by the connected electrical device.

In some embodiments, the number of different impact types are selectable (see below). Other information can also be conveyed through the light such as Power socket status at times of error, setup or maintenance. The colour or rate of flashing of the light will relate to an impact level; the colour of the light will be different based upon geographical location. For example, in the United Kingdom, red will relate to high/negative impact and, green to low/positive impact.

Impact types that some embodiments of the indicator are configured to convey include:

A national electricity grid power provision mix, in terms of amount of Greenhouse Gas Emissions;

A local electricity grid power provision mix, in terms of amount of Greenhouse Gas Emissions (e.g. building solar power—see below for details).

A combination of national and local electricity grid power provision mix, in terms of amount of Greenhouse Gas Emissions Organizational, personal or building status in relation to an energy or emissions goal over time (e.g. goal has been exceeded by X % for month—see below for details), Real-time power use for the Power socket (using a variable scale to highlight high and low power use from the plugged-in device (e.g. 2 kW=red, 0.5 W=Green, colour scales between)

Real-time power use for a group of power sockets 10 (e.g. if 30 Power sockets are registered to a user, each would be summed to create a total power consumption which would be shown across all 10 Power sockets (using a scaled approach as described in the above point))

In some embodiments, the colour of the LED in relation to an impact level is calculated with three components; a current level, the maximum level and the minimum level. These components are time dependent and can be updated on any time scale.

The following sections detail how the light colours are calculated in some embodiments:

National Grid Intensity Data

The data used to visualize the electricity grid carbon intensity is obtained from the UK National Grid through an online API. This data is refreshed every 30 minutes. The System Server runs a software function to retrieve the data every 30 minutes and update each relevant Power socket. In some embodiments, this data point is related to the Power socket's geographical region, for example by using a postal or zip code for a building housing the power sockets to identify the relevant region. The technical process is as follows:

A daily maximum and minimum level of emissions is forecast and provided by the National Grid API each day. These data points act as our minimum and maximum values for the light colour scale. These values sometimes change within the day period and are updated every 30 minutes.

The average grid carbon intensity is published every 30 minutes by the National Grid API which is obtained by a server of the remote energy monitoring system 40. This value acts as our current level.

If the Power socket has a zip or post code associated to it to act as a geographic locator, the specific location-based carbon grid intensity will be sourced using the National Grid API. Else, the average number for the geographic region associated with that national grid is used.

The light colour is calculated in a scale from one colour, e.g. green, at the minimum to another colour associated with a maximum, for example, red with an average being orange, although a different heat map of colours and/or intensities may be used in other embodiments.

Local Grid Intensity Calculations

In some embodiments, in the case that a power socket 10 is connected to a local electricity power grid that features a unique energy generation mix, the remote energy monitoring system 40 calculates the relevant carbon intensity level. This may include a national grid mixed with local generation, or an entirely separate energy generation mix.

For example, in some embodiments of the remote energy monitoring system 40, a building including one or more of the power socket 10 has its own renewable energy generation in the form of solar panels and a battery. The solar panels and battery are used as supplementary power provision to the standard connection to the National Grid. In this case, the remote energy monitoring system 40 takes a feed of data from the solar panel generation and battery use as well as a feed of total energy demand for the entire building.

In some embodiments, using this ratio, a National Grid to solar input is calculated accordingly, for example at intervals of every 30 minutes, and the UK National Grid emissions data is gathered and processed as described above. The local grid is specified with a maximum, minimum and current greenhouse gas emissions intensity. Where relevant, the maximum and minimum can be specified manually or from a separate but linked data feed. The current level will be obtained from a linked data feed updated at intervals such as every 30 minutes. For example, in the case of solar panel generation, the maximum, minimum and current emissions intensity would all be 0.

In some embodiments, from the buildings energy management system, remote energy monitoring system 40 receives a feed of data indicating how much energy was being used from the National Grid and from the local energy grid is obtained every 30 minutes. This would be converted to a simple percentage.

In some embodiments, the current carbon intensity is calculated by remote energy monitoring system 40 by multiplying the UK Grid and local grid current intensity by the percentage of each calculated in the previous step.

In some embodiments, the maximum and minimum greenhouse gas emissions are set to the National Grid maximum and minimum. For example, the minimum National Grid number may be set to Orange with the middle and maximum being set to Red. Anything below the minimum is set to Green.

Some embodiments of remote energy monitoring system 40 feature a software element that allows a user to input a goal to achieve over time related to either the local building or a personal record of energy consumption, greenhouse gas emissions (or carbon emissions) or energy cost. The remote energy monitoring system 40 communicates, through the power socket indicator, how on-track the building or user is to the set goal.

For example, in some embodiments, the indicator can indicate a goal progress status. For example, in some embodiments, a user such as a building manager sets a goal of using 20 MWh over a month for a group of power sockets via the remote energy monitoring system 40. All relevant power sockets 10 are set, to relate the colour of the light to the status of this goal by sending appropriate control signals from the remote energy monitoring system 40. For example, if at the start of the month, the socket indicator lights are green, this would indicate a socket is on-target to reach the goal (by splitting the goal by working day over a month of working day hours e.g. if there were 160 working hours in a month, each hour would be 0.125 MWh in this case). If the goal is not being met, the light will change to an orange or red colour to indicate negative behaviour depending on how far from the goal it is in terms of percentage from goal with 50% being orange and anything about 100% being red.

Process Steps:

Initiate the setup of a new Goal

Select Power sockets or System users relevant to the Goal. System indicates if Devices or users are part of another Goal and allows user to either apply the new Goal or keep the old Goal against relevant Devices.

Select System metric that forms the basis of the Goal.

Examples include:

Setting an allocation of Energy or Emissions over a time period (e.g. 20 MWh for a week). The Goal stages are calculated by the allocation of Energy or Emissions divided by a set time period (e.g. 1 hour) between set times of the day and set days of the week (e.g. between 0800-1800 and Monday to Friday only).

Occurrences in which a single Power socket used more than a set point of power consumption (e.g. 1000 Watts) for a defined period of time (e.g. 30 seconds or more).

Select the time period the Goal is relevant for. This can include a past date, but must include a future end date.

Set the goal's success and failure criteria including ranges from the goal set point.

Activate the Goal.

Goals can be deactivated or deleted at any time, or archived once completed.

In the above examples, the indicator may also or instead announce goals or alerts or provide the same information audibly, for example, if a user is sensed near the socket or when a device is plugged into an outlet of the socket and/or if a device starts or stops drawing power from an outlet of a socket.

In some embodiments of the power socket 10, at least one relay 18 comprises a remotely actuatable relay which is also is configured to be actuated off-line responsive to one or more of: a loss or change of data network connectivity with the remote energy monitoring system; and a loss of data communication with the remote energy monitoring system 40.

In some embodiments of the power socket 10, the power monitor 30 determines, at intervals of 3 Hz or less, one or more or all of the following characteristics of the power drawn from the socket by a device 36, together with time-stamp information: AC line frequency; AC line voltage; a current drawn on outlet; an active power drawn on the outlet; a reactive power drawn on the outlet; an apparent power drawn on the outlet; and a power factor.

In some embodiments of the power socket 10, the power monitor 20 is configured to store the determined one or more characteristics of power drawn by a device 36 and time stamp information in a data store accessible by the microcontroller 22.

In some embodiments of the power socket 10, the relay 18 includes a latching relay configured to de-energize after being switched so the relay 18 does not use power to maintain its state after it has been switched on or off.

In some embodiments of the power socket 10, the microcontroller 22 captures data from the memory or data store 26 at dynamic intervals to send to the remote energy monitoring system 40, wherein the dynamic intervals automatically increase in length if the power monitor 20 detects no power is being drawn and/or if a relay 18 has turned off the delivery of power from an outlet 12.

In some embodiments of the power socket 10, the power socket 10 includes a reset component which is configured to perform a reset routine, wherein the reset routine is triggered by detecting an external magnetic field, for example using a Hall sensor.

Figure 4:
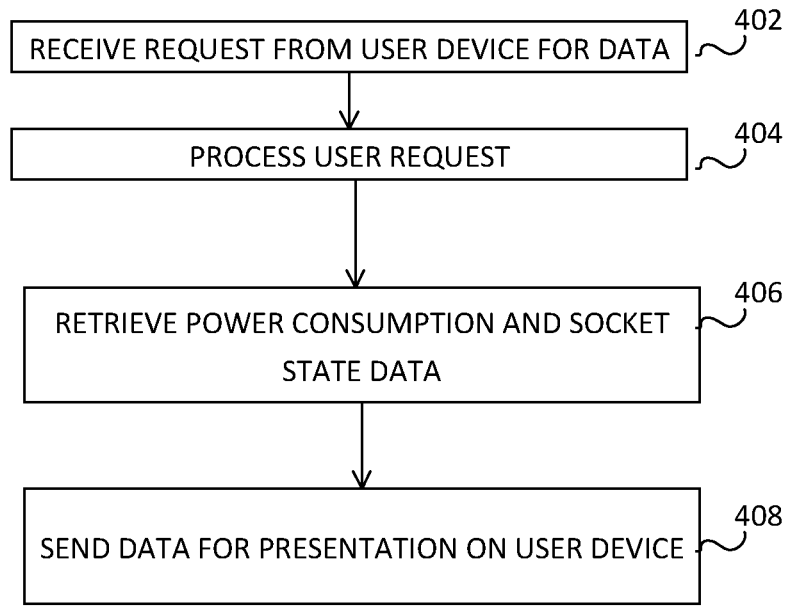
FIG. 4 shows schematically a method for providing power consumption and socket state data to a user according to an embodiment of the present disclosure.

FIG. 4 shows schematically an example embodiment of a method of providing power consumption related information to a user. In some embodiments of the power socket 10 energy monitoring system 40 receives (step 402) a request signal from a user via a front end 38. The energy monitoring system 40 responses by processing the request (step 406) and retrieving (step 408) from its data store information on the power consumption and/or socket state data for each socket associated with that user, and sends (step 408) the retrieved data to the user for display on the device of that user.

In some embodiments, the energy monitoring system 40 sends a control message to a power socket 10 to meter power drawn from at least one output 12, for example from a power request signal received from a user device via front end 38 of the remote energy monitoring system 40.

Figure 5:
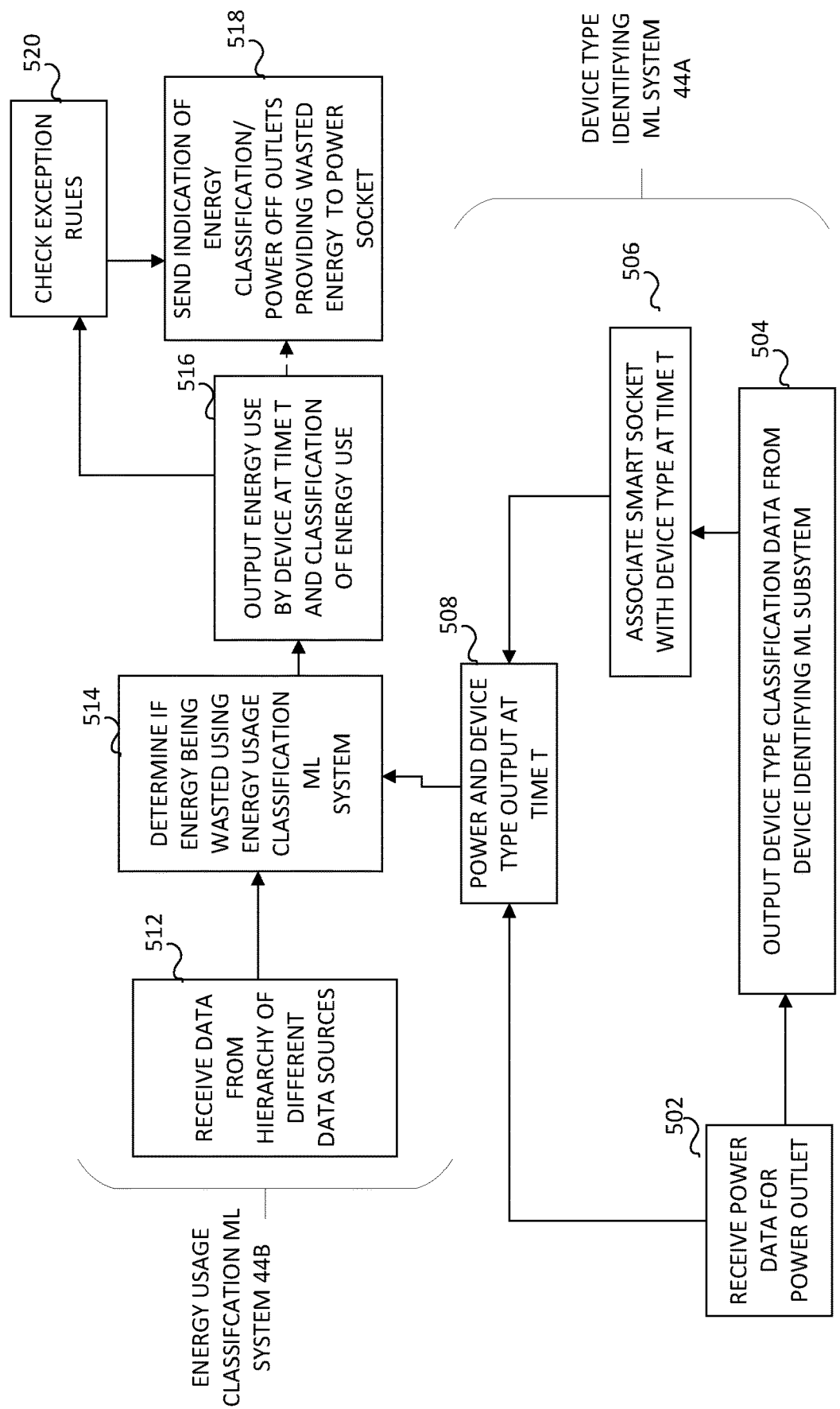
FIG. 5 shows schematically a flow chart for steps performed by an energy usage classification ML system and a device-type identifier ML sub-system according to an embodiment of the present disclosure.

FIG. 5 shows how an example embodiment of a flowchart illustrating a method of determining a power outlet is providing power to a device which is wasting energy which may be performed by the remote energy monitoring system 40, or, in some embodiments, which may be performed by the remote energy monitoring system in conjunction with one or more power socket according to any of the disclosed embodiments performing edge computing. In FIG. 5, the remote energy monitoring system 40 includes a machine learning system 44 which includes two ML system models. In some embodiments, however, one or both of the trained ML system models 44a, 44b of ML system 44 may operate instead on a power socket 10, for example, by running on the microcontroller of the power socket.

Examples of steps performed by ML model 44a is are shown in the lower half of FIG. 5. ML model 44a is trained to identity a device type for an energy consuming device 36 based on the power drawn characteristics provided in the data uploaded to the remote energy monitoring system 40 by the power socket 10 of that power outlet 12. In some embodiments however, once trained, the ML model 44b is implemented on the edge of a distributed energy monitoring system 40 by a power socket according to any of the disclosed embodiments. The trained ML model 44b accordingly runs on the microcontroller of the power socket in some embodiments, in which case the output 508 of the ML model 44b includes the power data including the power drawn characteristics and/or the operational state of a device along with the device type and time-stamp information. The ML model 44b output 508 is then transferred by the power socket over a suitable data communications link (which may be initially wired or wireless to a local access point router) for forwarding to the remote energy monitoring system on which the energy usage classification ML model 44a is running. The power and device type and time-stamp information transfer may be transferred at the same time or separately from the power characteristics and/or operational state data which comprise the power data used by the ML model 44a with which it is associated. For example, in some embodiments, the power and device type is transferred with all transferred data, however, in some embodiments, it may be transferred only when a new device is detected.

Examples of steps performed by a ML model 44b are shown in the upper half of FIG. 5. ML model 44b is trained to classify energy usage using the output of the ML model and power data from the power outlet 12.

In some embodiments, the ML system 44 performs a method according to the second aspect or any of its embodiments to train the ML system 44a so that it can be used when the ML system 44a performs a method according to the third aspect or any of its embodiments.

In some embodiments, the ML system 44 performs a method according to the fourth aspect or any of its embodiments to train the ML system 44b so that it can be used when the ML system 44b performs a method according to the fifth aspect or any of its embodiments.

In some embodiments, the ML system 44 performs a method according to the third and/or fifth aspects or any of their embodiments when the remote energy monitoring system performs a method according to the sixth and/or seventh and/or eleventh aspects or any of their embodiments.

In FIG. 5, remote energy monitoring system 40 receives data uploaded by a power socket 10 (step 502) for one or more power outlets 12 associated with that power socket 10. In some embodiments, the received data may include user labelled data which is then used with other uploaded data from one or more other power sockets to form a body of training data to train the ML model 44a to classify the types of devices 36 drawing power from the power outlets based on the characteristics for the power drawn which each power monitor 20 of a power socket has captured. Once the ML system has been trained to correctly classify devices it is configured to generate output which assigns a device type identifier to the power drawn characteristics to form a power profile for that power socket at a given time.

Accordingly, in some embodiments, when the ML system 44a receives power drawn characteristics for a particular socket's power outlet, it outputs (step 504) a device type identifier based on its classification of the device 36 and associates (step 506) an identifier for that power socket 10 with the device type identifier for a particular time segment, for example, using any time stamp information associated with the uploaded power characteristics. In this way, the ML system 44a is able to generate a power profile for a given time segment which includes an identified device type, a plurality of power characteristics, such as an AC line voltage, and other characteristics such as the AC current drawn by the device 36 from the power outlet, and one or more or all of the reactive power, the active power, the apparent power and/or a power factor comprising the active power over the apparent power. This input is provided with the data from the power outlet that the remote energy monitoring system 40 has received and fed into the energy usage classification system in step 508.

The energy usage classification system 514 processes the power information it receives for the power outlet 12 from the power socket 10 with the information it receives from the ML system 44a which has identified the device type, for example the device type identifier, the power outlet identifier, and one or more power characteristics for the power drawn by the energy consuming device 36 to determine if the energy that power outlet is providing to the energy consuming device is being wasted by that energy consuming device 36.

In some embodiments, as shown in FIG. 5, the remote energy monitoring system 40 receives in step 512 additional types of data from a variety of different information sources which can affect the resulting determination by the ML system 44b in step 514 of what energy usage classification is to be assigned to the energy being consumed by the energy consuming device 3636 connected to power outlet 12. The additional types of data may form a hierarchy according to the impact each type of data has on a probability or confidence score that the energy usage classification determined by the ML system 44b is correct. In some embodiments, the energy usage classification output of the ML system 44b is either a wasted or a not wasted energy usage classification. In some embodiments, more information may be given with the energy usage classification, such as a confidence score or a carbon emissions (for either wasted or not wasted energy).

In some embodiments, the ML system 44b then outputs (step 516), based on the power drawn characteristics and optionally based on information provided by the other data sources, for each received time-segment, an indication of the amount of electrical energy consumed by the device 36 from the power outlet 12 together with an energy usage classification for that energy.

In some embodiments, the energy monitoring system is configured to then directly send an indication of the energy classification back to the power socket 10 of that power outlet 12 and in some examples, to send an indication of the energy classification with a control signal to power off the delivery of power by that power outlet 12. In some embodiments, however, such as that shown in FIG. 5, the remote energy monitoring system first checks if any exception rules may apply, for example exceptions for to that type of device, to that power socket and/or that outlet, or to a user associated with that power socket, so that although an indication that a wasted energy usage classification has been assigned, no control signal to cause the power outlet to turn off is sent. In some examples, this allow the power socket 10 to apply in addition local rules to determine if the power outlet 12 is to be turned off or not.

In some embodiments, an wasted energy usage classification includes a wasted energy classification with a confidence score for that classification. In some embodiments, a not wasted energy usage classification comprises a not wasted energy classification with a confidence score for that not wasted energy classification.

In some embodiments, based on the confidence score being sufficiently high, the remote energy monitoring system 40 causes the power socket to indicate a warning alert to a user device to display via the device that energy is being wasted prior to sending a signal to cause the power socket to power off the power outlet. The power socket may provide the alert in the form of alert sound or vibration or visible warning via the indicator 30.

In some embodiments, the wasted energy classification is associated with one or more of: a location of a user of a known device not being within a predefined proximity to the power outlet from which that known device is drawing power; no user input to the known device having being detected in a certain period of time; and/or a detected or otherwise determined operational state of the device, for example, a power signature of the device which is associated with an idle or standby mode.

In some embodiments, the energy usage classification machine learning model receives the power characteristics and/or other information in the form of a power profile for a type of device from the device identifier machine learning model. In some embodiments, the power profile includes an indication of an operational state of the device, such as an idle state of the device.

In some examples, the location of the user is determined using related information from one or more of the energy-related information data sources. Examples of data sources include sources for: a schedule for the user; a user log-in location; a user position tracker location; e.g. a GPS tracker location; an indoor tracked location (for example, a Wi-Fi access point tracked location), a building access system for the building where the power socket is located, or an access alert the user is in another building from its access system, normal working hours information for the user.

In some examples, the ML model weights associated with input vector features representing the hierarchy of characteristics (for example, power drawn characteristics and/or characteristics for the other information sources) are biased according to the level of effect a feature is determined to have on the energy usage classification output of the ML model. The biasing may be based on reliability and/or a confidence level in the effect.

In some examples the data sources include one or more or all of the following: a predefined device whitelist information source, where a white listed device implies it is not to ever be classified as wasting energy; a historical energy usage data source; a device software information source; a building systems information source; a power grid network information source; a local energy generation source; and a demand side response information source, which indicates if a building/location or other group of power sockets belongs to a scheme where a power grid power provider can request the group of power sockets is turned off.

In some embodiments, the building systems information associated with the time segment comprises data from a building management system which includes for the time segment one or more or all of: occupancy sensor data, security data, access, login location, and meeting scheduling data.

In some embodiments, the historical energy information includes a building energy use profiles for each power socket in the building level for a historically similar time segment. For example, to allow comparison with the same time segment on a previous day, on the same day of a previous week or month or year, on the same day of the month, or the same days of a week in a previous year etc.

In some embodiments, the method further includes determining a duration of the time segment when a known device is attached to a socket.

In some embodiments, a time segment is provided using a sliding window, for example, covering a time segment of several minutes (e.g. 5 to 15 minutes). In some embodiments, a time window used by the energy usage classification ML model is the same time window used by the device type identification ML model. In some embodiments, the time window is determined from training data as sliding window for the current minute and the previous 14 minutes which is updated every minute.

In some embodiments, the training of the device type identification ML mode and/or the energy usage classification ML model includes generating a power signature for a time segment by capturing readings in unison for a plurality of drawn power characteristics. In some embodiments, the power signature includes captured readings for one or more or all of an AC line voltage of the outlet, an AC line current of the outlet, a frequency of the AC, a reactive power drawn, an active power drawn, and an apparent power drawn and a power factor (comprising active power/apparent power) which are associated with an identifier for the device type of the device drawing the power. In some examples, the power characteristics are read in unison and are sampled at a frequency of 3 Hz.

Figure 6:
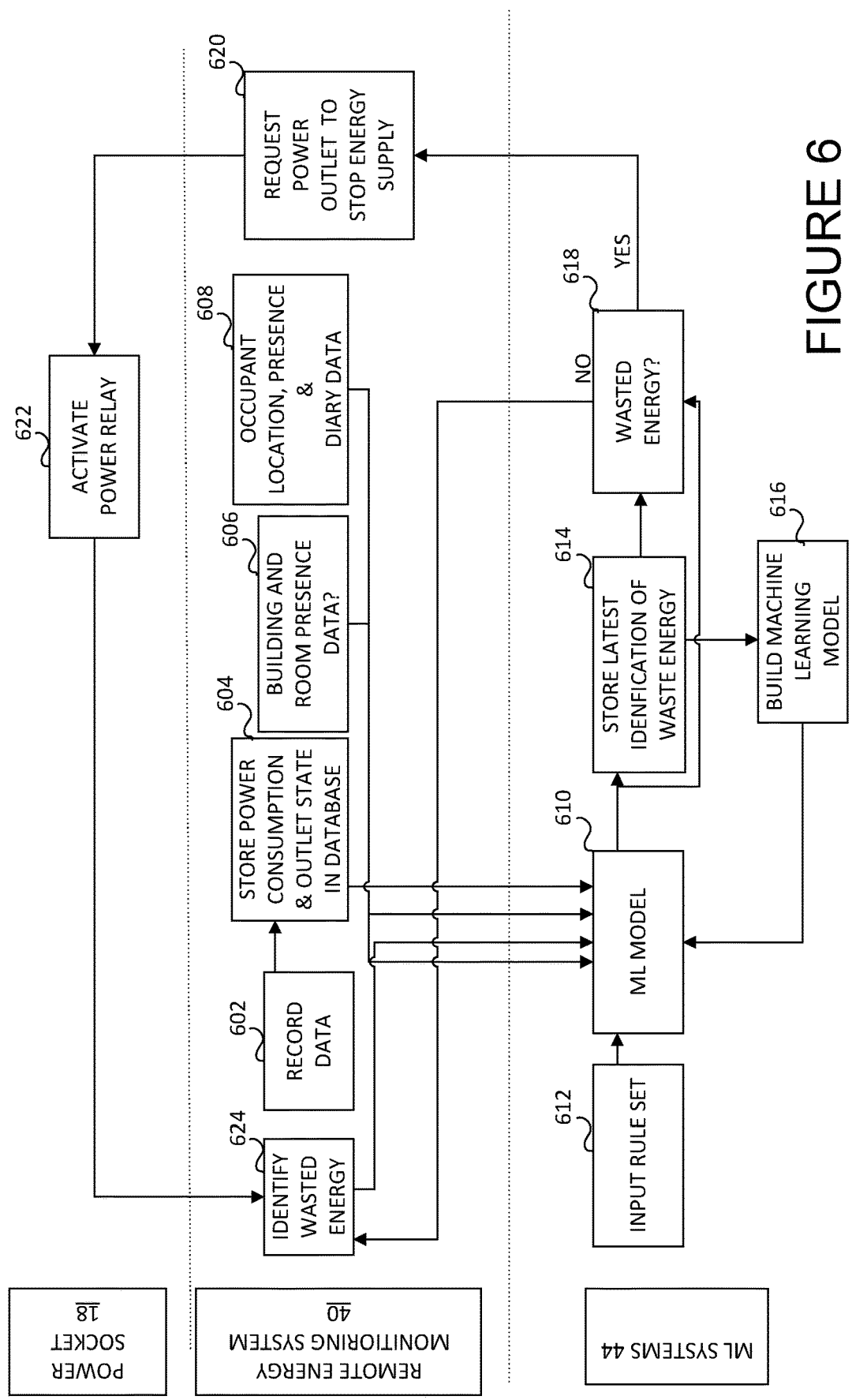
FIG. 6 shows schematically how a remote energy monitoring system uses an energy usage classification ML system and a device-type identifier ML sub-system to control the delivery of power from a power socket according to an embodiment of the present disclosure.

FIG. 6 shows how the remote energy monitoring system 40, the machine learning systems 44a, 44b, and one or more power sockets form a power management system. FIG. 6 shows schematically how the remote energy monitoring system 40 uses an energy usage classification ML system and a device-type identifier ML sub-system to control the delivery of power from a power socket according to an embodiment of the present disclosure;

In the example shown in FIG. 6, the remote energy managing system 40 records (602) data from a power socket 40 in a database or other suitable data store which hold all of the data received from all of the power sockets 40 connected to the remote energy monitoring system 40 in the power management system. The database of the remote energy monitoring system 40 comprises, in some embodiments, at least data representing the power drawn or power consumption characteristics data values and also, in at least some embodiments, the operational state of the power outlet and/or power socket from which power can be drawn.

An power outlet with an operational state of off means no power can be delivered to a connected device 36. A power outlet with an operational state of on means power can be delivered to a connected device 36.

However, a power outlet with an operational state of on does not necessarily mean that a connected device 36 is drawing power as this will depend on the operational state of the connected device, which may be on/off/in standby mode/in an idle mode/or in one or more specific operational states (for example, in a high energy consumption mode, in a low energy consumption mode).

The remote energy managing system 40 then provides the data with data from one or more other data sources, such as building and room presence data, occupant location, any other relevant presence information from available source(s), and diary data. This data may be obtained by the remote management system by determining if the received data includes a power outlet or power socket identifier which can be used to look up the location of the power socket for example. This location information and/or other information such as the device type identifier could be used to determine if a user is logged into the energy consuming device 36 connected to a power socket, for example, if the connected device 36 is a computer. If so, the user's identity may be associated with an access pass and if so, the remote monitoring system performs another lookup operation to find other information, such as building or room access logs to determine if the user is collocated with the device. Other sources of information such as those indicated above including occupant location, presence or diary data may be retrieved and may be used and fed into (step 610) the ML model 44b The ML model 44b then takes this data and uses its rule set (see 612) to classify if the power outlet was providing energy to a device 36 which was likely to be wasting energy (step 614), for example, if the user logged into the device is in another room, and the device is in an idle model according the power profile, it is likely the energy provided is being wasted.

If the ML model 44b is being executed on the remote energy monitoring system, and if the ML model 44b classifies the power provided by a power outlet in a particular time segment was being wasted by the energy consuming device in step 618, the remote energy monitoring system 40 will generate (in step 620) a request to stop the supply of wasted energy (assuming that the ML model has applied any overriding exception rules (see 612 in FIG. 6).

The request is sent by the energy monitoring system 40 to power socket 10 to activate the relay 18 for that power outlet 12 to cause the power outlet 12 to stop the supply of energy to the device 36. In this manner the remote energy monitoring system 40 prevents further wastage of energy by the energy consuming device 36. The ML system 44b can also feed in the result of the energy usage classification process back for unsupervised training of the ML model 44b, for example, by feeding the identified energy usage classification output into the remote energy monitoring system in step 624 for subsequent training of the ML system 610.

In some embodiments, however, the ML model 44b is run on the power socket, for example on the microcontroller or another processing unit. The ML model 44b may run intermittently on the power socket, for example, the power socket may be configured to perform edge computing only when the power socket cannot send data for some reason to the remote energy monitoring system 40 network. Alternatively, in some embodiments, the power socket 10 may be configured to always run the trained ML model 44b. In either case, if the ML model 44b is running in the power socket, then the power socket will be configured to also manage itself and is configured to activate relay 18 according to a locally available ruleset for a detected connected device type and the monitored power characteristics and energy consumption by the connected device.

Some embodiments of the remote energy monitoring system use the ML systems 44a,44b to build a dynamic model of energy usage over time, for example, to which provides a ML determined identification of whether a power outlet is providing wasted energy and/or to determine related greenhouse gas, GHG, emissions.

In some embodiments, the output of the ML model 44b is then used to implement automatic 'rules' through a plurality of power sockets 10 that will create a reduction in energy usage in the building where the power sockets 10 are installed.

The input layer of the Machine Learning system or network 44 includes the various measurements of power use or power drawn characteristics which is fed in directly from the remote monitoring energy systems power sockets database in time segments. The length of each time segment or time sections can vary depending on the output required.

Inputs can also include external data sets to the building such as Building and Room Presence Data and Occupant Location, Occupant Presence and Diary data. The purpose of this supplementary data is to refine the Machine Learning models view of what the power socket was plugged into and whether or not that was useful, where 'not useful' means 'Wasted Energy'.

The model is directly supervised for the first several weeks of development using 'labelled data'—this data is collected manually; the model is thereafter continually developed using unlabelled data. Manual data collection is a process in which an authorised user will receive classifications made by the model and ratify these outputs by confirming if the remote energy monitoring system 40 correctly classified the energy as 'wasted'. The output layer of the ML model 44 will determine when the energy profile of a set of power sockets (for example, within a building) is 'normal' or 'wasted'. The remote energy monitoring system 40 then causes each power socket 10 to either automatically control (turn-off, turn-on, etc.) the power flow to the relevant power outlets responsible for the 'wasted' energy. Alternatively, if instructed to, the remote energy monitoring system 40 sends the information about 'wasted' energy to a System administrator for action of their own choosing.

The Machine Learning model 44 may also be interrogated to make a change to a group of power sockets 10 via the front end of the remote energy monitoring system 40. By creating a model that provides a predictive forecast of the building's energy profile at a socket by socket level, the remote energy monitoring system 40 is able to demonstrate the impacts of an administrators rule sets in the future, enabling them to optimise the rules for safety or efficiency reasons.

Figure 7:
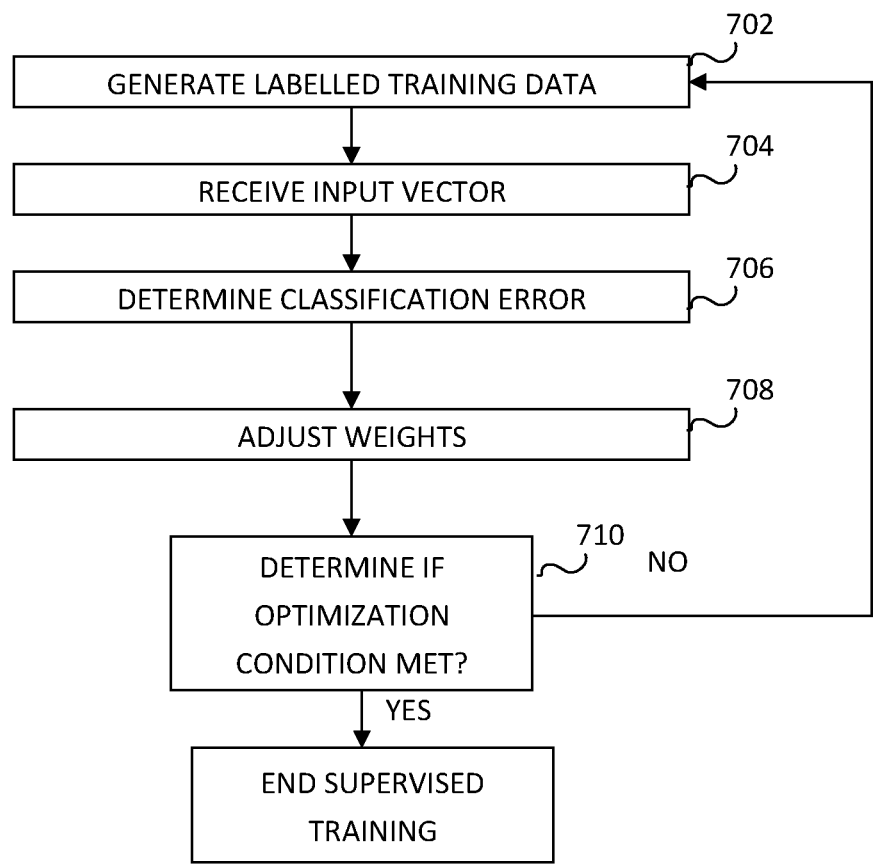
FIG. 7 shows schematically respective examples of methods for supervised training of a ML model according to an embodiment of the present disclosure.

The second aspect of this disclosure shows a method for training a machine learning, ML, model such as ML model 42 illustrated in FIG. 7, to identify a type of energy consuming device drawing power from a power outlet 10 of a power socket 12, the method comprising: generating (step 702) training data input vectors comprising labelled data received from a plurality of power outlets, wherein each training data input vector comprises at least features identifying a power outlet, a device type identifier for a device drawing power from the power outlet, and one or more characteristics of power drawn from that power outlet by the device in a time segment; iteratively determining, for each input vector of the training data received (704) by the ML model, a device type identifier for a device drawing power from the power outlet associated with that input vector by processing, using the ML model, at least the features of the input vector representing the one or more characteristics of power drawn from the power outlet by that device; determining (706) a classification error based on a comparison of the plurality of device types identified by output of the ML model with the plurality of devices types identified in the training data; and adjusting (708) the weights of the ML model to reduce the determined device type classification error and repeating the iterative training steps and the determining steps until an energy classification optimization condition is met.

In some embodiments, the one or more power drawn characteristics comprises one or more or all of: AC line voltage, AC line frequency, current, reactive power, active power, apparent power, power factor.

In some embodiments, the labelled data set of each input vector is associated with a time stamp. In some embodiments, the labelled data includes time-stamped data received from at least one additional source of information for determining the device type identifier.

In some embodiments, each a feature identifying an outlet 12 includes an outlet identifier which includes a location identifier for the power socket 10.

In some embodiments, the ML system 44a or 44b is also trained in unsupervised mode by the remote energy monitoring system 40, in which case the data received which forms the training data set comprises output from the ML system and does not include labels from a user. The process steps are otherwise the same as the supervised training process steps shown in FIG. 7.

Figure 8A:
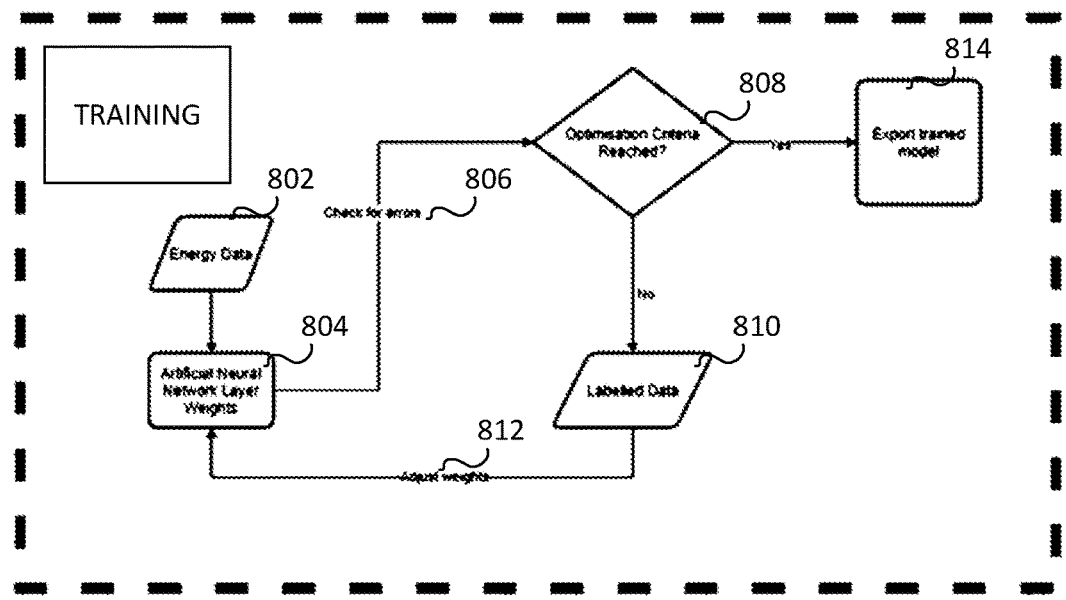
FIG. 8A shows a schematic flow chart illustrating the training method of FIG. 7.

FIG. 8A shows in more detail power consumption data, for example, power characteristics in the form of energy data 802 are fed into the ANN network layer weights 804 of the ML model, and how the ML model then checks for errors 806 to determine if the optimization criteria, for example, based on the success rate, are met in step 808, and if not, how this is used to generate labelled data in step 810 which is then used to readjust the weights of the ML model in step 812 until the optimization criteria are met and the M trained model is exported and made available for device type classification in step 814.

Figure 8B:
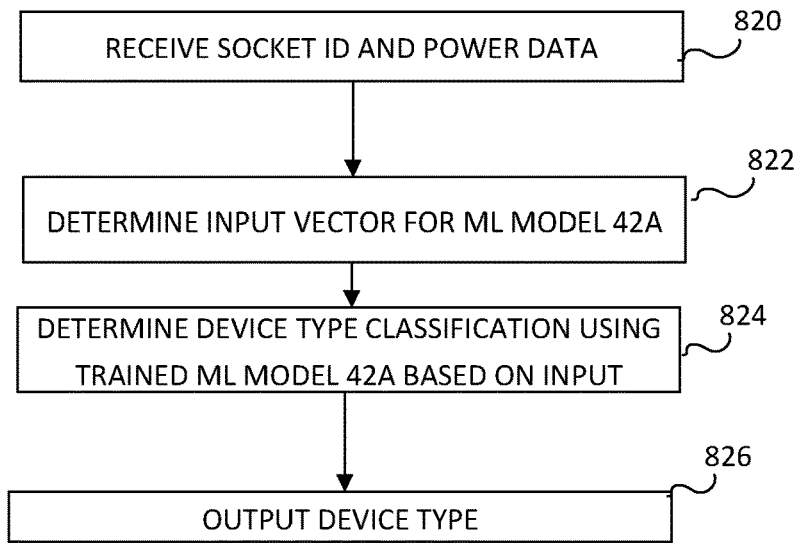
FIG. 8B shows schematically a method of determining a device type according to an embodiment of the present disclosure.

FIG. 8B shows schematically how the trained ML 42a model is used. For example, one embodiment of a method for identifying a type of device drawing power from a power outlet of a power socket using the trained ML model includes: receiving (step 820) data including a power outlet identifier, one or more characteristics of power drawn from that power outlet by a device, and a time-stamp; determining (step 822) an input vector for the ML model based on the received data; determining (824), using the ML model, a classification of the type of device drawing power from the power outlet; and outputting (826) an indication of the determined classification of the device type.

In some embodiments, a microcontroller on the socket is configured to implement an embodiment of the method for identifying a type of device drawing power from a power outlet of a power socket using the trained ML model.

In some embodiments, the ML system 44a of the remote energy monitoring system 40 is configured to identify 'devices' and 'appliances' connected to a power outlet. The device type identification includes, in some embodiments, a general classification of the type of the device, such as 'laptop', 'fan', 'vending machine', and may also in some embodiments include an identifier for an individual device type model, such as 'Lenovo Yoga 900 2016', 'Coolair 1000' and 'Vending Machine 123ert 2020'.

In some embodiments, the supervised learning process includes: determining a time segment that a known device was attached to a power outlet of a power socket. In some examples, this includes individual devices and groups of devices (such as a laptop docking station)).

In some embodiments, the power socket determines the ac line voltage three times a second, i.e. samples this at 3 Hz, and determines the current, frequency and power factor data in unison to generate a 'power signature' of the known device and labels this data accordingly.

In some embodiments, any new time segment of data is then compared to the different known device signatures. The new device signature is then assumed to be the device that the time segment most closely matches.

In some examples the ML process includes first build up a training set of labelled data in the remote monitoring systems global database of comprising power profiles or power signatures manually by asking power outlet users what device(s) was (were) attached to the power outlet at a particular time using a specific function of the remote monitoring system's front end. In some embodiments, the ML neural network model is then developed using this labelled database. The input layer takes the power data and classifies it as a device type, this classification is then compared against the known device classification, and the model is then adjusted iteratively until the classification accuracy improves to an acceptable level. New data can then be presented to the completed model to automatically determine what type of device the power data represents.

Figure 9:
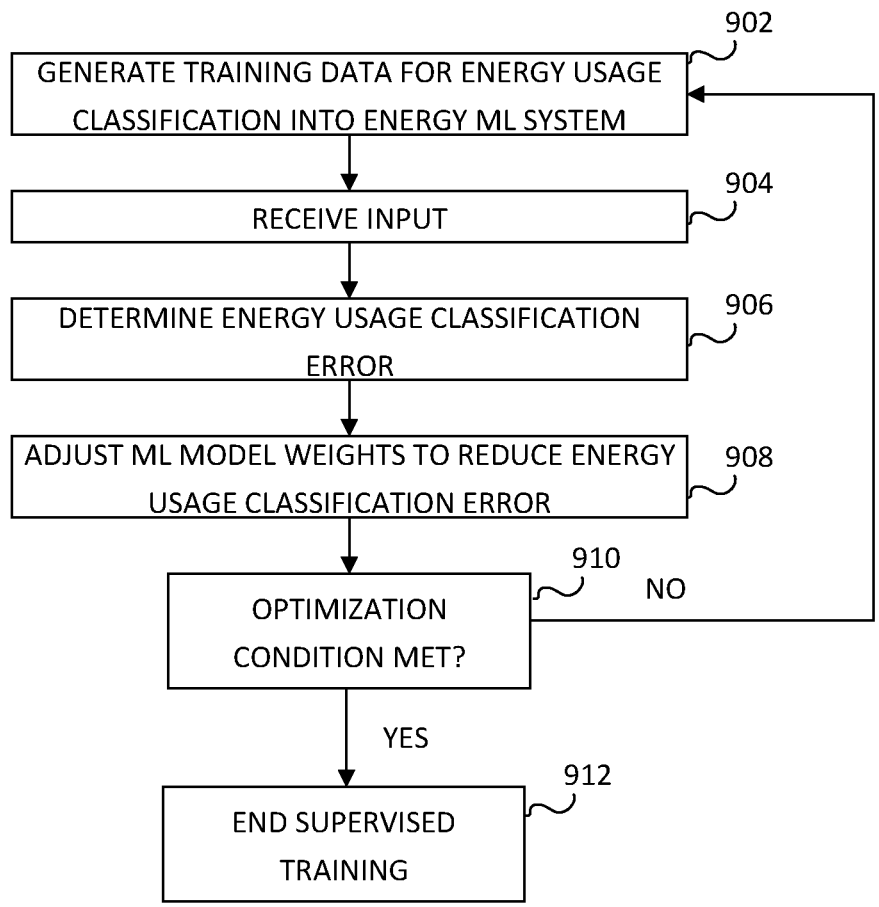
FIG. 9 shows schematically a method of training an ML model for energy usage classification according to an embodiment of the present disclosure.

FIG. 9 shows an example embodiment of a method for training an energy usage classification ML model to determine an energy usage classification for power drawn from a power outlet of a power socket by a device, the method comprising: generating (902) training data input vectors including labelled data received in time segments from each one of a plurality of power outlets, wherein each training input vector comprises, features identifying a time segment, a power outlet identifier, a device type identifier of a device drawing power from the power outlet in the time segment, one or more known power characteristics for the power drawn by the device in the time segment, and an known energy usage classification in the time segment; iteratively determining, for each input vector of the training data received (904) by the ML model, an energy usage classification for power drawn by the device from the power outlet in the time segment associated with that input vector by processing, using the ML model, at least the features of the input vector representing one or more characteristics of power drawn from that power outlet by the device; determining (906) an energy usage classification error based on a comparison of the energy usage classifications identified by output of the ML model with the energy usage classifications identified in the training data; and adjusting (08) the weights of the ML model to reduce the determined energy classification error and repeating the iterative training steps and the determining steps until an energy classification optimization condition is met (910), after which the supervised training ends (step 912).

In some embodiments, each input vector of the training data includes at least one additional feature representing an additional item of information associated with the time segment from a data source other than a power outlet. In some embodiments, an energy usage classification comprises a wasted energy classification or a not wasted energy classification and in some embodiments may also include an indication of a confidence score for the classification.

Examples of the power drawn characteristics comprise locally determined values for an AC line voltage, a drawn current, AC line frequency, active power, reactive power, apparent power and power factor data, preferably theses are determined in unison at a frequency of 3 Hz.

In some embodiments, the training data includes user input data captured in response to presenting a prompt on the device and/or another device for a user of the device to input data labelling one or more of: a use of the device when drawing power from that outlet; and/or an energy usage classification.

In some embodiments, the device type identifier for the device, and at least a time-stamp for the start of energy being drawn from the outlet by the device are determined using an embodiment of a device type identifier ML system as disclosed herein.

Figure 10A:
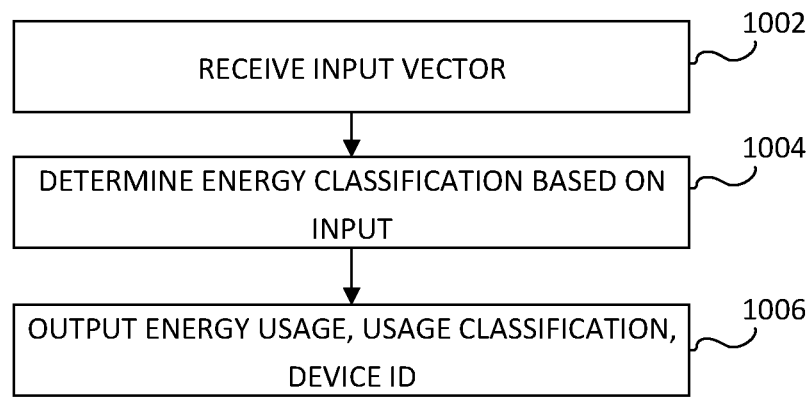
FIG. 10A shows schematically a method of classifying energy usage using the trained ML model of FIG. 9.

FIG. 10A shows an example of an embodiment of a method for determining an energy usage classification for power drawn from a power outlet of a power socket by a device, the method including: receiving (step 1002), by an energy usage classification ML model 44*a* trained as shown in FIG. 9 or disclosed elsewhere herein, an input vector including at least one or more power characteristics of power drawn by the device from the power outlet captured in a time segment and an identifier for a device type of the device; determining (step 1004) an energy usage classification using the trained energy usage classification ML model; and outputting (step 1006) an indication of the determined energy usage classification.

In some embodiments, the outputting further includes outputting an indication of at least a type of energy usage and/or a device type identifier for the device.

In some embodiments, the method further includes the energy usage classification ML model receiving additional information associated with the time segment of an input vector from a plurality of different known data sources.

In some embodiments, the energy usage classification includes a wasted energy classification based on one or more of: a location of a user of the device being more than a predefined distance from the power outlet from which the device is drawing power; a determination that user input has not been detected by the device in a period of time; and an operational state of the device.

In some embodiments, the method of determining an energy usage classification is made on an electrical power socket configured to reduce wastage of electrical energy by a connected device, so that there is no need to have a connection with a remote energy monitoring system at the time of classifying the energy usage. This may reduce network overhead as only updates to the energy usage classification model need to be provided by the remove server to the power socket which the microcontroller on the power socket then executes. In some embodiments, the power monitored data is captured using a machine-learning model running on the microcontroller configured to receive monitored data from the power monitor, the monitored data representing the monitored operational state of each power outlet and one or more characteristics of power drawn from each power outlet, and the microcontroller is further configured to determine, using the machine-learning model if the monitored data includes data indicated wasted energy.

Figure 10B:
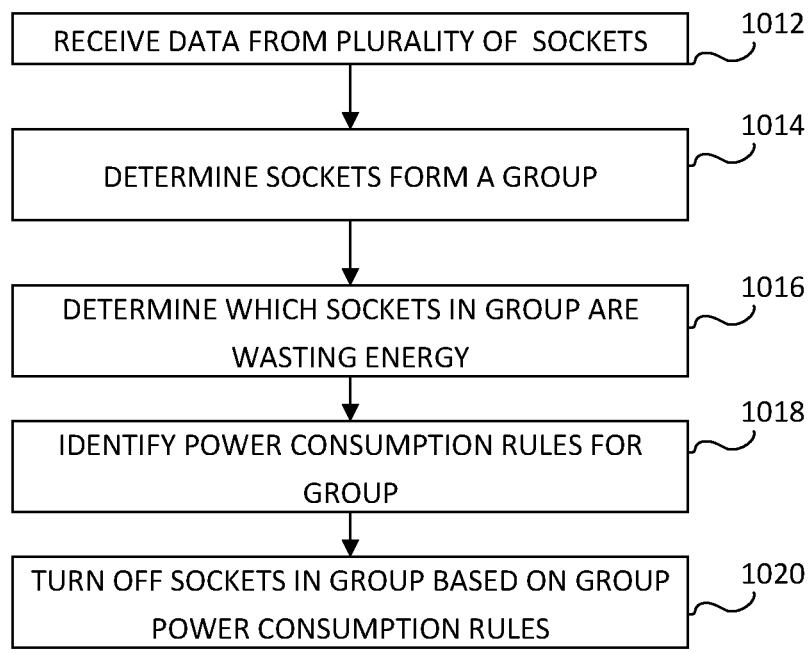
FIG. 10B shows schematically a method of power management according to another embodiment of the present disclosure.

Some embodiments of the remote energy monitoring system 40 are configured to implement a power management method by turning off power outlets remotely, for example, by turning off groups of power sockets as shown in FIG. 10B.

Some embodiments of the remote energy monitoring system implement a method for indicating on a remote power socket 10 an energy usage classification for a device 36 drawing power from a power outlet 12 of the power socket 10. In some embodiments, this is implemented by classifying energy usage as wasted or not using the ML systems 44a, 44b for example, as described herein. The method may include using the energy usage classification method to determine an energy usage classification for the power drawn from the power outlet 12 by an energy consuming device 36 and generating a control signal to cause an indication of the determined energy usage classification to be displayed by an energy usage indicator on the power socket. In some embodiments, the energy usage classification includes a wasted energy classification, which is indicated by the color of an indicator LED on a front facia of the power socket 10

FIG. 10B illustrates an example embodiment of steps in a method for controlling power to a plurality of sockets which uses one of the disclosed method embodiments to determine energy usage classifications for each one of the plurality of power outlets. The method includes receiving data identifying each of the plurality of power sockets (step 1012), determining (step 1014) the plurality of power outlets form a group of power outlets; determining (1016) a plurality of the power outlets of the group are providing energy determined by the ML model to have a wasted energy usage classification; associating (1018) the power sockets of the group with a set of power consumption rules; and, in dependence on at least one rule of the set of power consumption rules for the group of sockets, selectively actuating (1020) one or more relays 18 on each one of one or more or all of the sockets of the group to turn off the delivery of power by the selected outlets 12.

The disclosed technology may be implemented using apparatus including a memory, a processor, and computer program code stored in the memory which when executed by a processor causes the apparatus to perform at least one of the previous methods. In some embodiments, the apparatus implementing the methods involving the ML system comprises one or more components of the remote energy monitoring system.

Some embodiments of the remote energy monitoring system may also use a computer program product including computer code which, when executed by a processor, implements at least one of the previous ML related method aspects.

In some embodiments, a power management system includes a plurality of power sockets having the feature shown in the drawings and/or disclosed in the summary section embodiments, and the apparatus also disclosed herein which implements the disclosed methods performed by the remote energy monitoring system 40.

In some embodiments of the power management system, the power management system and/or the remote energy monitoring system 40 further includes a data interface for receiving input from a user of the system 40, the input including instructions to configure one or more power consumption rules for the delivery of electrical power via one or more power outlets 12 of selected power sockets 10.

In some embodiments of the power management system, the power management system and/or the remote energy monitoring system 40 receives user input which configures at least one rule of the set of power consumption rules for a group of power sockets 10 used in to selectively actuate a relay 18 on each one of the one or more or all of the power outlets 12 of the group of power sockets 10.

The person skilled in the art realizes that the present disclosure is not limited to the preferred embodiments described above. The person skilled in the art further realizes that modifications and variations are possible within the scope of the appended claims.

Additionally, variations to the disclosed embodiments can be understood and effected by the skilled person in practicing the disclosure, from a study of the drawings and the disclosure.

Automated Power Control Function

Some embodiments of the remote monitoring system 40 are designed to identify and eliminate wasted energy. The Machine Learning processes disclosed herein which the ML model systems 44a, 44b implement provide the energy remote monitoring system 40 with knowledge of whether or not a power outlet 12 of a power socket 10 is in a state of wasted energy or not. This enables the remote energy monitoring system 40 with an automated power control function in some embodiments which enables one or groups of power sockets 10 to be remotely control (and turned on or off) in the following scenarios:

Example Scenario: Occupant Out of Building

This example may trigger remote control of a power socket(s) 10 which are registered to a user in the remote monitoring system 40. A power outlet 12 or power socket 10 is disabled for power provision if the remote monitoring system 40 user is known to be away from the location of the power socket 10 and hasn't requested an exception to automated control. This rule only starts where the user has been determined by the remote monitoring system to have been 'away' for more than a predetermined amount of time, for example, 30 minutes.

In some embodiments, the remote monitoring system 40 may receive a data input from an external remote monitoring system data source, such as, for example, one or more ore all of the data sources 604, 606, 608 shown in FIG. 6, that identifies if the remote monitoring system user is present within the location that the remote monitoring system 40 is installed to. In some embodiments, location is a variable that can be modified and includes desk, building section, building and geographic area. Examples of external occupancy systems that link to this remote monitoring system 40 include:

Building security entry and exit logs informed by the use of user identification swipe cards.

Geo-location data provided by the power outlet 12 or power socket 10 user's phone GPS signal (also using 'indoor GPS').

Digital calendars specifying where a person is at a specific time.

Demand Side Response

Some embodiments of the remote energy monitoring system 40 have a function for a remote monitoring system 40 administration user to designate a power socket 10 or individual outlet 12 or group of power sockets (10) and/or individual outlets 12 as being eligible for Demand Side Response (DSR) functionality. DSR is a methodology where users of power are requested by a power grid operator to increase, lower or shift their electricity use at peak or low-use times. In some embodiments, the remote energy monitoring system 40 allows access by external DSR systems to control groups of power sockets 10. In this example the DSR uses the remote energy monitoring system control interface, with each power socket turning-on or turning-off power to a device connected to a power outlet 12 of the power socket 10. In some embodiments, many power sockets or outlets 10 across a large geographical range (including different building, cities, countries etc. . . . ) are grouped into a single 'virtual load'. This virtual load can be used together with other virtual loads as a larger single power or energy load for use by an external DSR system.

In some embodiments, where a power socket 10 is designated as eligible, the remote energy monitoring system 40 will have knowledge of the following for that power socket 10:

expected power and/or energy load if it isn't already using power,
power and/or energy load if it is already using power,
the time period the Power socket 10 can be controlled by external systems for, In some embodiments, this knowledge is initially input by a remote energy monitoring system 40 administration user. However, this data will be supplemented by historical measured system data for that specific Power socket 10 where appropriate.

Some embodiments of the disclosed power sockets are accordingly configured to implement a demand-side response to a network power grid power demand. The power socket may be configured to receive one or more demand-based signals from a remote server, for example, a remote server associated with a power grid operator, and, responsive to receiving the one or more demand-based signals, be configured to turn at least one relay on or off to control delivery of electrical power via the one or more power outlets. In some embodiments of the disclosed power sockets, the power socket is configured to turn off or on the at least one relay allowing power to flow by way of pre-set conditions based on the power monitoring data which may be provided, for example, by an external DSR system. This may reduce the wasted energy so as to make its "use" useful instead.

Threshold Analytics

In some embodiments, the remote energy monitoring system 40 uses the Threshold Analytics function to detect abnormal behaviour for security, safety and maintenance purposes external or internal to the system (e.g. in the building where the sockets are installed).

In some embodiments, the remote energy monitoring system 40 has access to the entire history of data recorded from a relevant Power socket 10 or group of devices (e.g. across a building) at all times. This access allows the remote energy monitoring system 40 to output long term metrics that recognise normal and abnormal behaviour in terms of the power drawn from a power outlet of that power socket 10 or from a group of power sockets.

In some embodiments, the remote energy monitoring system 40 develops thresholds of 'normal' power consumption based upon temporal, location, range and intensity of past power for each Power socket 10 and for overlapping groups of Power socket 10's that are classified into the same user grouping (e.g. Desktop Power Sockets). Example metrics of this function include:

Historical use times of devices (day of the week and time of day),
Duration of use (minutes of use),
Total energy used per time period,
Location of power use.

In some embodiments, the output of this function provides warnings to the remote energy monitoring system 40 user that include, for example, one or more of the following types of warning In some embodiments, a warning or alert indicates a power drawn anomaly. For example, if a power socket 10 has provided power to a continuously connected device 36 such as, for example, an appliance, and that device 36 has drawn a certain amount of power from a power outlet of the socket in a given period of time, for example, 600 W everyday between 1200-1600, the system can determine and issue an alert if the device 36 is now drawing a different amount of power, for example, 1000 W in the same period. Such a difference is useful as it can indicate the appliance is in need of preventative maintenance.

In some embodiments, a warning or alert indicates of a group of power sockets 10 that is exclusively used within a certain power profile previously will now a dramatically changed group profile. For example, such a change might indicate to a building manager that a team of people is working late. This could also be relevant for reassessing if the power sockets require attention for fire safety purposes.

In some embodiments, a warning or alert indicates increased use if one or more power sockets 10 aren't used at all or very infrequently now are used more or more frequently In some embodiments, a warning or alert indicates if one or more power sockets 10 are being accessed at odd times compared to other Power sockets 10 in the same group (e.g. in a same building).

In some embodiments, a warning or alert indicates unusually high-power use compared to other Power socket 10s.

In some embodiments, a warning or alert indicates a significant deviation (for example, more than 10%) from the grid standard voltage (for example, 110 v, 220 v, 230 v depending on country) and a current maximum for the circuit source of mains power (for example, in the UK, a ring mains current is typically 13 amps).

In some embodiments, to enable threshold analytics, there must be at least a long duration of data collected by the remote energy monitoring system, typically this may be a month or so of data for one or a grouping of power socket 10s. A user may be requested to confirm the month was not atypical, i.e. that the usage in that month represent a 'normal' month of use (e.g. no large events, holidays, etc.).

In some embodiments, a user of the remote energy monitoring system 40 is able to select one or many devices for analysis using a threshold analytics software module interface provided in the front end 38 of the remote monitoring system 40 and select which long term metrics to focus on (see list above).

In some embodiments, the remote energy monitoring system 40 uses the past data to form a standard pattern of use based upon the metric being analysed. This can use a minimum of one month of data up to a maximum of twelve months. In some embodiments, a user of the front end 38 of the remote energy monitoring system 40 can also specify time periods of data to use to avoid unusual times.

In some embodiments, for each hour of each day during the historical data period, an average pattern of power use is generated.

In some embodiments, the remote energy monitoring system 40 then analyses each hour of each day and applies a weighting based upon standard deviations from the average.

In some embodiments, a user of the remote energy monitoring system 40 is able to use number of standard deviations from the average as a sensitivity parameter. Anything above the threshold of the standard deviation is flagged as a warning and forms the basis of a report with larger deviations being weighted as more urgent to review.

Tap for Power

In some embodiments, a 'Tap for Power™' function of the remote energy monitoring system 40 enables a user of a power socket 10 to register with the power socket 10 before power provision is enabled. This process utilises the short-range communications functionality of the power socket 10 and the ability of an external user operated device to generate a short-range wireless signal, such as an NFC signal or Bluetooth signal or the like. This process may, in some embodiments, require a gesture to initiate the generation and/or sending of the power request signal from the user device, for example a 'Tap for Power' gesture, whereby a user 'taps' their device against, or very close to, a power socket 10.

In some embodiments of the physical 'Tap for Power' method, the power socket 10 also records that the request for power was generated as a result of a physical interaction or "tap" with the power socket 10. This advantageously enables the remote energy monitoring system 40 to confirm that the user requesting power was physically near the power socket 10 and may also help confirm the particular outlet of the power socket 10 which is to be enabled.

In some embodiments, a secondary method to enact 'Tap for Power' also exists in software functionality at the remote energy monitoring system which enables a user to input a known power outlet and/or socket identification code to access power from a power outlet of the power socket.

In some embodiments, the remote energy monitoring system provides a function which allows a user to register a power socket 10, or group of power sockets 10 they will want to use or are using as group which is linked together in a 'Tap for Power' grouping.

In some embodiments, a power socket 10 by default is in disabled state, which means no power will be provisioned to the user.

In some embodiments, the remote energy monitoring system 40 administrator has a series of options regarding the action taken by the Power socket 10 once a user is registered, for example:
  enable Power socket 10 for a defined time period
  enable Power socket 10 until the user 'Taps' the Power socket 10 again
  enable Power socket 10 once the user has agreed to a rate of payment for using the power socket 10. In all of the above options, a power outlet of a power socket may be designated in some examples where a power socket has more than one power outlet.

In some embodiments, a payment for energy use is required for which a rate of payment may be input by an administrator user of the remote energy monitoring system 40 during the setup period of the remote energy monitoring system 40 and is either a per watt hour (Wh) or flat fee for a set time period. In some embodiments, optionally, a time period of free energy or time before being charged can be set. For a user, the payment method is dealt with through a separate and dedicated software interface.

In some embodiments, the Remote energy monitoring system 40 administrator can setup 'Exception Handling' for Power sockets 10 or Users. In some embodiments, a specific remote energy monitoring system 40 software function allows power sockets 10 and users to be designated as an exception to the rule sets, overriding the payment and time limits. This allows exceptions to be specifically selected by the remote energy monitoring system 40 administrator user and/or enables the administrator user to receive, review, and grant or deny a list of exception requests from users of the remote energy monitoring system 40.

Administration Software ('Hub')

In some embodiments, the remote energy monitoring system 40 includes an administration hub component in the energy management front end 38 which contains a suite of control and monitoring functions for the remote energy monitoring system 40 and power sockets 10, which an administrator user can access from the front end 38. Each access to the Administration Hub may be termed a user session.

Login and Registration

Login allows a remote energy monitoring system 40 user to access the Administration Hub in the front end 38 and begin a session. The user will input previously registered details or follow a process to retrieve lost details where relevant. If the user has not previously registered, they can register for the first time.

Login and Registration will utilise the remote energy monitoring system 40 server previously disclosed above.

Power Socket Selection

In some embodiments of the remote energy monitoring system 40, a power socket selection function allows one, many or all power sockets 10 to be selected for the purpose of being controlled or monitored by a user.

In some embodiments, the user selection of a power socket changes during a user's session.

In some embodiments, a user is able to save one or more selections of power sockets 10 under a heading of their choosing; the data is stored in the remote energy monitoring system 40 global data base of data for all power sockets.

In some embodiments, a user is able to recall a previously saved power socket selection. Once a user selects their one or more power sockets 10, the remote energy monitoring system 40 returns a list and details about the chosen power sockets.

Power sockets may be selectable individually or by a logical grouping in some embodiments. For example, in the case of selecting an individual power socket 10, a power socket Unique ID is utilised in some embodiments. The power socket identifier or ID can be manually obtained from a physical power socket 10 by a user inputting the power socket ID to the remote energy monitoring system in some embodiments, and in other embodiments, the power socket ID is automatically identified if the user is using a device with NFC capability which can then read a RFID tag which identifies power socket.

In some embodiments, to select a logical grouping of power sockets 10, options to select by location metric (i.e. Building, Floor and Section), by the amount of power (less than, equal and more than X Watts), Current (less than, equal and more than X Amps), whether the socket is On or Off and the User ID of the Socket user are made available to users. This data is also stored and accessed from the Remote energy monitoring system 40 global database or datastore in some embodiments.

In some embodiments, control over the power delivered by a power socket 10 becomes available as soon as a user has selected the power sockets. The control enables the user to switch power on and off to all power sockets 10 and/or power outlets 12 of those power sockets 10 that the user has selected.

Reporting

In some embodiments, the energy monitoring system provides a report which is configurable by a user for selected power sockets 10. The report is generated using available (and relevant) metrics stored in the global data base of the power characteristics and one/of status of power sockets of the remote energy monitoring system 40. A report is bounded by a user-selectable time period. A report can be saved as a pre-set report so as to be quickly accessed again. Example Metrics include: Energy (kWh), Actual Emissions (Kg CO2e), Average Emissions (Kg CO2e), Energy Cost (£).

Start Date and End Date are the data bounds and the granularity of data on the report are selectable by either minutes, hours, days, weeks, months, or years. The output of the report selection can be a Graph or a table of relevant data.

Analytics

In some embodiments, a number of in-depth analytic functions are available to the user. Within each function, the option to disregard the current selection of devices and instead include all devices registered to that user is available. Examples of In-Depth Analytic Functions: Hot Spot Analysis The Hot Spot Analysis function provides a ranked list of Power sockets 10 according to a chosen and available metric, logical grouping and time period.

Example Metrics: Energy (kWh), Emissions (Kg CO2e), or Energy Cost (£)

Logical Grouping of Power socket 10s: location (i.e. Building, Floor and Section), by the amount of power (less than, equal and more than X Watts), current (less than, equal and more than X Amps).

Examples of In-Depth Analytic Functions: Forecasting

In some embodiments, a Forecasting function provides a manner to accomplish forecasting of the various metrics collected by the System. The function processes data collected from the Device Selection or across the entire Device range according to a series of variables.

Two key Forecast Type examples are 'Reduction over time' or 'Turn off'. 'Reduction over time'—A percentage reduction amount, the metric to be analysed, and the period of forecast (weekly, month on month, annual) are offered as variables. The 'Future start and end date' is compared to one year previous to that date in order to make an assessment of change. Time comparison is only available where relevant historic data is available. 'Turn Off'—Device Grouping and time period are offered as variables. 'Grouping' is one of the many location fields (e.g. Floor, section, etc.). Time period is either Weekdays nights, Weekend nights only, all week nights (nights mean 2200-0600).

Examples of In-Depth Analytic Functions: Anomalies

In some embodiments, this function automatically highlights Power sockets 10 that do not conform to normal use patterns within a group of selected devices.

Examples of In-Depth Analytic Functions: Comparison and Gamification Tasks

In some embodiments, this function provides an interface for one or more users to compare one or groups of power sockets 10 against each other in order to assess differences in energy, emissions and cost over time periods. This function begins by allowing a user of the remote energy monitoring system 40 to select two or more groups of power sockets 10 and include these in comparison buckets. The selection process can be by any available remote energy monitoring system 40 metric (for example, all Power sockets 10 in Location X into bucket 1 and those in location Y into bucket 2).

In some embodiments, the user then selects one or more Remote energy monitoring system 40 metrics to be compared between the selections of power sockets 10 (for example a comparison of Total Energy). The user then selects a time period that can include the past and the future, for example, up to a maximum of 1 year and with a granularity of 1 day. The user then selects an output metric that will be the basis of comparison over time. In some embodiments, the user is able to select the output metric by either Total or Average device (for example, Total Energy per Power socket 10 on Average). The comparison setup is then saved as a 'comparison task' into a list of all tasks. The option to delete, modify or archive the tasks is available.

Power Socket List

In some embodiments, a power socket 36 list provides an inventory for each power socket 10. In some embodiments, all power sockets 10 in a group of sockets which are associated with (for example, which are owned) by a user can be listed. The data displayed in a list may include a power socket ID, a Device Type identifier for a connected energy consuming device (which may, in some embodiments, optionally also include a device model ID), a power socket location, a power consumption of a connected energy consuming device 36, the energy status of the power outlet providing energy to that device, and a user ID.

In some embodiments, the power consumption data may update data ever few seconds, for example, every 5 seconds, where a power socket is providing power to an energy consuming device 38. Each power socket 10 and/or energy consuming device 36 in the listing will have a most recent summary of its current information and will be have a link to a 'live dashboard' provided by the remote energy monitoring system 40 in front end 38 which users of the system 40 can access using an appropriate application on their own user device and/or via a web-portal.

Device Dashboard

In some embodiments, the device dashboard presents a single power socket's live and historical energy, emissions and use information and provides control functions for the power socket 10.

RuleSets

In some embodiments, the remote energy monitoring system 40 features a 'rule sets' engine and interface with the purpose of being able to instigate user created 'rules' in order to control the relay(s) 18 of power socket(s) 10. Each rule set provides the ability to control (on and off) the relays 18 of power sockets 10, for a given user-based selection of power sockets 10.

In some embodiments a rule set function consists of the following variables:

Time and Date variables, for example, the time period and date that one or more power sockets 10 relay should be switched-off or on (i.e. stopping or starting the provision of power). Where the rule is desired to be 'reoccurred', the user can select either a daily, weekly, monthly or yearly reoccurrence. For example, Daily=either every X day, Weekly=Recur every X week on Y day of the week (where Y can be 1 to 7 days of the week), Monthly=Every X day of the month, Yearly=Every month X and day Y of the year.

Rule Threshold variables, for example, if required, a Rule can be run on power sockets 10 only where a threshold of a Remote energy monitoring system 40 set metric is met. Examples include: where power is more than a set amount (e.g. Watts>=1000), where current is more than a set amount (e.g. Amps>=5), where energy during a set time period has exceeded a set amount (e.g. Energy>100 watthours over the past 5 hours). In some embodiments, of power and current rules, a power socket 10 function is utilized to process the rule rather than just using software.

Prioritised Green Energy Provision variables, for example, in some embodiments, a rule can be setup to switch power on or off at any time to an attached device based upon the current carbon emissions of the local grid that the power socket 10 is using. The remote energy monitoring system 40 user can set a desired level of carbon emissions that would enable or disable power provision in some embodiments, and in some embodiments, data for the carbon emissions of the local grid is taken from the impact indicator sub-remote energy monitoring system of the remote energy monitoring system 40.

In some embodiments, a minimum time for power provision is also set by the remote energy monitoring system 40 User to avoid switching connected devices on and off too quickly (for example, with 2 minutes being the lowest possible choice).

Prioritised Energy Provision variables, in some embodiments, a rule can be setup to switch power on or off at any time to an attached device based upon a variable external feed of data with one or more metrics. In some embodiments, a user of the Remote energy monitoring system 40 is able to set a desired rate that would enable or disable power provision. Examples include: Cost of Energy examples: Data for the cost of energy is taken from a data feed from the grid operator. For example, turn power-on to a connected device when the cost of energy is below £0.13. Weather examples where data for one or more of a temperature, rain amount and humidity levels is taken from a selected external data feed. In some of these examples, power provision is set on or off based upon thresholds of temperature, rain amount and humidity levels with each having a priority level and range. In some embodiments, a minimum time for power provision is also set by the user of the remote energy monitoring system 40 to avoid switching connected devices 36 on and off too quickly (with 2 minutes being the lowest possible choice).

Priority handling variables may be provided, for example, in some embodiments. For example, in some embodiments, a rule set can be applied to more than one power socket 10. Where the rule set overlaps with another already created rule, the priority level will be used to determine the running order of the rule sets. Only one rule can have one priority level. The Remote energy monitoring system 40 will run through the rule set priority listing and execute the final command that was determined to be the top priority.

Rule Exception Handling variables, for example, enable, when selected, for power sockets 10 that are classified as exceptions to not have a rule set applied.

In some embodiments, some power sockets 10 are required to be exempt from automated control, rule sets or user control. In this simple interface, one or more power sockets 10 are able to be selected for exceptions from the various control methods available within the System. This interface also links with the remote energy monitoring system 40 user software exception requests, and an Administrator can confirm or deny a request made to them. The 'Tap for Power' remote energy monitoring system 40 also allows remote energy monitoring system 40 users to activate exceptions.

One embodiment of the remote energy monitoring system uses the exception rules software functionality to enable a user to set one or more power sockets 10 as 'free for all' status rather than meter their supply. This means the power socket 10 can be used by any remote energy monitoring system 40 user who requests access to it.

Remote Energy Monitoring System User Software

In some embodiments, the Remote energy monitoring system 40 features a number of functions made available in a user interface of a software system for a user of a power socket 10 to interact with the remote energy monitoring system 40. In some embodiments, this user interface functionality software system is implemented differently to the user interface of the administrative software of the remote energy monitoring system 40 which provides the software management functions which are made available to administrative users of the remote energy monitoring system 40, for example, via energy management front end 38. The user interface for the user of a power socket may be provided as a separate application for a user device such as their mobile phone, table, personal computer or the like or via a separate web-portal or by enabling different functionality on the web-portal of the front end 38.

The user software in some embodiments enables a user to register with the remote energy monitoring system. For example, in some embodiments, a power socket 10 requires a user to be registered with the remote energy monitoring system 40 in order to utilize a socket of the remote energy monitoring system 40 and/or drawn power to a device using a power socket 10. Some embodiments of the user software provide a function which available to remote energy monitoring system 40 users to input their registration details.

Registration of Power Sockets

In some embodiments, once a user is registered, they can proceed to add power sockets 10 to their account in order to utilize functions such as activation, control and monitoring of the energy provided by power outlets 12 of the power sockets 10. To identify a relevant power socket 10 (and optionally, in some embodiments, a particular power outlet of a power socket 10), a user may receive the unique identifier which written onto each power socket 10 by first, using a personal device (such as a mobile phone, tablet, personal computer etc.) that interacts with the power socket's Near Field Communication (NFC) function to receive identification details (using RFID hardware). In some embodiments, the identification information may be visibly displayed on the power socket and/or otherwise provided to a user and the user may then read the identification number and manually input this into a function of the software running on their personal device so as to identify the power socket 10 in the registration request sent to the remote energy monitoring system 40.

Once the identity of the power socket 10 is input into the power socket registration function, it will be checked against the global database of power sockets and allocated to the user in the event it is not currently registered to any other user, the User is not known to the Remote energy monitoring system 40 administrator, or the Power socket 10 is pre-set to 'free for all' status. To confirm the device identification is correct, the power socket 10 may use the indicator 30, for example, an LED indicator may flash a set number of times which the user will be able to visually identify and confirm with the registration function of the software on their personal device.

In either case of registering power socket where the power socket is already registered to another user or the user is not known to the Administrator the following conflict resolution process will take place. Firstly, in some embodiments, where the user is known to the System, if the power socket the user is registering hasn't provided any energy for a certain period of time, for example, 60 minutes or more, the registration will automatically end for the previous user and move to the new user. Secondly, in some embodiments, where the user is known to the System, if the device the user is registering has used energy in a previous time interval, a message will be sent to the previous user (via a specific function on their personal device, for example) requesting release of their registration. If no response is received from the previous user within a short interval, for example, 30 seconds, the power socket is then registered with the new user.

One of two response outcomes follow in some embodiments: a response which indicates release of a power socket or power outlet which then allows new registration to continue or a response indicates the power socket or power outlet cannot be released for one of the following reasons: "I'm using the power socket/outlet", "No reason", "Security Alert". In the case of "No reason", the power socket 10 may be released to the new user immediately in some embodiments, and in other cases, a remote energy monitoring system 40 administrator may be alerted via a specific function to resolve the issue.

In some embodiments, where the user is not known to the System, first a request will be sent to the remote energy monitoring system 40 administrator indicating the request, the user registration details and an option to allow or prevent any access. In some embodiments, each user can have a maximum number of power sockets registered to them at any one time. Each can simply be deleted with the history of use recorded on the users own account history.

In some embodiments, once a user has registered and has linked with one or more Power sockets 10, a specific function is available to control power to appliances plugged or wired in. The user is also able to analyse current and historical energy of each device.

In some embodiments, a User Account History function provides the user with access to a history of their Power socket 10 use. The 'Account History' lists a total energy, emissions and cost amount for the user's total registration time. A list of previous device registrations, the time and date of access and their own energy, greenhouse gas emissions and cost totals is also be available to the user.

In some embodiments, the power socket user can request an administrator of the remote energy monitoring system 40 to be exempt from access rules through this exception function. The user can select one or more registered devices to be considered by the administrator and request a reason why they should be exempt.

Some of the above disclosed aspects and embodiments can be used by a power management system to implement a method of controlling power to a plurality of sockets according to any of the embodiments disclosed in the summary statements, detailed description or accompanying claims, for example, according to the eleventh aspect. An example of such a method comprises: using a method for determining an energy usage classification for power drawn from a power outlet of a power socket by a device, for example, by using a method including: receiving, by a trained energy usage classification ML model, an input vector including at least one or more power characteristics of power drawn by the device from the power outlet captured in a time segment and an identifier for a device type of the device, wherein the ML model is trained using, for example, a method for training an energy usage classification ML model to determine an energy usage classification for power drawn from a power outlet of a power socket by a device, for example a training method comprising: generating training data input vectors including labelled data received in time segments from each one of a plurality of power outlets, wherein each training input vector comprises, features identifying a time segment, a power outlet identifier, a device type identifier of a device drawing power from the power outlet in the time segment, one or more known power characteristics for the power drawn by the device in the time segment, and an known energy usage classification in the time segment; iteratively determining, for each input vector of the training data received by the ML model, an energy usage classification for power drawn by the device from the power outlet in the time segment associated with that input vector by processing, using the ML model, at least the features of the input vector representing one or more characteristics of power drawn from that power outlet by the device; determining an energy usage classification error based on a comparison of the energy usage classifications identified by output of the ML model with the energy usage classifications identified in the training data; and adjusting the weights of the ML model to reduce the determined energy classification error and repeating the iterative training steps and the determining steps until an energy classification optimization condition is met, or a ML model trained using any another method for training an ML to determine an energy usage classification model according to of any of the embodiments as disclosed in the summary section or detailed description or accompanying claims, determining an energy usage classification using the trained energy usage classification ML model; and outputting an indication of the determined energy usage classification, by using any another method for determining an energy usage classification model according to of any of the embodiments as disclosed in the summary section or detailed description or accompanying claims, determining the plurality of power outlets comprise a group of power outlets associated with a set of power consumption rules; determining a plurality of the power outlets of the group are providing energy determined by the indication output by the ML model to have a wasted energy usage classification; and, in dependence on at least one rule of the set of power consumption rules for the group of sockets, selectively actuating a relay on each one of one or more or all of the outlets of the group to turn off the delivery of power by the selected outlets.

Some embodiments of the disclosed methods are implemented using apparatus including a memory, a processor, and computer program code stored in the memory which when executed by a processor causes apparatus according to the eighth aspect to perform a method or a combination of the methods according to of any of the embodiments as disclosed in the summary section or detailed description.

In some embodiments, the apparatus includes a memory, a processor, and computer program code stored in the memory which when executed by a processor causes the apparatus to perform a method for training a machine learning, ML, model to identify a type of energy consuming device drawing power from a power outlet of a power socket, the method including: generating training data input vectors including labelled data received from a plurality of power outlets, wherein each training data input vector comprises at least features identifying a power outlet, a device type identifier for a device drawing power from the power outlet, and one or more characteristics of power drawn from that power outlet by the device in a time segment; iteratively determining, for each input vector of the training data received by the ML model, a device type identifier for a device drawing power from the power outlet associated with that input vector by processing, using the ML model, at least the features of the input vector representing the one or more characteristics of power drawn from the power outlet by that device; determining a classification error based on a comparison of the plurality of device types identified by output of the ML model with the plurality of devices types identified in the training data; and adjusting the weights of the ML model to reduce the determined device type classification error and repeating the iterative training steps and the determining steps until an energy classification optimization condition is met.

In some embodiments of the apparatus including a memory, a processor, and computer program code stored in the memory which when executed by a processor causes the apparatus to perform a method for training a machine learning, ML, model to identify a type of energy consuming device drawing power from a power outlet of a power socket, the method includes the features of any of the disclosed embodiments of methods for training a ML model to determine an device type identifier, for example, a method disclosed in the summary section or detailed description or accompanying claims.

In some embodiments, the apparatus includes a memory, a processor, and computer program code stored in the memory which when executed by a processor causes the apparatus to perform a method for identifying a type of device drawing power from a power outlet of a power socket by using a ML model trained by using, for example, a method for training a machine learning, ML, model to identify a type of energy consuming device drawing power from a power outlet of a power socket including: generating training data input vectors including labelled data received from a plurality of power outlets, wherein each training data input vector comprises at least features identifying a power outlet, a device type identifier for a device drawing power from the power outlet, and one or more characteristics of power drawn from that power outlet by the device in a time segment; iteratively determining, for each input vector of the training data received by the ML model, a device type identifier for a device drawing power from the power outlet associated with that input vector by processing, using the ML model, at least the features of the input vector representing the one or more characteristics of power drawn from the power outlet by that device; determining a classification error based on a comparison of the plurality of device types identified by output of the ML model with the plurality of devices types identified in the training data; and adjusting the weights of the ML model to reduce the determined device type classification error and repeating the iterative training steps and the determining steps until an energy classification optimization condition is met, or by using any another method for training an ML to determining an device type identifier according to any of the embodiments as disclosed in the summary section or detailed description, the method for identifying the device type comprising: receiving data including a power outlet identifier, one or more characteristics of power drawn from that power outlet by a device, and a time-stamp; determining an input vector for the trained ML model based on the received data; determining, using the trained ML model, a classification of the type of device drawing power from the power outlet; and outputting an indication of the determined classification of the device type.

In some embodiments of the apparatus including a memory, a processor, and computer program code stored in the memory which when executed by a processor causes the apparatus to perform a method for identifying a type of device drawing power from a power outlet of a power socket, the method includes features of any of the disclosed embodiments of a method to identify or classify a type of device drawing power from a power outlet of a power socket as disclosed in the summary section or detailed description er accompanying claims.

In some embodiments, the apparatus includes a memory, a processor, and computer program code stored in the memory which when executed by a processor causes the apparatus to perform a method for training an energy usage classification ML model to determine an energy usage classification for power drawn from a power outlet of a power socket by a device, for example, a method including: generating training data input vectors including labelled data received in time segments from each one of a plurality of power outlets, wherein each training input vector comprises, features identifying a time segment, a power outlet identifier, a device type identifier of a device drawing power from the power outlet in the time segment, one or more known power characteristics for the power drawn by the device in the time segment, and an known energy usage classification in the time segment; iteratively determining, for each input vector of the training data received by the ML model, an energy usage classification for power drawn by the device from the power outlet in the time segment associated with that input vector by processing, using the ML model, at least the features of the input vector representing one or more characteristics of power drawn from that power outlet by the device; determining an energy usage classification error based on a comparison of the energy usage classifications identified by output of the ML model with the energy usage classifications identified in the training data; and adjusting the weights of the ML model to reduce the determined energy classification error and repeating the iterative training steps and the determining steps until an energy classification optimization condition is met.

In some embodiments of the apparatus including a memory, a processor, and computer program code stored in the memory which when executed by a processor causes the apparatus to perform a method for training a machine learning, ML, model to determine an energy usage classification for power drawn from a power outlet of a power socket, the method includes the features of any of the disclosed embodiments of methods for determining an energy usage classification for power drawn from a power outlet of a power socket, for example, a method disclosed in the summary section or detailed description.

In some embodiments, the apparatus includes a memory, a processor, and computer program code stored in the memory which when executed by a processor causes the apparatus to perform a method for determining an energy usage classification for power drawn from a power outlet of a power socket by a device, the method including: receiving, by a trained energy usage classification ML model, an input vector including at least one or more power characteristics of power drawn by the device from the power outlet captured in a time segment and an identifier for a device type of the device, wherein the ML model is trained, for example by using a method comprising: generating training data input vectors including labelled data received in time segments from each one of a plurality of power outlets, wherein each training input vector comprises, features identifying a time segment, a power outlet identifier, a device type identifier of a device drawing power from the power outlet in the time segment, one or more known power characteristics for the power drawn by the device in the time segment, and an known energy usage classification in the time segment; iteratively determining, for each input vector of the training data received by the ML model, an energy usage classification for power drawn by the device from the power outlet in the time segment associated with that input vector by processing, using the ML model, at least the features of the input vector representing one or more characteristics of power drawn from that power outlet by the device; determining an energy usage classification error based on a comparison of the energy usage classifications identified by output of the ML model with the energy usage classifications identified in the training data; and adjusting the weights of the ML model to reduce the determined energy classification error and repeating the iterative training steps and the determining steps until an energy classification optimization condition is met, or by using any another method for training an ML to determining an energy usage classification or to classify energy usage according to any of the embodiments as disclosed in the summary section or detailed description or accompanying claims, determining an energy usage classification using the trained energy usage classification ML model; and outputting an indication of the determined energy usage classification.

In some embodiments of the apparatus including a memory, a processor, and computer program code stored in the memory which when executed by a processor causes the apparatus to perform a method of determining an energy usage classification (for example, by classifying energy usage), the method performed comprises features of any of the disclosed embodiments of a method to determine an energy usage classification (for example, by classifying detected energy usage) disclosed in the summary section or detailed description.

Some embodiments of the disclosed methods are implemented using apparatus according to the eighth aspect including a memory, a processor, and computer program code stored in the memory which when executed by a processor causes the apparatus to perform a method or a combination of the methods according to of any of the second to seventh, or eleventh aspects, or their embodiments as disclosed in the summary section or detailed description.

Some of the embodiments of the disclosed methods are implemented using a computer program product, for example, a computer program product according to the ninth aspect, comprising computer code which, when executed by a processor, for example, a processor of any of the above apparatus embodiments, implements at least one of the disclosed methods according to any of the second to seventh or eleventh aspects.

Some of the disclosed features of an energy monitoring system are configured to implement one or more of the disclosed methods or a combination of the disclosed methods according to of any of the second to seventh or eleventh aspects or their embodiments as disclosed in the summary section or detailed description.

In some embodiments, the energy monitoring system is part of a power management system including: a plurality of power sockets according to the first aspect or any of the embodiments of that aspect as disclosed in the summary section or detailed description or accompanying claims; and at least one apparatus according to the eight aspect or any embodiments of that aspect as disclosed in the summary section or detailed description.

Some of the apparatus embodiments are configured to perform a method for indicating an energy usage classification for a device drawing power from a power outlet of a power socket, the method including: using a disclosed method to determine an energy usage classification for the power drawn from the power outlet by the device; and generating a control signal to cause an indication of the determined energy usage classification for that power outlet to be displayed by an energy usage indicator on the power socket.

Some of the apparatus embodiments are configured to perform a method for controlling power to a plurality of sockets, the method including: using a disclosed method for determining energy usage classifications or for classifying energy usage to determine energy usage classifications for each one of the plurality of power outlets; determining the plurality of power outlets include a group of power outlets associated with a set of power consumption rules; determining a plurality of the power outlets of the group are providing energy determined by the ML model to have a wasted energy usage classification; and, in dependence on at least one rule of the set of power consumption rules for the group of sockets, selectively actuating a relay on each one of one or more or all of the outlets of the group to turn off the delivery of power by the selected outlets.

In particular, but not exclusively, in all of the above disclosed embodiments which refer to a power socket, the power socket may be, for example, part of an electrical mains power circuit or fused spur or the like such as can be found in a residential building or commercial premises, where one or more electrical devices may use electrical power. However, in some embodiments, a power socket may also be provided on a train, boat, plane, or caravan and be integrated into a floor, wall, ceiling or item of furniture. Some embodiments of power sockets disclosed are connected to mains electrical power circuits however, in some embodiments, the power sockets may form an extension power socket which is plugged into another power socket. In some embodiments, the power socket is hard wired, however, in some embodiments, it is connected using a power coupler. In some embodiments, a power socket comprises a power outlet in the form of a fused spur, rather than as a socket for a removable plug.

Figure 11:
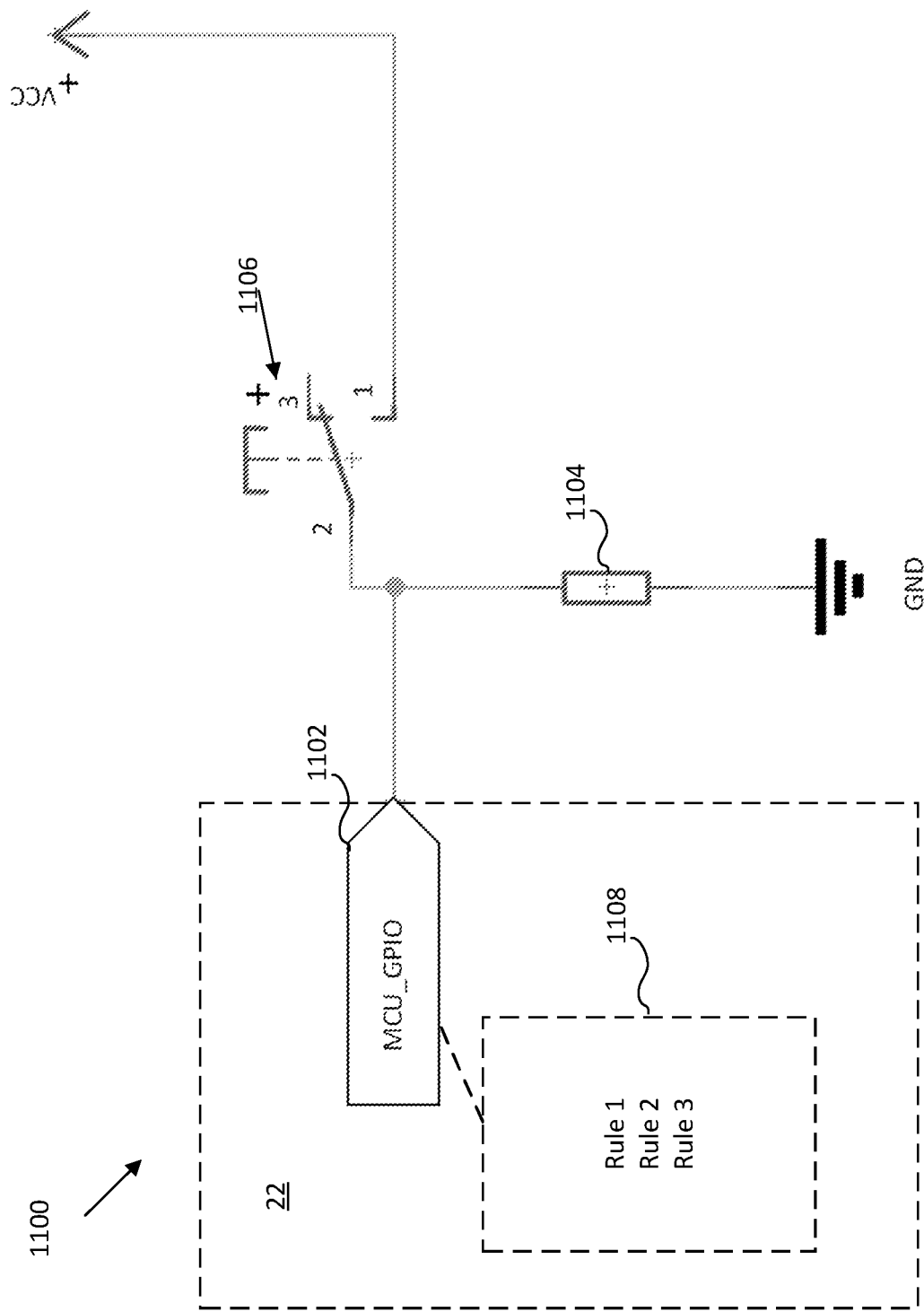
FIG. 11 shows schematically an example electrical design of a software-controlled switch of an electrical power outlet according to an embodiment of the present disclosure.

In some embodiments of the power socket 10, the power socket further includes at least one external switch or lever 1100 which a user actuates. Actuation of the switch by a user causes functions to be executed which are software controlled. The external switch or lever 1100 is also referred to herein as a software-controlled switch 1100. A software-controlled switch 1100 may be configured to turn on and off the delivery of power via at least one power outlet 12 in some embodiments, however, it can do other things depending on its software ruleset configuration. FIG. 11 shows schematically an example of an electrical design of a software-controlled switch 1100 of an electrical outlet 12 of any of the disclosed embodiments of a power socket 10 in which the power socket includes at least one software-controlled switch 1100 per outlet 12. A software switch 1100 is provided in the front panel of the power socket 10 so that it can be accessible and activated by tactile input, which may take the form of switching on or off a physical actuator such as a switch presented on the power socket, for example, a switch or lever presented on the socket front panel, typically provided alongside, above or below the power outlet 10 of each gang of the power socket. For example, for example, a dual-gang socket would have two software-controlled switches 100 and a four gang extension lead would have 4 software-controlled switches 1100.

In some embodiments of a power socket, the software-controlled switch is a human-actuated tactile switch comprising a mechanical mechanism 1106 such as that shown schematically in FIG. 11. Depressing the mechanical mechanism 1106 sends a signal or other form of data to the micro-controller which indicates at least that it has been actuated, and which may also indicate how it was actuated if the tactile switch is configured to distinguish different gestures or modes of activation.

The functionality provided by the actuated switch 1106 is determined using software including a switch functionality ruleset. The switch functionality ruleset 1108 comprises one or more rules for triggering functionality which are coded and executed by the microcontroller 22 of the power socket 10 or a dedicated MCU_GPIO 1102 as shown in FIG. 11, to provide the functionality triggered by actuation of the software controlled switch 1100.

In some embodiments of the software-controlled switch 1100, the ruleset comprises one or more rules for an actuation of the tactile switch to trigger one or more types of functionality based on the current or historic power characteristics of a device connected to the power outlet 12 that the software-controlled switch 110 operates. The rules may configure the duration of power and/or the total amount of power and/or another characteristic of the power delivered via the power outlet the switch 1100 controls. One or more of the rules may also be dependent on the type of connected device. One or more rules may depend on the time or day. One or more rules may depend on the type of gesture actuating the software controlled switch, or how many times the tactile contact 1106 has been activated in a given period of time. The microcontroller 22, 1102 may be configured, when a switch functionality ruleset update is received from a remote platform, such as a remote server of the energy monitoring system, to implement the switch functionality ruleset update to alter the switch functionality in some embodiments.

Accordingly, some of any of the above the disclosed embodiments of power socket 12 may be embodiments of a software-controlled power socket 12 comprising one or more switches 1100 where the function of actuating the switch is software-controlled. The switches are tactile, in that different physical user interaction with the switch or gestures detected by the tactile switch will trigger different functionality. For example, a user may repeatedly operate the switch on and off in a given period to invoke a change of duration of delivered power, with a simple on configuring a 4 minute power flow for example, but a rapid on/off/on switch sequence invoking an 8 minute power flow, and a rapid on/off/on/off/on switch sequence invoking a 16 minute power flow.

In some embodiments, the software controlled switch may be actuated using other gestures such as a tap gesture which is sensed or which physically operates the switch. By configuring the power socket to detect a tap gesture by a user, for example, a tap on the front plate or top edge of the power socket, it may be easier for the user to activate a switch on and off. The power outlet may be configured to deliver power through at least one of the one or more power outlets responsive to detecting the tap gesture or gesture, for example, one tap may allow 10 minutes worth of power to be drawn, however, three taps in succession might actual the software switch to provide 30 minutes of uninterrupted power.

It will be appreciated that the above examples are merely for illustrative purposes, and a variety of different time periods could be used, and it may also be possible to change the durations so that, for example, a first tap or switch flick provides 5 minutes of power, two rapid taps or flicks activate 15 minutes, and three an hour of power. In some embodiments, after the first power period has expired, the second power period may be shorted. So, for example, activating an outlet to provide an hour of power may be provided when the switch is first activated in a 3 hour period, but a second activation upon or within 10 minutes of the hour expiring or being about to expire would activate only 30 minutes.

As shown schematically in FIG. 11, the electrical design of the software-controlled switch 1100 includes a tactile (tact) switch 1106 which is connected to a general purpose input/output, GPIO, pin 1102 of the main controller unit, MCU 22, of the power socket 10.

As illustrated in FIG. 11, the software-controlled switch 1100 is a human-actuated tactile switch that tells the MCU 22 when it has been pressed. The functionality of the switch 1100 is then determined through code on the MCU 22. Rules and functionality of the switch 1100 can be sent to the MCU 22 from the remote energy monitoring system 40 or from another cloud platform to alter the nature of the switch functionality. For example, a ruleset 1108 could be provided in which allows the energy monitoring system to turn off all sockets 10 in a building after 9 pm. An addition to this rule could be the ability for manual override, so if an employee arrives after 9 pm to do some work only to find no power available, they could press the button of the software controlled switch 1106 on the socket 10, immediately allowing power to flow for a pre-set time. Equally, if the person in charge of rules wanted to prevent people doing this, they could disable manual override. The tactile switch may also incorporate other features and functionality such as a fingerprint detector in which case the functionality invoked may be based on the identity or role of the user actuating the tactile switch. This may also be useful for some connected devices in some embodiments, for example, for authenticating the device/user is to be given access to power via that power outlet 12 or via any outlet of a power socket 10.

In some embodiments, the software controlled switch(es) 1100 of the socket 12 may be configured to only provide power via outlets 12 of that socket 12 to devices which have paired with a Bluetooth or RFID data transfer to the socket or which can provide some other form of identifier when they are physically engaged with a power outlet 12. For example, an RFID tag or Bluetooth identify may be used to provide a device or user identifier which is authenticated by the socket responsive to the software switch 1100 being activated as being a device or user identifier authorised to draw power from that particular socket/outlet. This could be used for authenticating automatic payments from an account associated with a device drawing power or a user associated with such a device so that power drawn via the outlet will be automatically invoiced/paid for in some embodiments. Another example of a use for the switch 1100 on a power socket 10 involves a pre-set timer for socket power, for example; if the pre-set timer is set remotely to allow a duration of power time which by default is set to an hour of power being supplied via an outlet 12 on the power socket 10, users of the socket could press the button to let power flow to their devices for an hour before turning off, preventing circumstances in which users accidentally leave devices on after they have finished using them by prompting regular interaction with the power socket 10.

As the MCU 22 on the power socket 10 can determine for how long a button was pressed for, further functionality can be added that is access by pressing and holding the button for a certain length of time, for example, if the socket was transmitting data back to the cloud in ten minute intervals, pressing and holding a button for five seconds could enable a manual push of data to the cloud or other remote platform, such as the energy monitoring system 40 (for example, see FIG. 3).

Embodiments of the disclosed sockets include one or more software-controlled switches are accordingly capable of being configured to provide a number of variations of potential rules and use cases.

Figure 12:
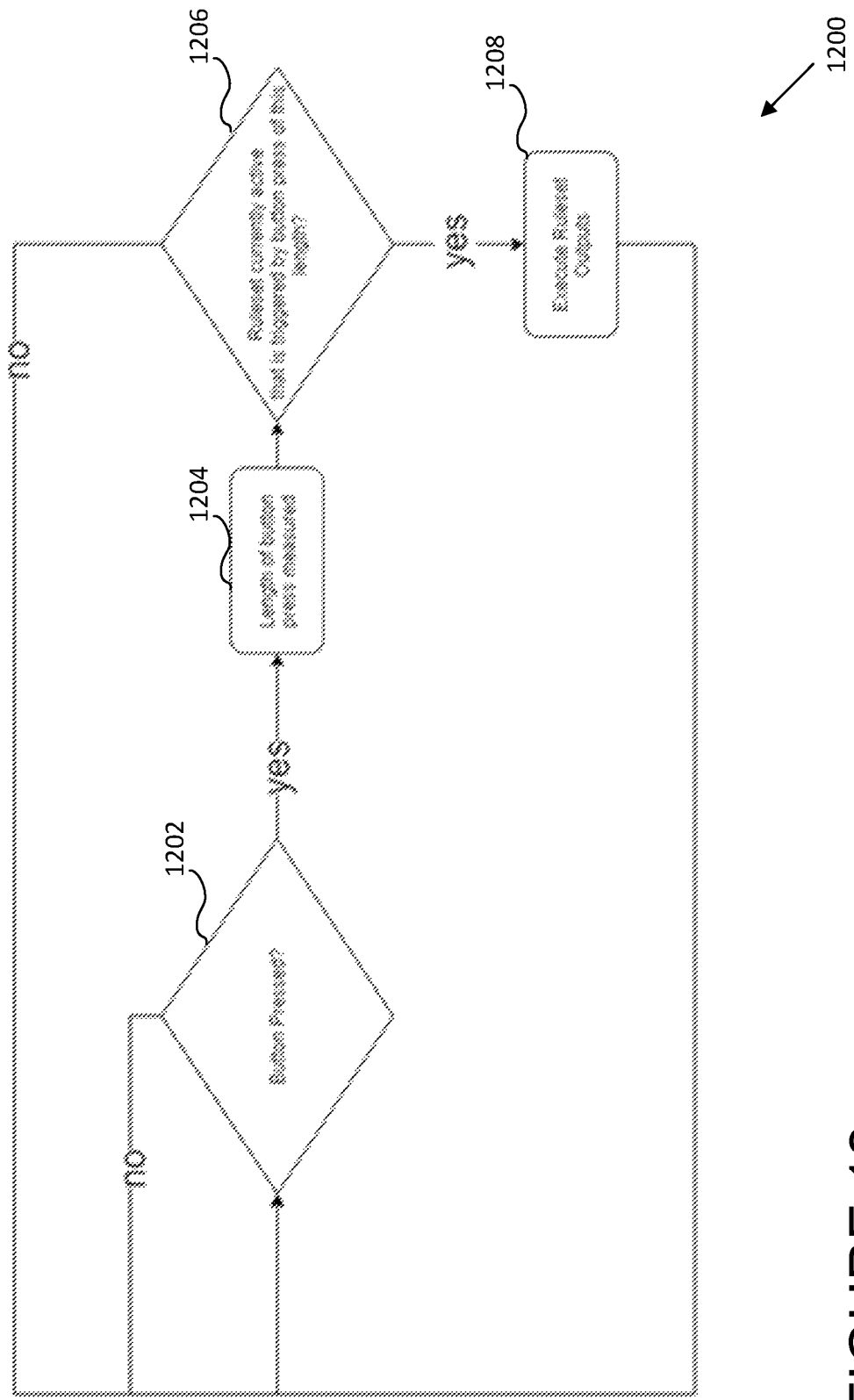
FIG. 12 shows schematically an example flow diagram for actuating a software-controlled switch according to some embodiments of the present disclosure.

FIG. 12 shows schematically a flow diagram of an example embodiment of a method 1200 of providing functionality on a power socket 12 according to any of the disclosed embodiments comprising a software-controlled switch, also referred to as a smart switch, 1100. As shown in FIG. 12, when the switch 1100 is activated, for example, by pressing 1202 a button on the smart switch, a pattern or characteristic of the touch input is determined, such as the pressure, the length of button press, the number of presses in a given time period. As illustrated, the length of button press is measured 1204. The touch input may be to a mechanical switch or lever provided on the front plate or fascia of the power socket 10. In some embodiments the soft-switch may be implemented as a touch screen or touch or tactile input sensor, or some other form of tactile gesture sensitive sensor, in which the direction of tactile input may also determine the nature of the ruleset triggered by the gesture in a manner equivalent to the currently active ruleset 1108 on the power socket 10 that would be triggered by a manual button press.

As illustrated, the ruleset 1108 which is currently active on the power socket 10 is triggered 1106 by the measured button press length measured in 1204. In some embodiments, the ruleset 1108 may be hierarchical, such that previous input(s) may determine the action taken by a subsequent input. For example, if a touch or gesture triggers a power extension time of 15 minutes and another touch or gesture input is received within two minutes of the 15 minutes expiring, the subsequent touch or gesture input may be the same gesture or touch, but only trigger an additional 10 minutes of power.

As illustrated in FIG. 12, if the currently active rule set 1108 includes one or more rules which are triggered 1106 by a button press of the measured length, those one or more rules are executed 1208. This may result in a change to the delivery of power via the outlet 12 which is controlled by that switch 1100. If there are no rules triggered by the button press of the measured length, no change to the delivery of power via that outlet 12 occurs. Whether a rule changes or does not change the delivery of power, in other words, whether power via that outlet 12 is switched on or off and/or whether a duration of power delivery via that outlet 12 is changed, and/or whether an amount of power delivered or to be delivered via that outlet 12 changes, depends on the specific ruleset currently active for that outlet 12.

In some embodiments, the power socket 10 further includes for each power outlet 12 a plug engagement detection mechanism 1300 configured to detect at least one pin 1302 of a plug (not shown in FIG. 13A or FIG. 13B for clarity) in that power outlet 12 independently of whether an electrical device is drawing power via the plug from that power outlet 12. FIG. 13A shows schematically an example electrical design of a physical plug engagement detection 1300 mechanism of an electrical power outlet 12 of a power socket according to some embodiments of the present disclosure in the case where a plug is not physically present in the electrical power outlet 12 according to some embodiments of the present disclosure.

FIG. 13B shows schematically an example electrical design of the physical plug engagement detection mechanism of FIG. 13B in the case where a plug is physically present in the power outlet 12 according to some embodiments of the present disclosure.

The example embodiment of a Physical Plug Engagement Detection Mechanism (PPEDM) 1300 illustrated in FIGS. 13A and 12B is designed to determine the presence of a plug in an outlet 12 of a power socket 10 regardless of whether an electrical device connected via the socket is drawing power via that power outlet. In some embodiments of the disclosed power socket 10, a PPEDM is provided for each outlet 12. In some embodiments, the PPEDM is configured to determine an electrical device is present by physically detecting the presence of one or more or all of the pins 1302 of a plug within a power outlet 12 of a power socket 10 of any of the disclosed embodiments. As illustrated in FIGS. 13A and 13B for the sake of clarity, an example of a PPEDM which detects at least one pin 1302 from a plug inserted in any given socket on a power outlet will be described, however, the detection mechanism may be replicated for any other pins which could be inserted into the power outlet 12 and the detection of a plug being present in the socket may be based on the detection of one or more pins of the pins of the plug. In this way, a plug which, for example, is only two pin as an earth pin is omitted, may also be detectable by a power outlet which is also configured to provide power to three pin plugs where the earth pin is provided. Accordingly, in the embodiments disclosed herein of a PPEDM, a pin 1302 of a plug may be the only pin 1302 of the plug or one of a plurality of pins 1302 of the plug.

An example of a plug with one pin is a power lead for an electronics device such as, for example, a USB-B or USB-C or similar type of power plug or connector (which may be used to power portable communications, audio and computer equipment). The pin 1302 illustrated in FIGS. 13A and 13B may, as mentioned above, also be for example either a neutral pin or a live pin of a plug which does not have an earth pin, or a neutral or live pin of a 3-pin plug including a neutral pin, a live pin, and a ground pin.

By providing a PPEDM to a power socket such as any of the disclosed embodiments of a power socket, an improved smart power socket 10 is provided which can, for example, capture plug presence data. The plug presence data can be reported to a remote energy monitoring system 40 which provides information about the times connected electrical devices are physically present in a power outlet regardless of whether the electrical device is drawing power, as well as their power consumption.

The presence of a plug insertion may be by the relay being mechanically moved, alternative, the gate which is lowered by the earth pin may be moved.

There are two main areas this function supports: practical and data support. Practically, knowing when a plug is not present in a socket enables the device to turn off features that only work when something is plugged in. For example, there is no need for the MCU 22 of a power socket 10 which includes a PPEDM 1300 to always be monitoring for power being drawn through a power outlet 12 or to transmit data indicating there is no energy being drawn via that outlet to the remote energy monitoring system 40 when there is no plug present which results in reduced power consumption by that power socket 10. Another practical benefits to users of some embodiments of power sockets 10 which include a PPEDM 1300 include ruleset generation that takes into account the action of plugging in appliances to outlet(s) on that power socket 10.

For example, a ruleset that turns off connected electrical devices overnight could have an overrule that allows users to plug in devices so they will operate for x minutes after the appliance is plugged in could be provided. Another technical benefit of providing a PPEDM 1300 on a power socket is data management is made more energy efficient as, by not collecting power monitoring data from outlets 12 that have no electrical device/appliance plugged in, the amount of data which would otherwise be stored automatically is reduced which also saves both storage and processing costs. Another data support feature is that of automatic delimiting of data sets for labelled and unlabelled data sections for machine learning. Determining when an electrical device was plugged in and unplugged would otherwise require processing an endless stream of power monitoring data from a power outlet 12, and the ability to determine precisely when a given electrical device or appliance was plugged in and then unplugged using a PPEDM 1300 according saves valuable processing time. The PPEDM 1300 accordingly allows plug presence data can be automatically fed to the machine learning models 44a, 44b with more labelled data. In some embodiments, the PPEDM 1300 is implemented using a type of mechanical switch, which is actuated by either making or breaking an electrical circuit. This made or broken circuit is detected through the GPIO 1102 for example of the MCU 22.

FIG. 14 shows schematically a flow diagram for an example embodiment of a method 1400 of detecting the physical presence of a plug in a power outlet 12 of an electrical power socket 10 according to some embodiments of the present disclosure.

As illustrated in FIG. 14, when a PPEDM 1300 for a power outlet 12 of a power socket 10 detects 1402 insertion of a plug into that power outlet 12 it triggers a plurality of actions by the power socket 10. As illustrated, responsive the detection 1402, the actions that may occur include data transmission to the remote energy monitoring system 40 or other remote server, for example, as illustrated, a server in the cloud, increases 1404. The power monitor of socket 10 increases the frequency at which the power monitoring data is recorded 1406. A ML classification model will receive power monitor data as input and start running 1408 to determine the device type and/or energy usage classification. In some embodiments, one or more or both of the ML classification model 44a, 44b are hosted on the power socket, for example, on the microcontroller 22. One or both of the locally hosted ML classification models 44a, 44b may, however, only run on the microcontroller 22 in some embodiments if there is no data connection to a remote server such as a server of the remote energy monitoring system 40 on which the ML models would otherwise run. Other examples of actions which may be triggered by the detected insertion of a plug into a power outlet 12 include an appliance inserted flag being added 1410 to a database of power data drawing from that power outlet 12 and activation 1412 of rulesets, for example, insert override rules may be activated to override rules which may otherwise prevent power from being drawn via that power outlet at the time the plug is inserted.

The subsequent plug removal 1412 also triggers a plurality of actions. For example, the data transmission frequency of power data to the remote energy system 40 or cloud server will decrease 1414, the power monitoring data recording frequency will also decrease 1416, and the ML classification model, wherever it is running, will stop 1418, and any previous rulesets which included insert override rules which were activated 1412 when the plug was inserted will be deactivated 1422. In addition, an appliance removed flag will be added 1420 to the database of power data drawn from that power outlet or socket. The duration between detection of the plug insertion and the plug removal will delimit the data section in the database, and in some embodiments, a data section will be generated 1424 which is defined by the appliance inserted and removed flags. The generated data section may then be stored or sent as input for further training or ML model development 1426.

In some embodiments, the power socket may communicate directly to a device in a building to manage the power usage of the device. In some embodiments, the power socket may cause an audio and/or visual indicator to be provided on a socket or on a user's device that the power socket has sensed, to alert a user to the location of an available power socket. In some embodiments, the alert may be for a specific type of power outlet, for example, for a USB C type connection that a user's device may required connection to when it is reaching a lower power level.

In some embodiments, the power socket may be configured to determine the presence of devices and/or users using a wireless communications network or link, and or to receive power requests using a wireless communications network or link. Examples of suitable wireless communications protocols include, for example, WiFI, Bluetooth™, RFID, ZigBee or a similar communications protocol. By way of an example use case, a laptop running off battery power but connected to an outlet 12 of a power socket 10 which is turned off may directly communicate in a wireless manner with the outlet and/or power socket so as to cause its connected outlet to provide power so that it can continue to operate.

The above embodiments are merely illustrative of preferred embodiments as for the sake of conciseness is it is not possible to set out all alternatives or combinations or permutations or equivalents of the disclosed features of each possible embodiment of either a power socket or either of the two machine learning models disclosed herein. It is accordingly intended that all alterations, permutations, and equivalents to any individual one or combination of the disclosed embodiments that would fall within the scope of the invention.

The invention claimed is:

1. An electrical power socket configured to reduce wastage of electrical energy by a connected electrical power consuming device, the electrical power socket comprising:
    one or more electrical power outlets;
    a power input configured to supply power to each of the one or more power outlets;
    at least one relay configured to control delivery of electrical power via the one or more power outlets;
    a power monitor configured to monitor the operational state of each power outlet and one or more characteristics of power drawn from each power outlet by a connected electrical device; and
    a microcontroller,
    wherein, the microcontroller is configured to:
        capture power monitored data representing the operational state of each power outlet and one or more characteristics of power drawn from each power outlet by the connected electrical device;
        send the captured power monitored data via a data network interface to a remote energy monitoring system;

receive data from the remote energy monitoring system; and control the at least one relay to manage delivery of power via a power outlet responsive to a determination, based at least in part on the received data, that the power outlet is delivering power associated with a wasted energy usage classification to at least one device, and wherein the power monitor determines, at intervals of 3 Hz or less, one or more or all of the following characteristics of the power drawn from the electrical power socket by the device, together with time-stamp information: an AC line frequency, an AC line voltage, a current drawn on outlet, an active power drawn on the outlet, a reactive power drawn on the outlet, an apparent power drawn on the outlet, and a power factor; and wherein the microcontroller captures data from a data store at dynamic intervals to send to the remote energy monitoring system, wherein the dynamic intervals automatically increase in length if the power monitor detects no power is being drawn and/or if a relay has turned off the delivery of power from an outlet.

2. The electrical power socket of claim 1, wherein the electrical power socket is configured to implement edge computing using a firmware algorithm to manage itself if in an off-line state when a condition or ruleset has been breached.

3. The electrical power socket of claim 2, wherein the firmware algorithm automatically causes the electrical power socket to turn off power provided to a device connected to the electrical power socket when the condition or ruleset has been breached; and the firmware algorithm causes the electrical power socket to wait a given time frame and then to turn the power back on, wherein if the breach is still evident, the electrical power socket is caused to turn the power off.

4. The electrical power socket of claim 2, wherein the firmware algorithm automatically causes the electrical power socket to turn off power provided to a device connected to the electrical power socket when the condition or ruleset has been breached, and the firmware algorithm causes the electrical power socket to wait a given time frame and then to turn the power back on, wherein if the breach is still evident, the electrical power socket is caused to turn the power off; and wherein if the breach is still evident, an off-period time frame is increased by a set amount according to a number of breaches that have occurred, wherein the off-period time frame is adjustable.

5. The electrical power socket of claim 2, wherein the power outlet determines it is delivering power associated with a wasted energy usage classification using at least the ruleset.

6. The electrical power socket of claim 2, wherein, in at least the off-line state:
the captured monitored data is used by a machine-learning model running on the microcontroller to determine if the captured monitored data includes data indicated wasted energy; and/or
the captured monitored data is used by a machine-learning model running on the microcontroller to determine a type of device drawing power from the outlet.

7. The electrical power socket of claim 1, wherein the determination that the power outlet is delivering power associated with a wasted energy usage classification is determined by the electrical power socket using one or more of:

the data received from the remote energy monitoring system indicating energy is being wasted;
a ruleset for the outlet and/or the electrical power socket to provide power; and
edge processing of an output from a machine learning, (ML), model trained to determine an energy usage classification for power drawn from a power outlet of a power socket by a device.

8. The electrical power socket of claim 1, wherein at least one relay comprises a remotely actuatable relay which is configured to be actuated off-line responsive to one or more of:
a loss or change of data network connectivity with the remote energy monitoring system;
a loss of data communication with the remote energy monitoring system; and
wherein the microcontroller captures data from the data store at dynamic intervals to send to the remote energy monitoring system, wherein the dynamic intervals automatically increase in length if the power monitor detects no power is being drawn and/or if a relay has turned off the delivery of power from an outlet.

9. The electrical power socket of claim 1, wherein the power monitor is configured to store the determined one or more characteristics of power drawn by a device and time stamp information in a data store accessible by the microcontroller.

10. The electrical power socket of claim 1, wherein the relay comprises a latching relay configured to de-energize after being switched so the relay does not use power to maintain its state after it has been switched on or off.

11. The electrical power socket of claim 1, further comprising a reset component which is configured to perform a reset routine, wherein the reset routine is triggered by detecting an external magnetic field.

12. The electrical power socket of claim 1, wherein the electrical power socket is configured to respond to a received power request signal to meter power drawn from at least one output.

13. The electrical power socket of claim 1, wherein the electrical power socket further includes for each power outlet a plug engagement detection mechanism configured to detect at least one pin of the plug in that power outlet independently of whether an electrical device is drawing power via the plug from that power outlet.

14. The electrical power socket of claim 1, wherein the electrical power socket further comprises at least one software-controlled switch configured to turn on and off the delivery of power via the power outlets, wherein the software-controlled switch is a human-actuated tactile switch that sends data to the microcontroller when it has been actuated, wherein the functionality provided by the human-actuated tactile switch is determined using a switch functionality ruleset comprising one or more rules for triggering functionality which are coded on and executed by the microcontroller to provide functionality triggered by actuation of the human-actuated tactile switch, wherein different user gestures detected by the human-actuated tactile switch trigger different functionality.

15. The electrical power socket of claim 2, wherein the electrical power socket is further configured to implement a demand-side response to a network power grid power demand by:
receiving one or more demand-based signals from a remote server; and responsive to receiving the one or more demand-based signals, turning at least one relay on or off to control delivery of electrical power via the one or more power outlets.

16. The electrical power socket of claim 1, wherein the electrical power socket includes a light indicator having a color set to a value based on greenhouse gas emissions for electrical power, wherein the color is set to a value between a maximum and minimum value on a light color scale associated with forecast greenhouse gas emissions.

17. The electrical power socket of claim 1, wherein the electrical power socket includes a light indicator having a color set to a value based on greenhouse gas emissions for electrical power, wherein the color is set to a value between a maximum and minimum value on a light color scale associated with forecast greenhouse gas emissions, wherein the maximum and minimum values for the light color scale are set to a daily maximum and minimum level of forecast greenhouse gas emissions.

18. The electrical power socket of claim 1, wherein the electrical power socket is further configured to:
  receive signals indicating greenhouse gas emissions associated with power provided to the electrical power socket;
  responsive to the received signals indicating that greenhouse gas emissions associated with power drawn by a connected electrical device are above a greenhouse gas emissions power supply cut-off threshold, turn off the at least one relay to control the flow of power drawn by the connected electrical device; and
  responsive to the received signals indicating that greenhouse gas emissions associated with power drawn by a connected electrical device are below a greenhouse gas emissions power supply cut-off threshold, turn on the at least one relay to control the flow of power drawn by the connected electrical device.

\* \* \* \* \*